(12) United States Patent
Haimovitch et al.

(10) Patent No.: US 11,132,736 B2
(45) Date of Patent: *Sep. 28, 2021

(54) OBJECT DRIVEN NEWSFEED

(71) Applicant: TRANSFORM SR BRANDS LLC, Hoffman Estates, IL (US)

(72) Inventors: Guy Haimovitch, Kfar Saba (IL); Eui Chung, Huntley, IL (US); Moti Karmona, Hod Hasharon (IL)

(73) Assignee: Transform SR Brands LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,904

(22) Filed: Dec. 23, 2019

(65) Prior Publication Data
US 2020/0202411 A1 Jun. 25, 2020

Related U.S. Application Data

(63) Continuation of application No. 16/357,592, filed on Mar. 19, 2019, now Pat. No. 10,521,850, which is a continuation of application No. 15/652,781, filed on Jul. 18, 2017, now Pat. No. 10,235,707, which is a
(Continued)

(51) Int. Cl.
*G06Q 30/06* (2012.01)
*H04L 29/08* (2006.01)
*H04L 12/58* (2006.01)
*H04L 29/06* (2006.01)
*G06Q 50/00* (2012.01)

(52) U.S. Cl.
CPC ..... *G06Q 30/0633* (2013.01); *G06Q 30/0631* (2013.01); *G06Q 50/01* (2013.01); *H04L 51/32* (2013.01); *H04L 67/22* (2013.01); *H04L 67/26* (2013.01); *H04L 69/24* (2013.01)

(58) Field of Classification Search
None
See application file for complete search history.

(56) References Cited

U.S. PATENT DOCUMENTS 8,355,955 B1 * 1/2013 Mirchandani ...... G06Q 30/0641
705/26.1
8,606,721 B1 12/2013 Dicker
(Continued)

FOREIGN PATENT DOCUMENTS

WO 2011/062690 A1 5/2011

OTHER PUBLICATIONS

European Patent Office, Communication pursuant to Article 94(3), in Application No. 13 784 468.4-1871, dated Apr. 26, 2017 (6 pages).
(Continued)

*Primary Examiner* — Lashonda T Jacobs
(74) *Attorney, Agent, or Firm* — McAndrews, Held & Malloy, Ltd.

(57) ABSTRACT

Object driven newsfeeds supporting interest-based social networks aid in the formation of relationships based on similar domains of user interest. A space efficient graphical user interface (GUI) enables access to an object driven newsfeed of contextual and relevant information to aid a consumer/user in making buying decisions in an e-commerce environment.

20 Claims, 46 Drawing Sheets

Related U.S. Application Data continuation of application No. 13/886,065, filed on May 2, 2013, now Pat. No. 9,710,844.

(60) Provisional application No. 61/641,329, filed on May 2, 2012.

(56) References Cited

U.S. PATENT DOCUMENTS

| | | | | |
|---|---|---|---|---|
| 8,606,845 | B2* | 12/2013 | Dickinson | H04L 67/02 709/203 |
| 8,825,888 | B2* | 9/2014 | Schoen | G06Q 30/0269 709/231 |
| 8,935,339 | B2* | 1/2015 | Cheng | G06Q 10/10 709/206 |
| 9,002,841 | B2* | 4/2015 | McKevitt | G06F 16/958 707/736 |
| 9,026,641 | B2* | 5/2015 | Emanuel | G06F 16/954 709/224 |
| 9,189,559 | B2* | 11/2015 | Luu | G06Q 30/0269 |
| 9,189,589 | B2* | 11/2015 | Muddu | G06F 30/394 |
| 2005/0268248 | A1 | 12/2005 | Boemer | |
| 2006/0173985 | A1 | 8/2006 | Moore | |
| 2007/0067798 | A1 | 3/2007 | Wroblewski | |
| 2007/0168367 | A1* | 7/2007 | Dickinson | H04L 67/10 |
| 2008/0040673 | A1* | 2/2008 | Zuckerberg | G06F 40/169 715/745 |
| 2008/0082941 | A1* | 4/2008 | Goldberg | G06F 3/0482 715/810 |
| 2009/0012940 | A1* | 1/2009 | Ives | G06F 16/9535 |
| 2009/0070412 | A1* | 3/2009 | D'Angelo | H04L 67/306 709/203 |
| 2009/0172565 | A1* | 7/2009 | Jackson | H04L 65/403 715/753 |
| 2009/0248494 | A1* | 10/2009 | Hueter | G06Q 30/0204 705/7.29 |
| 2009/0292656 | A1* | 11/2009 | Raman | G06N 5/025 706/11 |
| 2010/0050080 | A1 | 2/2010 | Libert | |
| 2010/0146443 | A1* | 6/2010 | Zuckerberg | G06F 16/9535 715/810 |
| 2010/0293221 | A1* | 11/2010 | Sidman | G06Q 30/0273 709/203 |
| 2011/0178866 | A1* | 7/2011 | Levine | G06Q 30/0247 705/14.43 |
| 2011/0191417 | A1* | 8/2011 | Rathod | G06F 3/048 709/204 |
| 2012/0036015 | A1 | 2/2012 | Sheikh | |
| 2012/0054275 | A1 | 3/2012 | Channell | |
| 2012/0072428 | A1* | 3/2012 | Kao | G06Q 10/00 707/748 |
| 2012/0131139 | A1 | 5/2012 | Siripurapu | |
| 2012/0158501 | A1* | 6/2012 | Zhang | G06Q 30/0255 705/14.53 |
| 2012/0185355 | A1* | 7/2012 | Kilroy | G06Q 30/0633 705/26.8 |
| 2012/0185486 | A1 | 7/2012 | Voigt | |
| 2012/0204096 | A1* | 8/2012 | Kendall | G06Q 30/0254 715/234 |
| 2012/0210334 | A1 | 8/2012 | Sutedja | |
| 2012/0231770 | A1 | 9/2012 | Clarke | |
| 2012/0290545 | A1 | 11/2012 | Tumanov | |
| 2012/0290565 | A1 | 11/2012 | Ivana | |
| 2012/0290637 | A1* | 11/2012 | Perantatos | G06Q 10/10 709/203 |
| 2013/0018955 | A1 | 1/2013 | Thaxton | |
| 2013/0019168 | A1* | 1/2013 | Graham | G06F 16/9535 715/256 |
| 2013/0030905 | A1 | 1/2013 | Fuloria | |
| 2013/0036015 | A1 | 2/2013 | Bender | |
| 2013/0159403 | A1* | 6/2013 | Zigoris | H04L 67/22 709/204 |
| 2013/0246521 | A1* | 9/2013 | Schacht | G06Q 10/10 709/204 |
| 2013/0332523 | A1* | 12/2013 | Luu | G06Q 30/0269 709/204 |
| 2014/0038703 | A1* | 2/2014 | Lampert | G07F 17/3239 463/26 |
| 2014/0229270 | A1* | 8/2014 | Rashwan | G06Q 30/0641 705/14.43 |
| 2014/0351263 | A1* | 11/2014 | McConnell | G06F 16/9535 707/748 |
| 2015/0081449 | A1* | 3/2015 | Ge | G06F 3/0482 705/14.66 |
| 2016/0321260 | A1* | 11/2016 | Owens | G06F 16/958 |
| 2017/0154376 | A1* | 6/2017 | Mirchandani | G06Q 30/0641 |

OTHER PUBLICATIONS

Canadian Intellectual Property Office, Examiner Requisition in Canadian application No. 2,883,081, dated Nov. 22, 2016 (6 pages).
PCT, International Search Report and Written Opinion of the International Searching Authority, or the Declaration, in International application No. PCT/US2013/039307 dated Sep. 10, 2013 (13 pages).
Remick, 10 Reasons I'm Switching from TweetDeck to HootSuite, AppStorm, Jul. 5, 2010, Retrieved on Aug. 16, 2013. Retrieved from the internet: URL <http://web.appstorm.net/reviews/twitter-reviews/10-reasons-im-switching-fromtweetdeck-to-hootsuite/>. Entire document (16 pages).
European Patent Office, Extended European Search Report for Application No. 13784468 dated Nov. 4, 2015 (6 pages).
Canadian Patent Office, Examiner Requisition in Application No. 2,883,081, dated Oct. 23, 2017 (7 pages).
European Patent Office, Communication with extended European search report in Application No. 18206602.7, dated Jun. 17, 2019 (11 pages).

* cited by examiner

Object #1
Story #1
  Comment #2
  Comment #1
Story #2
  Comment #3
  Comment #2
  Comment #1
Story #3

Object #2
Story #1
  Comment #3
  Comment #2
  Comment #1
Story #2
  Comment #1
Story #3
  Comment #3
  Comment #2
  Comment #1

Object #3
Story #1
  Comment #2
  Comment #1

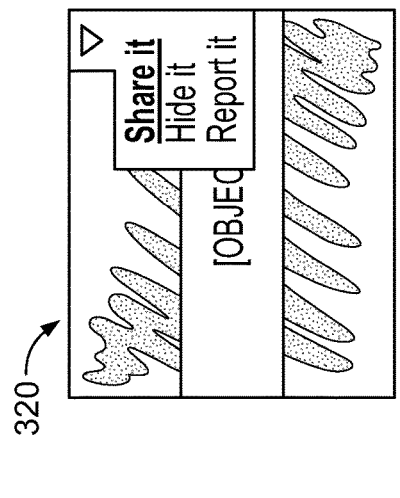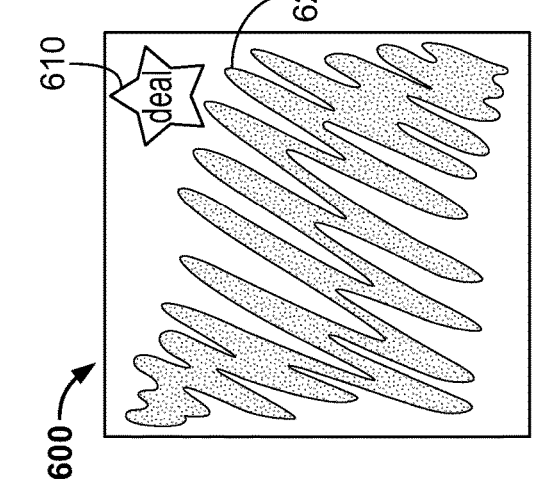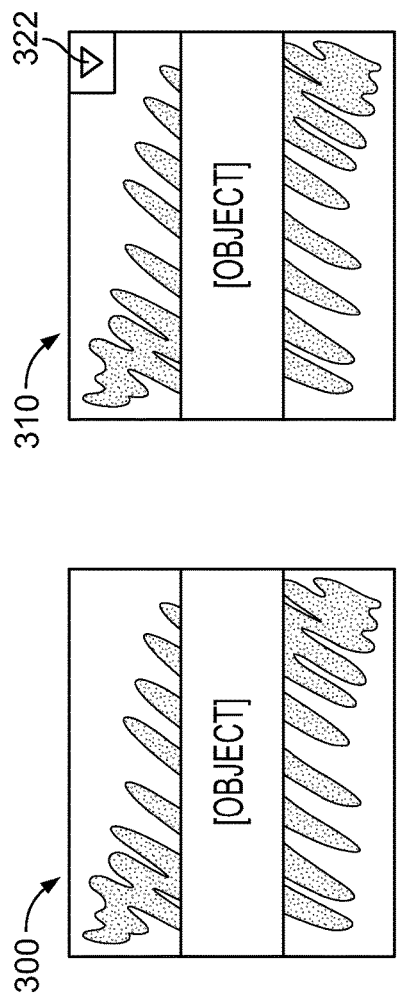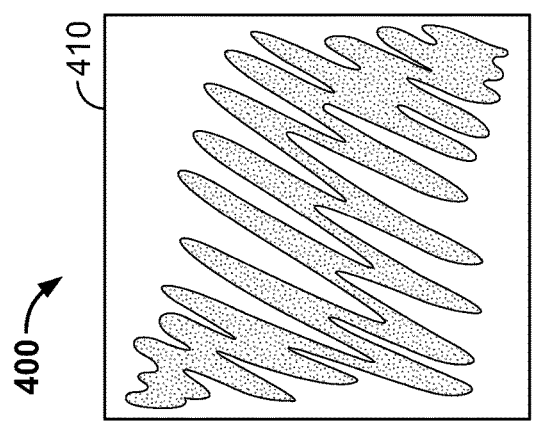
FIG. 3
FIG. 4
FIG. 5
FIG. 6

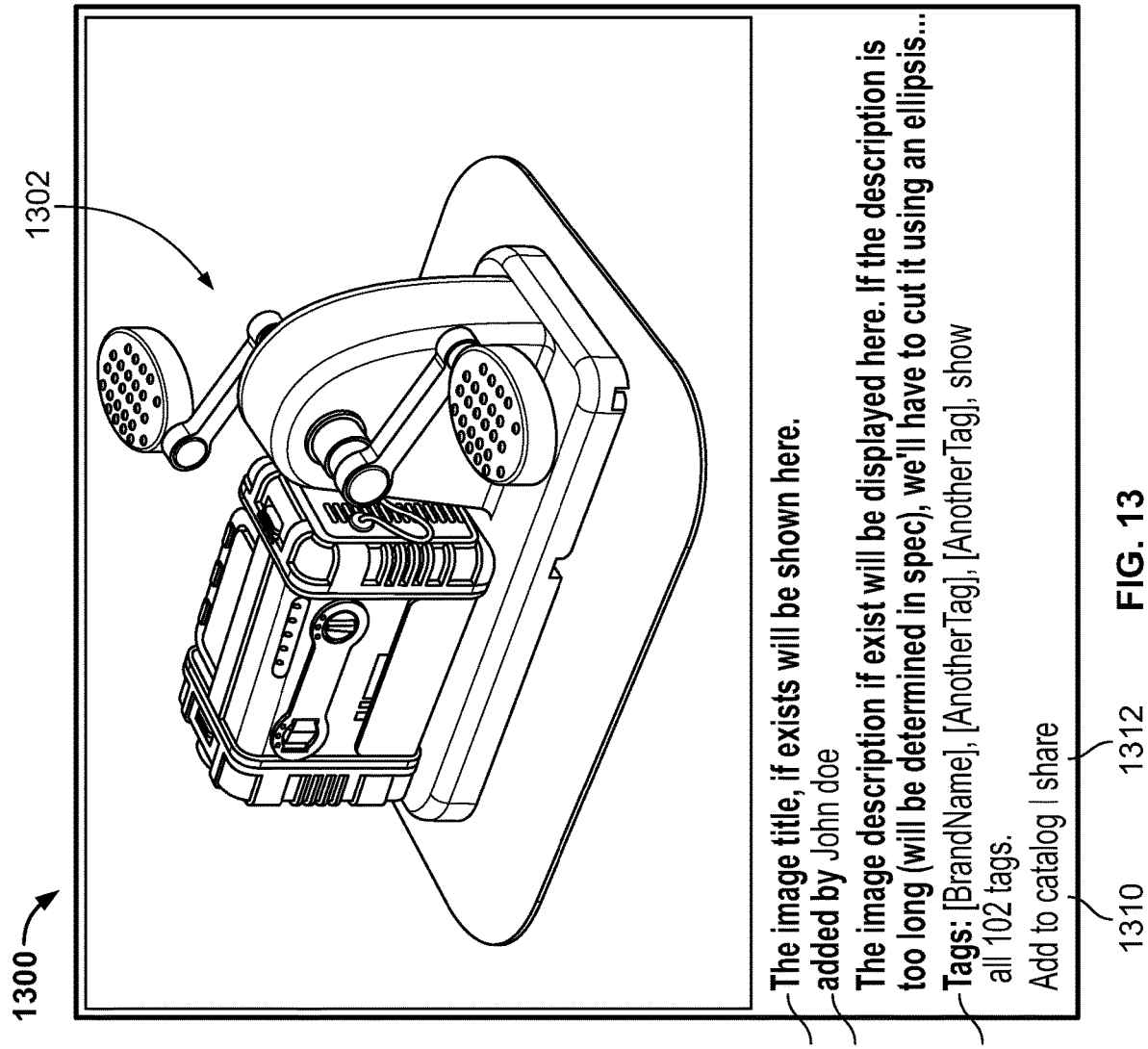
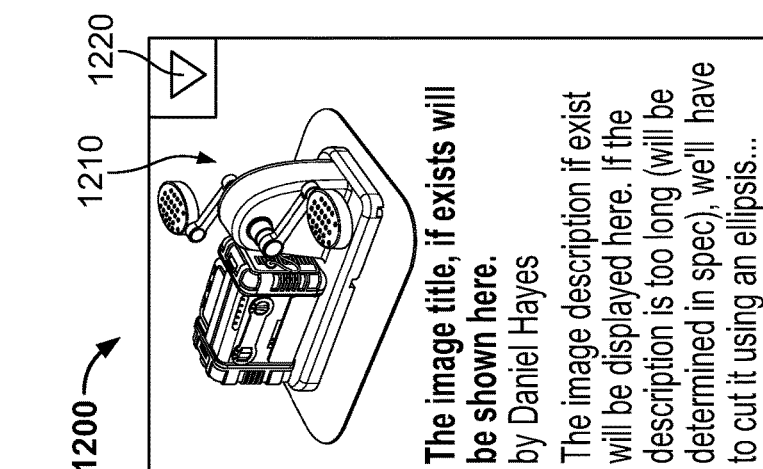
FIG. 12
FIG. 13

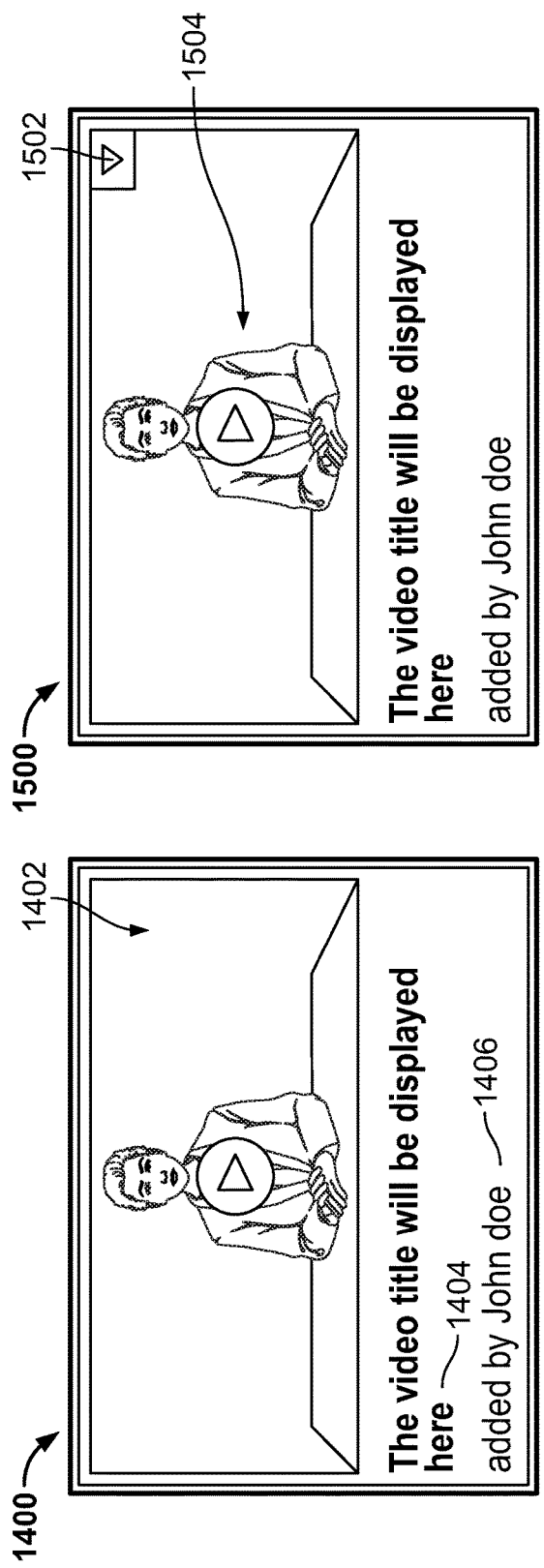
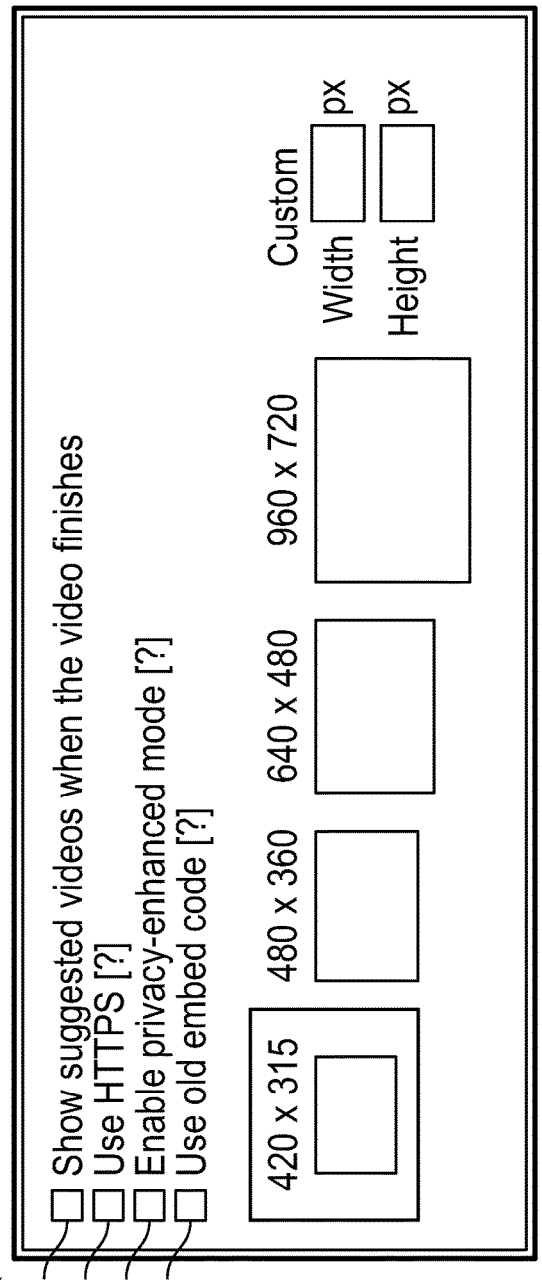

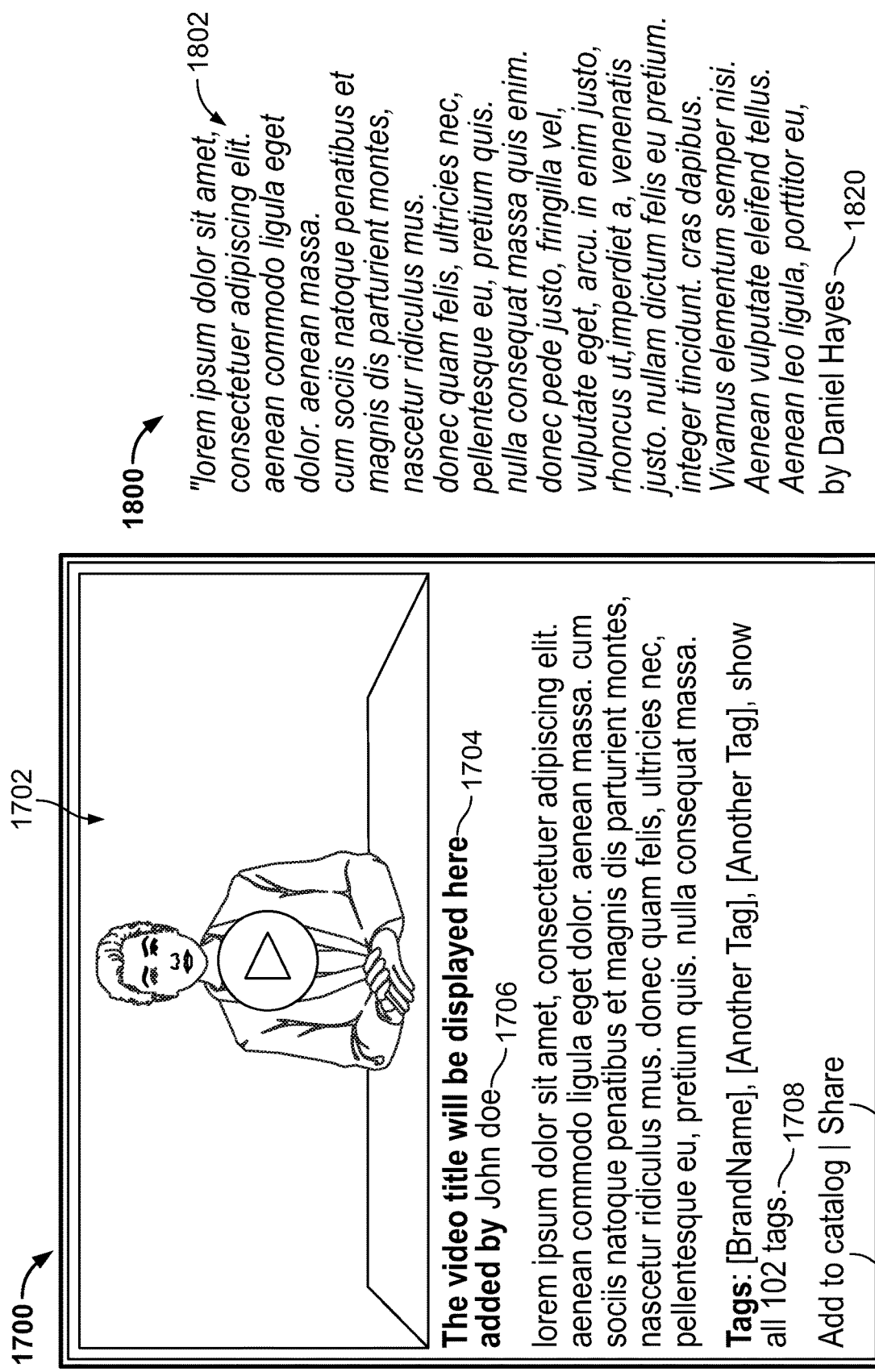

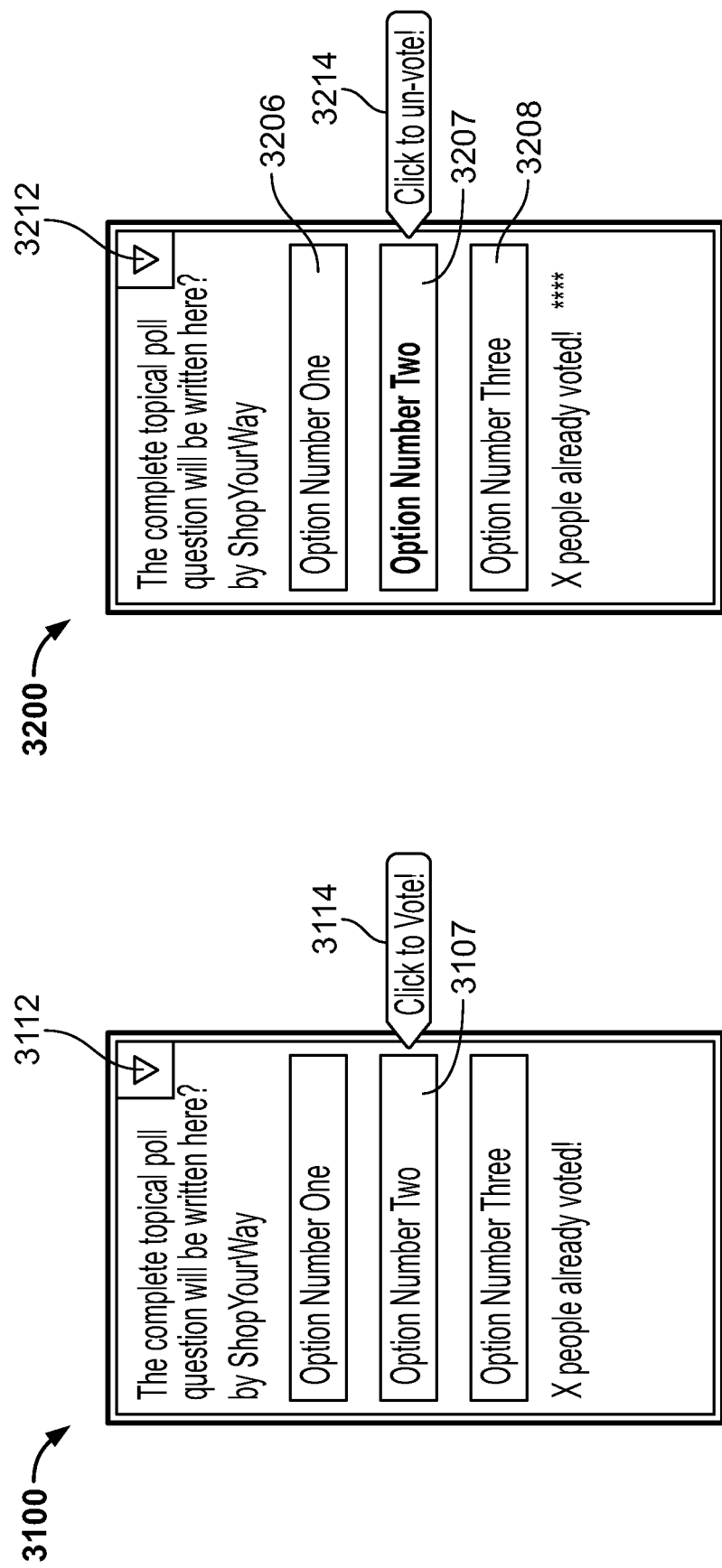

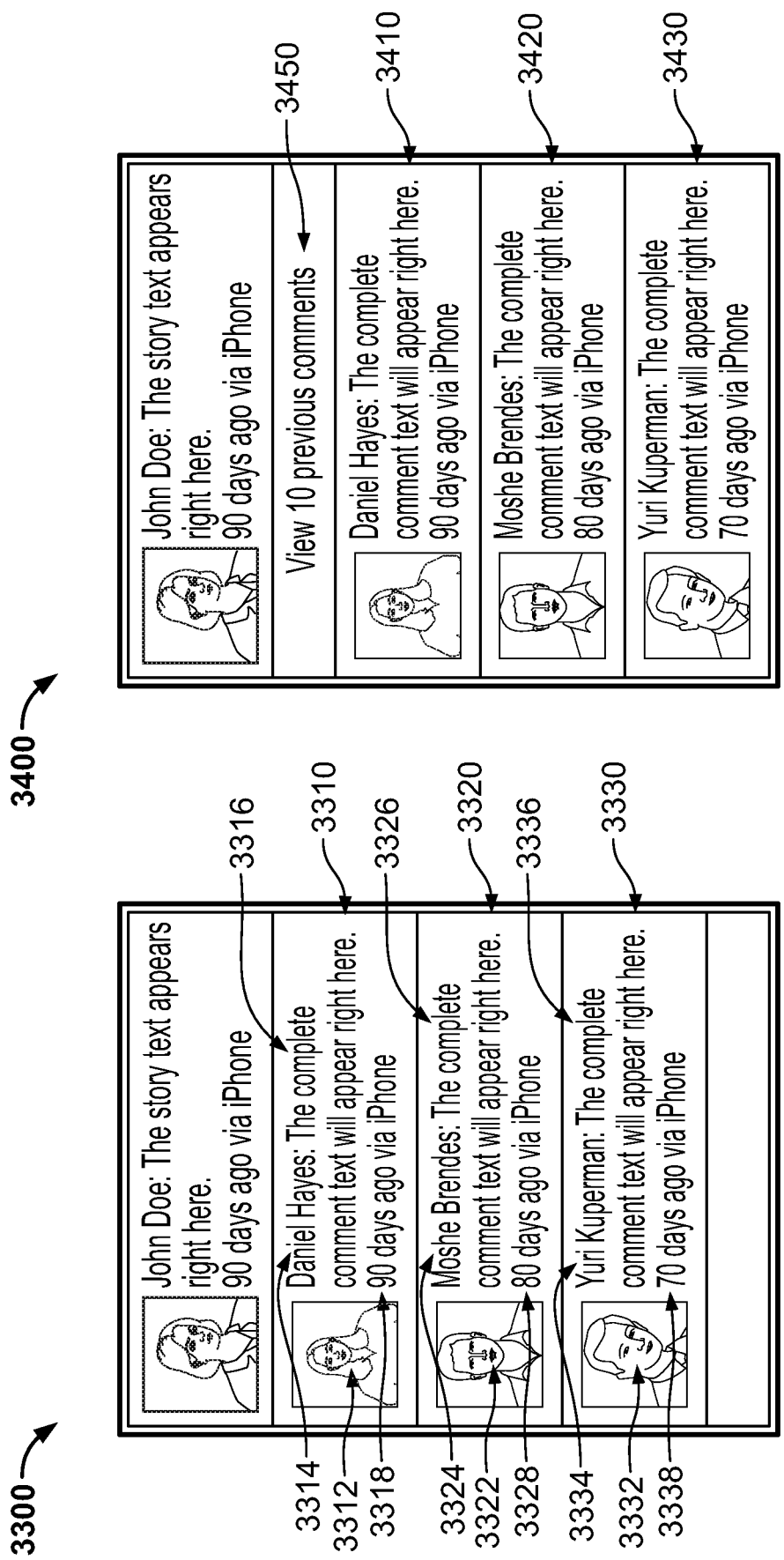

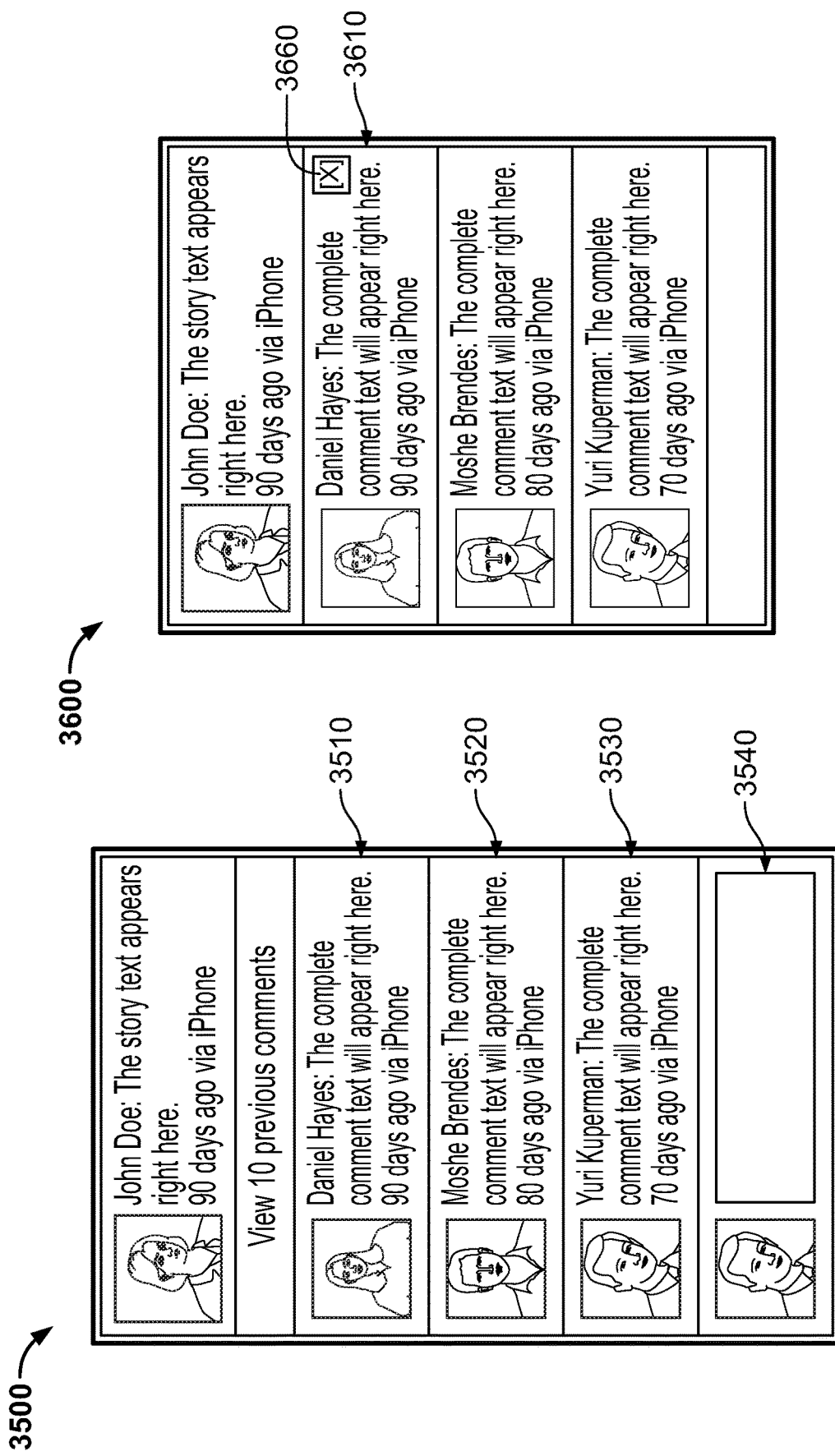

4000

|  | YOUR STREAM | POPULAR | BROWSING HISTORY | TAG ENTITY | PRODUCT PAGE |
|---|---|---|---|---|---|
| NEW ARRIVALS | X | X |  | X |  |
| WEEKLY DEALS | X | X |  | X |  |
| ADYOURWAY | X |  |  | X |  |
| TOP SELLERS | X | X |  | X |  |
| FEATURED VIDEO | X | X |  | X |  |
| TOPICAL POLLS | X |  |  | X |  |
| FEATURED USERS | X |  |  | X |  |
| TRENDING PRODUCTS | X | X |  | X |  |
| SYWR OFFERS | X | X |  | X |  |
| PRE ORDERS | X | X |  | X | X |
| DEAL (PRICE DROPPED) | X | X |  | X | X |
| JOINED DELVER | X |  |  |  |  |
| STARTED FOLLOWING | X |  |  |  |  |
| ADDED PRODUCT TO CATALOG | X |  |  | X |  |
| ADDED WEB-PAGE TO CATALOG | X |  |  | X |  |
| LIKED CATALOG | X |  |  |  |  |
| RATED PRODUCT | X |  |  | X | X |
| REVIEWED PRODUCT | X | X |  | X | X |
| UPDATED STATUS | X | X |  | X |  |
| WROTE ON WALL | X |  |  | X (BY TAG ADMIN) |  |
| PUBLISHED POLL | X | X |  | X | X |
| ASKED QUESTION ON PRODUCT | X | X |  | X | X |
| RECOMMENDED A PRODUCT | X |  |  |  |  |
| ADDED PICTURE TO CATALOG | X |  |  | X |  |
| UNLOCKED BADGE | X |  |  |  |  |
| ANSWERED QUESTION | X |  |  | X | X |
| INSTALLED MOBILE APP | X |  |  |  |  |
| TAGGED ITEM IN CATALOG | X |  |  | X | X |
| COMMENTED ON PRODUCT | X |  |  |  |  |
| COMMENTED ON PRODUCT IN CATALOG | X |  |  |  |  |
| COMMENTED ON WEB-PAGE IN CATALOG | X |  |  |  |  |
| COMMENTED ON PICTURE IN CATALOG | X |  |  |  |  |
| VOTED ON POLL | X |  |  |  |  |
| USER FOLLOWED PRODUCT | X |  |  |  |  |
| USER FOLLOWED TAG | X |  |  |  |  |
| CHECKED IN | X |  |  | X (STORE ONLY) |  |
| VIEWED PRODUCT |  |  | X |  |  |
| PERFORMED SEARCH |  |  | X |  |  |

| | PRODUCT | TEXT | PICTURE | VIDEO | CATALOG | TAG ENTITY | BADGE | T.POLL | HMC. POLL | PERSON | HTML |
|---|---|---|---|---|---|---|---|---|---|---|---|
| NEW ARRIVALS | X | | | | | | | | | | |
| WEEKLY DEALS | X | | | | | | | | | | |
| ADYOURWAY | X | | | | X | X | | | | | |
| TOP SELLERS | X | | | | | | | | | | |
| FEATURED VIDEO | | | | X | | | | | | | |
| TOPICAL POLLS | | | | | | | | X | | | |
| FEATURED USERS | | | | | | | | | | X | |
| TRENDING PRODUCTS | X | | | | | | | | | | |
| SYWR OFFERS | X | | | | | | | | | | |
| PRE ORDERS | X | | | | | | | | | | |
| DEAL (PRICE DROPPED) | X | | | | | | | | | | |
| JOINED DELVER | | | | | | | | | | X | |
| STARTED FOLLOWING | | | | | | | | | | X | |
| ADDED PRODUCT TO CATALOG | | | | | | | | | | | |
| ADDED WEB-PAGE TO CATALOG | | | | | | | | | | | |
| LIKED CATALOG | | | | | X | | | | | | |
| RATED PRODUCT | X | | | | | | | | | | |
| REVIEWED PRODUCT | X | | | | | | | | | | |
| VIEWED PRODUCT | X | | | | | | | | | | |
| PERFORMED SEARCH | | | | | | | | | | | |
| UPDATED STATUS | | X | | | | | | | | | |
| WROTE ON WALL | | X | | | | | | | | | |
| PUBLISHED POLL | | | | | | | | X | X | | |
| ASKED QUESTION ON PRODUCT | X | | | | | | | | | | |
| RECOMMENDED A PRODUCT | X | | | | | | | | | | |
| ADDED PICTURE TO CATALOG | | | | | | | | | | | |
| UNLOCKED BADGE | | | | | | | X | | | | |
| ANSWERED QUESTION | X | | | | | | | | | | |
| INSTALLED MOBILE APP | | | X | | | | | | | | |
| TAGGED ITEM IN CATALOG | | | | | | | | | | | |
| COMMENTED ON PRODUCT | X | | | | | | | | | | |
| COMMENTED ON PRODUCT IN CATALOG | X | | | | | | | | | | |
| COMMENTED ON WEB-PAGE IN CATALOG | | | | | | | | | | | |
| COMMENTED ON PICTURE IN CATALOG | | | | | | | | | | | |
| VOTED ON POLL | | | | | | | | | X | | |
| USER FOLLOWED TAG | | | | | | X | | | | | |
| CHECKED IN | | | | | | X | | | | | |

FIG. 41

Change newsfeed view:

| YOUR STREAM | POPULAR |

POST A NEW: ⌕ STATUS  📷 PHOTO  🎥 VIDEO  ▦ PRODUCT

The Bean
Place

Rob Gerlach shopped into this place:
Throwing a football with my son at Grant Park. Stopped off at The Bean
2 MINUTES AGO

Things I like
Contains 74 items
Created by David Sorkin

David Sorkin added an item to this catalog:
PRICE DROP!
Gents
3 MINUTES AGO

LG Electronics 37" Class LCD Monitor
$1,849.99

Top selling products in Flat Panel LCD
4 MINUTES AGO

Sirena Collection 1/4 cttw Diamond Solitaire White Gold Earrings
$266.99

David Sorkin added an item to this catalog:
Critter Knit Winter Hat - Owl
ABOUT 5 HOURS AGO 👍 Tali Hoffmann likes this Top setting products in Earrings
2 MINUTES AGO Oromagnifico Rope Chain Two-tone Diamond-Cut. Sterling Silver and 14K Yellow Gold.
$29.99

Top selling products in Chains
4 MINUTES AGO

FIG. 43

More columns in masonry view

Feed Width: ▦ ▦ | Go back to the Classic Newsfeed

ALL STORIES ▼

1 cttw Princess and Baguette Diamond Ring
$499.99

Top selling products in Rings
5 MINUTES AGO

Craftsman 5/8 in. x 25 ft. Heavy Duty Hose
$22.99

Top selling products in Garden Hoses
6 MINUTES AGO

Lab Created Sapphire Pendant Heart Sterling Silver Pink
$28.49

New Arrival in Pendants & Necklaces
8 MINUTES AGO

Whole Home 30 in. x 20 in. Slice Fruit Kitchen Rug
$11.99

Top selling products in Area Rugs
8 MINUTES AGO

Samsung 55" Class 1080p 240Hz Slim 3D LED SMART HDTV UN55ES8000 with 4 pairs of 3D active glasses
$2,899.99

Top selling products in All Flat-Panel TVs
5 MINUTES AGO

Hewlett Packard Photosmart Premium e-all-In-One Printer-C310a Remanufactured
$79.99

Top selling products in All-in-one
6 MINUTES AGO

Lab Created Opal and Diamond Accent Ring
$39.99

New Arrival in Gemstone
8 MINUTES AGO

Magnavox 32" Class LCD HDTV
$249.99 - $299.99

Top selling products in All Flat-Panel TVs
8 MINUTES AGO

Shopping together (19)

MY WISH LIST
CONTAINS 394 ITEMS
CREATED BY NIR ALTMARK

NIR ALTMARK ADDED AN
ITEM TO THIS CATALOG:
WILSON 8X2 - 11
BASEBALL BAT
09 MINUTES AGO

NIR ALTMARK ADDED AN ITEM TO
THIS CATALOG:
RAZOR E100
ELECTRIC SCOOTER
RED
ABOUT 4 HOURS AGO

NIR ALTMARK ADDED AN ITEM TO
THIS CATALOG:
MAGNAVO** 19"
CLASS LED LCD
HDTV
ABOUT 3 HOURS AGO
2 COMMENTS:

GADI LIFSHITZ: *JUST 19"? WHY NOT GO FOR THE 22" MODEL?*
ABOUT 5 HOURS AGO

NIR ALTMARK: *I'LL TAKE BOTH OF THEM!*
31 MINUTES AGO

HAVE YOU RAKED LEAVES FROM YOUR LAWN YET?
BY SHOPYOURWAY

| WITH MY NEW LEAFBLOWER |
| I GOT MY KID TO DO IT |
| I WILL SOON |
| I DON'T HAVE A YARD |

54 PEOPLE ALREADY VOTED

KENMORE 1.2 CU. FT. COUNTERTOP MICROWAVE
(MODEL 6912)
$129.99

RECOMMENDED SINCE YOU
VIEWED KENMORE 1.1 CU.
FT. COUNTERTOP
MICROWAVE OVEN
ABOUT 2 HOURS AGO

LAWN AND GARDEN PROJECT
CONTAINS 2 ITEMS
CREATED BY CRAFTSMAN

CRAFTSMAN ADDED
PLANTER BOX TO THIS CATALOG.
ABOUT 8 HOURS AGO
1 COMMENT:

CRISTINA CORDOVA:
*HOW TO BUILD A PLANTER BOX*
ABOUT 8 HOURS AGO

CRAFTSMAN ADDED
CRAFTSMAN TO THIS CATALOG.
ABOUT 8 HOURS AGO
1 COMMENT:

CRISTINA CORDOVA:
*HOW TO BUILT A PLANTER TRELLIS*
ABOUT 8 HOURS AGO

TIDE DETERGENT, 2X
CONCENTRATED, ORIGINAL SCENT, 50
FT OZ (1.56 QT) 1.47 LT
$8.75

NOW TRENDING TIDE DETERGENT, 2X
CONCENTRATED, ORIGINAL SCENT,
50 FT OZ (1.56 QT) 1.47 LT
ABOUT 8 HOURS AGO

THINGS I LIKE
CONTAINS 17 ITEMS
CREATED BY PRASHANT KUMAR

PRASHANT KUMAR ADDED AN
ITEM TO THIS CATALOG:
KETTLER MATCH
5.0 OUTDOOR
GREEN TABLE TENNIS
ABOUT 8 HOURS AGO

KETTLER MATCH 5.0 OUTDOOR
GREEN TABLE TENNIS
$764.10

FIG. 47 (Cont.)

ORANGE DREAMS
CONTAINS 17 ITEMS
CREATED BY BARRY LARSON

BARRY LARSON ADDED AN ITEM TO THIS CATALOG:
FRUITY COLOR WATCH ORANGE
ABOUT 9 HOURS AGO

2 COMMENTS:
SHOPPING GENIUS:
KEITH - I AM AMAZED AT CONVENIENCE OF SHOPPING WITH MYGOFER. I AM A FAN TOO!
ABOUT 6 HOURS AGO

KEITH: ME TOO, CAN'T WAIT FOR BROADER HOME DELIVERY!!
ABOUT 7 HOURS AGO

DIEHARD PLATINUM MARINE BATTERY- GROUP SIZE 31M (PRICE WITH EXCHANGE)
$251.99

BARRY LARSON RECOMMENDED THIS PRODUCT TO ERIC JACOBI :
THIS IS PERFECT FOR YOUR NEW BOAT, WHEN ARE YOU GETTING THAT?
ABOUT 9 HOURS AGO

BARRY LARSON ADDED AN ITEM TO THIS CATALOG:
DREAM ON ME LIGHT WEIGHT ALUMINUM STROLLER WITH CANOPY ORANGE
ABOUT 4 HOURS AGO

ROKU 2 XD STREAMING PLAYER
$79.99

NEW! NEW ARRIVAL IN TELEVISIONS
10 MINUTES AGO

TUNE IN 4/25 TO THE DOWN & DIRTY RADIO FEATURING BRAVO TV'S JOSH ALTMAN

BARRY LARSON ADDED AN ITEM TO THIS CATALOG:
DREAM ON ME
DREAM ON ME, TRAVELLER, LIGHT WEIGHT STROLLER, ORANGE
ABOUT 5 HOURS AGO

FEATURED SHOP YOURWAY VIDEO!
ABOUT 14 HOURS AGO

BARRY LARSON ADDED AN ITEM TO THIS CATALOG:
RACHEL RAY 10 PIECE PORCELAIN ENAMEL NON-STICK ORANGE COOKWARE SET.
ABOUT 6 HOURS AGO

MEN'S COVINGTON@ DRESS SHIRT
$17.99

RECOMMENDED SINCE YOU ADDED MEN'S POPOVER POCKET HOODLE TO A CATALOG
ABOUT 8 HOURS AGO

GARMIN GARMIN 010-00810-28 N:VI(R) 1450LM TRAVEL ASSISTANT
$128.70 - $129.99

TOP SELLING PRODUCTS IN GPS SYSTEMS
ABOUT 17 HOURS AGO

BARRY LARSON ADDED AN ITEM TO THIS CATALOG:
CRAFTSMAN HYDRAULIC STOOL, NEON ORANGE
ABOUT 7 HOURS AGO

STAR WARS

BARRY LARSON ADDED AN ITEM TO THIS CATALOG:

FIG. 48 (Cont.)

MY WISH LIST
CONTAINS 394 ITEMS
CREATED BY NIR ALTMARK

NIR ALTMARK ADDED AN
ITEM TO THIS CATALOG:
WILSON 8X2 - 11
BASEBALL BAT
09 MINUTES AGO

NIR ALTMARK ADDED AN ITEM TO
THIS CATALOG:
RAZOR E100
ELECTRIC SCOOTER
RED
ABOUT 5 MINUTES AGO

NIR ALTMARK ADDED AN ITEM TO
THIS CATALOG:
MAGNAVO** 19"
CLASS LED LCD
HDTV
ABOUT 9 HOURS AGO
2 COMMENTS:

GADI LIFSHITZ: JUST 19"? WHY
NOT GO FOR THE 22" MODEL?
ABOUT 5 HOURS AGO

NIR ALTMARK: I'LL TAKE BOTH
OF THEM!
10 MINUTES AGO

HAVE YOU RAKED LEAVES FROM YOUR LAWN YET?
BY SHOPYOURWAY
| WITH MY NEW LEAFBLOWER |
| I GOT MY KID TO DO IT |
| I WILL SOON |
| I DON'T HAVE A YARD |
54 PEOPLE ALREADY VOTED

KENMORE 1.2 CU. FT. COUNTERTOP MICROWAVE
(MODEL 6912)
$129.99

RECOMMENDED SINCE YOU
VIEWED KENMORE 1.1 CU.
FT. COUNTERTOP
MICROWAVE OVEN
ABOUT 1 HOURS AGO

LAWN AND GARDEN PROJECT
CONTAINS 2 ITEMS
CREATED BY CRAFTSMAN

CRAFTSMAN ADDED
PLANTER BOX TO THIS CATALOG.
ABOUT 5 HOURS AGO
1 COMMENT:

CRISTINA CORDOVA:
*HOW TO BUILD A PLANTER BOX*
ABOUT 2 HOURS AGO

CRAFTSMAN ADDED
CRAFTSMAN TO THIS CATALOG.
ABOUT 1 HOURS AGO
1 COMMENT:

CRISTINA CORDOVA:
*HOW TO BUILT A PLANTER TRELLIS*
ABOUT 2 HOURS AGO

TIDE DETERGENT, 2X
CONCENTRATED, ORIGINAL SCENT, 50
FT OZ (1.56 QT) 1.47 LT
$8.75

NOW TRENDING TIDE DETERGENT, 2X
CONCENTRATED, ORIGINAL SCENT,
50 FT OZ (1.56 QT) 1.47 LT
ABOUT 4 HOURS AGO

THINGS I LIKE
CONTAINS 17 ITEMS
CREATED BY PRASHANT KUMAR

PRASHANT KUMAR ADDED AN
ITEM TO THIS CATALOG:
KETTLE** MATCH
5.0 OUTDOOR
GREEN TABLE TENNIS
ABOUT 3 HOURS AGO

KETTLER MATCH 5.0 OUTDOOR
GREEN TABLE TENNIS
$764.10

MY WISH LIST
CONTAINS 394 ITEMS
CREATED BY NIR ALTMARK

NIR ALTMARK ADDED AN
ITEM TO THIS CATALOG:
WILSON 8X2 - 11
BASEBALL BAT
09 MINUTES AGO

NIR ALTMARK ADDED AN ITEM TO
THIS CATALOG:
RAZOR E100
ELECTRIC SCOOTER
RED
ABOUT 20 MINUTES AGO

NIR ALTMARK ADDED AN ITEM TO
THIS CATALOG:
MAGNAVO** 19"
CLASS LED LCD
HDTV
ABOUT 7 HOURS AGO
2 COMMENTS:

GADI LIFSHITZ: *JUST 19"? WHY
NOT GO FOR THE 22" MODEL?*
ABOUT 5 HOURS AGO

NIR ALTMARK: *I'LL TAKE BOTH
OF THEM!*
10 MINUTES AGO

HAVE YOU RAKED LEAVES FROM YOUR LAWN YET?
BY SHOPYOURWAY

| WITH MY NEW LEAFBLOWER |
| I GOT MY KID TO DO IT |
| I WILL SOON |
| I DON'T HAVE A YARD |

54 PEOPLE ALREADY VOTED

KENMORE 1.2 CU. FT. COUNTERTOP MICROWAVE
(MODEL 6912)
$129.99

RECOMMENDED SINCE YOU
VIEWED KENMORE 1.1 CU.
FT. COUNTERTOP
MICROWAVE OVEN
ABOUT 1 HOURS AGO

LAWN AND GARDEN PROJECT
CONTAINS 2 ITEMS
CREATED BY CRAFTSMAN

CRAFTSMAN ADDED
PLANTER BOX TO THIS CATALOG.
ABOUT 5 HOURS AGO
1 COMMENT:

CRISTINA CORDOVA:
*HOW TO BUILD A PLANTER BOX*
ABOUT 3 HOURS AGO

CRAFTSMAN ADDED
CRAFTSMAN TO THIS CATALOG.
ABOUT 2 HOURS AGO
1 COMMENT:

CRISTINA CORDOVA:
*HOW TO BUILT A PLANTER TRELLIS*
ABOUT 2 HOURS AGO

TIDE DETERGENT, 2X
CONCENTRATED, ORIGINAL SCENT, 50
FT OZ (1.56 QT) 1.47 LT
$8.75

NOW TRENDING TIDE DETERGENT, 2X
CONCENTRATED, ORIGINAL SCENT,
50 FT OZ (1.56 QT) 1.47 LT
ABOUT 5 HOURS AGO

THINGS I LIKE
CONTAINS 17 ITEMS
CREATED BY PRASHANT KUMAR

PRASHANT KUMAR ADDED AN
ITEM TO THIS CATALOG:
KETTLE** MATCH
5.0 OUTDOOR
GREEN TABLE TENNIS
ABOUT 3 HOURS AGO

KETTLER MATCH 5.0 OUTDOOR
GREEN TABLE TENNIS
$764.10

| Ad Your Way | Featured Video | SYWR Special Deals | Started following tag | Featured user |
|---|---|---|---|---|
| OBJECT | OBJECT | OBJECT | OBJECT | OBJECT |
| Recommended since you viewed [ProductName] 3 hours ago | Featured video! 3 hours ago on LA Lakers | Now available for Shop Your Way Rewards members only. | [UserName] started following [TagName]. | Meet [FirstName], A fellow sociate who is also into [Brand], [Tag], [Category], [*********], [Location], [Website], shops in [Brand] and is friends with [Person]. |

FIG. 54

| Answer | Now Trending | Unlocked badge | Recommended by Friend | Deal |

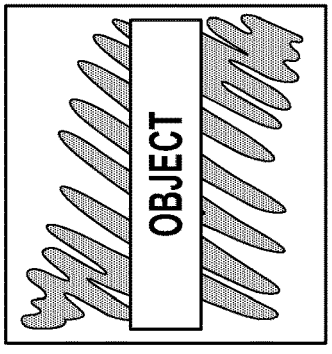 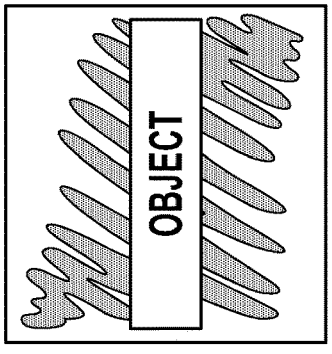 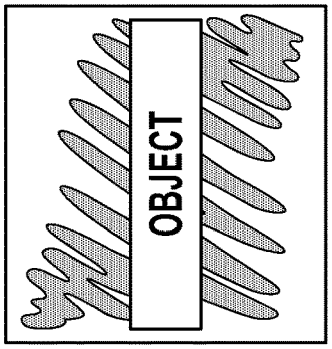 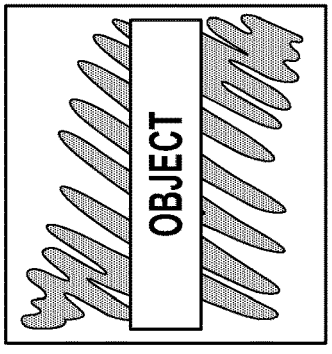 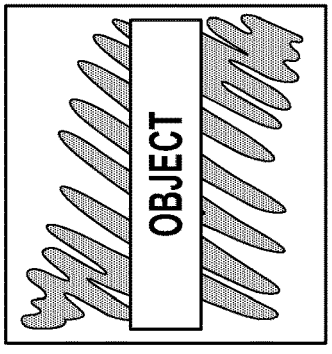

[UserName] answered: The answer text goes here, if it is too long it will be cut, ellipsis will be added and a read more button will allow the user to expand to see the entire answer...
read more Now trending on [TagType]

[UserName] unlocked this badge by writing his 50th review.

Recommended to you by [UserName]

Special Deal from [TagName]

FIG. 55

OBJECT DRIVEN NEWSFEED

CROSS-REFERENCE TO RELATED APPLICATIONS

The present application is a continuation of U.S. application Ser. No. 16/357,592, filed Mar. 19, 2019, which is a continuation of U.S. application Ser. No. 15/652,781, filed Jul. 18, 2017, issued as U.S. Pat. No. 10,235,707, which is a continuation of U.S. application Ser. No. 13/886,065, filed May 2, 2013, issued as U.S. Pat. No. 9,710,844, which makes reference to, claims benefit of, and claims priority to U.S. Provisional Application No. 61/641,329, filed May 2, 2012. The above-identified applications are hereby incorporated herein by reference in their entirety.

FIELD OF THE INVENTION

Certain embodiments of the invention relate to systems and methods that support social networks. More specifically, certain embodiments of the present invention relate to object driven newsfeeds supporting interest-based social networks that aid in the formation of relationships based on similar domains of user interest.

BACKGROUND OF THE INVENTION

The newsfeeds of present day social networks are primarily actor driven, where the actor is the aspect that the user cares about the most, and in which the user's main goal is to socialize. These social networks work great for a social network where the user knows or specifically cares about the people that they interact with.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for the generation of object driven newsfeeds, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 is an illustration of an exemplary newsfeed that may be referred to herein as a "list" or "list mode" newsfeed, showing a number of Objects organized as a single column, where each of the Objects has one or more Stories, and each Story has one or more Comments, in accordance with one representative embodiment of the present invention.

FIG. 3 illustrates the appearance of three exemplary Objects in accordance with a representative embodiment of the present invention.

FIG. 4 is an illustration of an exemplary Object of type "Product" as it may appear in "Simple Product" mode, in accordance with a representative embodiment of the present invention.

FIG. 5 is an illustration of an exemplary Object of type "Product" as it may appear in "Multiple Products" mode, in accordance with a representative embodiment of the present invention.

FIG. 6 is an illustration of an exemplary Object appearing in "Deal" mode, in accordance with a representative embodiment of the present invention.

FIG. 12 is an illustration of an exemplary Object of type "Picture" exhibiting "hover" behavior, in accordance with a representative embodiment of the present invention.

FIG. 13 is an illustration of an exemplary "quick-view" layer for an Object of type "Picture," in accordance with a representative embodiment of the present invention.

FIG. 14 is an illustration of an exemplary Object of type "Video," in accordance with a representative embodiment of the present invention.

FIG. 15 is an illustration of an exemplary "Video" Object in "hover" mode, showing a menu teaser, in accordance with a representative embodiment of the present invention.

FIG. 16 and FIG. 17 illustrate, respectively, an exemplary video player settings dialog and an exemplary video "quick-view" layer, in accordance with a representative embodiment of the present invention.

FIG. 18 is an illustration of an exemplary "Text/Status" Object, in accordance with a representative embodiment of the present invention.

FIG. 31 is an illustration of a "Topical Poll" Object exhibiting "hover" mode behavior before voting has taken place, in accordance with a representative embodiment of the present invention.

FIG. 32 illustrates a "Topical Poll" Object exhibiting "hover" mode behavior after voting has taken place, in accordance with a representative embodiment of the present invention.

FIG. 33 is an illustration of an exemplary Story having three Comments, in accordance with a representative embodiment of the present invention.

FIG. 34 is an illustration of an exemplary Story that similar in many ways to the Story of FIG. 33, but in which more than three Comments have been submitted, in accordance with a representative embodiment of the present invention.

FIG. 35 is an illustration of an exemplary Story that is similar in many ways to the Story of FIG. 33, but in which a consumer/user has chosen to add an additional Comment, in accordance with a representative embodiment of the present invention.

FIG. 36 illustrates the appearance of an exemplary marker that enables the deletion of a Comment from a Story, in accordance with a representative embodiment of the present invention.

FIG. 40 illustrates an exemplary matrix showing the types of Stories that are applicable to various types of Objects, in accordance with one representative embodiment of the present invention.

FIG. 41 illustrates an exemplary matrix showing the types of Stories that may appear in the context of the indicated newsfeeds, in accordance with one representative embodiment of the present invention.

FIG. 43 illustrates an exemplary newsfeed view, in accordance with a representative embodiment of the present invention.

FIG. 51 illustrates another exemplary "Help Me Choose Poll," in accordance with a representative embodiment of the present invention.

FIG. 54 illustrates exemplary "AdYourWay," "Featured Video," "SYWR Special Deals," "Started Following Tag," and "Featured User" Stories, in accordance with a representative embodiment of the present invention.

FIG. 55 illustrates exemplary "Answer," "Now Trending," "Unlocked Badge," "Recommended by Friend," and "Deal" Stories, in accordance with a representative embodiment of the present invention.

DETAILED DESCRIPTION OF THE INVENTION

Figure 1:
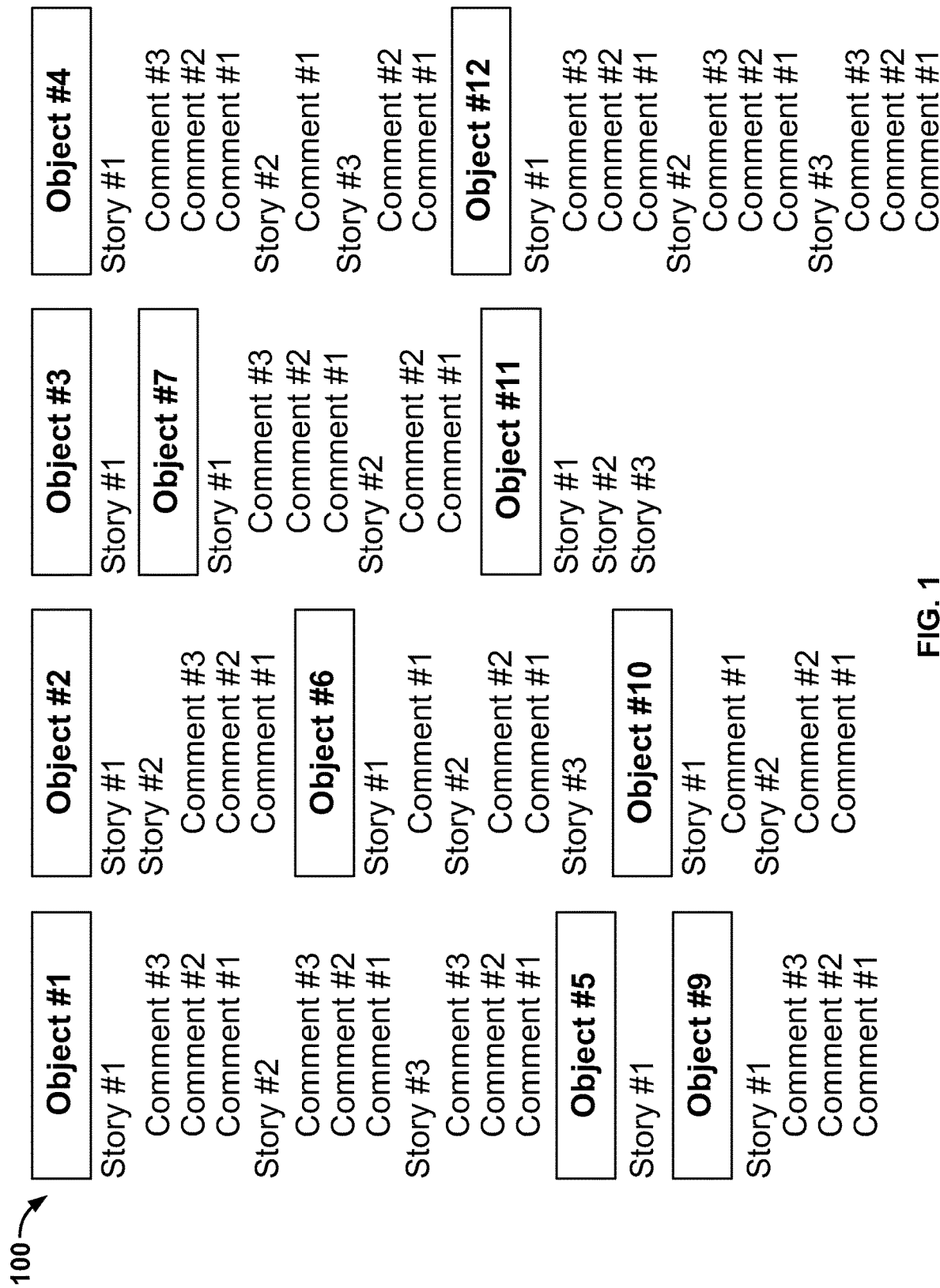
FIG. 1 is an illustration of an exemplary newsfeed that may be referred to herein as a "grid" or "grid mode" newsfeed, having a number of Objects organized in multiple columns, each of the Objects having one or more Stories, where each Story has one or more Comments, in accordance with one representative embodiment of the present invention.

Aspects of the present invention relate to methods and systems used in electronic commerce (i.e., "e-commerce") such as, for example, over the Internet. More specifically, representative embodiments of the present invention relate to methods and systems for presenting, via a space efficient graphical user interface (GUI), an object driven newsfeed of contextual and relevant information to aid a consumer/user in making buying decisions in an e-commerce environment.

The streams of information presented using a representative embodiment of the present invention may be referred herein as "newsfeeds." It is a goal of the present invention to provide a contextual, relevant and visually exciting discovery experience for all the entities and activities available through an e-commerce website or portal. Examples of newsfeeds may include, for example, one that may be referred to as "My Stream" or "Your Stream" that may be tailored for the individual user, and which may, for example, be a feed of things that are new and interesting based on, for example, general popularity among consumers, the social circle of a particular consumer/user, fields of interest to a particular consumer/user, and the locality of a particular consumer/user.

In some representative embodiments, the content of the "My Stream" newsfeed for a user may be tailored or adjusted based on the results of a recent search. For example, if a user were to perform a search for something (e.g., a product or service) using available Internet search engines such as, for example, the Google or Bing search tools, the content of the newsfeed (e.g., "My Stream") may be customized based upon the results of the search. In another representative embodiment, a particular user selectable tab may be provided (e.g., in addition to a tab for "My Stream"/"Your Stream") on a newsfeed page in accordance with the present invention, in which the stream or newsfeed accessible by clicking on/selecting the particular tab is tailored to the results of the user's most recent search of the Internet. In this way, the user may have a "My Stream"/"Your Stream" that may be based on a profile of the user, but may in addition have one (or more) "Search Stream" tab(s) the content of which would automatically be customized based on the result of the most recent search using an Internet search tool.

Another example newsfeed may be referred to as "Popular," which may be a feed of everything that is generally popular across an e-commerce web site, without personalization. Yet another example newsfeed may be referred to herein as "Browsing History," may be a feed of the consumer/user's browsing history and recent actions, and may be available only to the consumer.

Further examples of newsfeeds may include, for example, a newsfeed referred to herein as a "Profile page," which may be a feed of recent actions by a specific person, a newsfeed referred to herein as a "Category page," which may be a feed of category related stories (e.g., new products, questions, catalogs), and a newsfeed referred to herein as a "Product page," which may be a feed of product related stories (e.g., polls/catalogs in which various products are featured, reviews of products, questions about products, and product price changes).

In addition, a representative embodiment of the present invention may provide support for a stream customized by the user, based on responses to questions presented to the user. The user may choose to set up a number of such personalized streams or newsfeeds for various people in their lives such as, for example, their spouse or significant other, their children, their relatives, and their friends. Such streams could be used when shopping for those individuals, and could be customized for each individual by a user simply by providing information such as, by way of example and not limitation, the person's name, the relationship of the person to the user, the age of the person, and answers to a few simply questions regarding interests, brands, styles, and other characteristics of the person.

It should be noted that in a representative embodiment of the present invention, the Stories may overlap between different newsfeeds that a web site offers. For example, a review Story may concurrently appear in a "Homepage," a "Profile page," a "Category page," and "Product page."

The following discussion of aspects of various representative embodiments of the present invention may make reference to the following terms:

The term "Object" may be used herein to refer to a web site entity or simpler piece of data that consists of something "interesting" to a user. Examples of an "Object" may include a "Product," a "Question," a "Status Message," a "Deal," or a "Tag entity."

The term "Story" may be used herein to refer to a description of an action, that may be active or passive, and that may be performed on/by the "Object". One example of a "Story" may include actions where a "Person" added a "Product" to a "Catalog," and the "Product" became a top seller.

The term "Story Group" may be used herein to refer to a group of "Stories" that occurred around a specific "Object" in a given context and time frame.

The term "Comment" may be used herein to refer to text submitted by a consumer/user as a response to a "Story." A "Comment" may be associated with a specific "Story" instance. For example, a "Comment" by consumer "John Doe" may appear as part of an item as "John Doe: OMG! This is so cool."

The term "Like" may be used herein to refer to two types of "Likes" such as, for example, a "Like an Object," in which a consumer/user adds an item to a "Things I like" catalog, creating a "User liked [Object]," and a "Like a Story," in which a consumer/user notifies the creator of a "Story" that the consumer/user likes his/her activity of the Story. In a representative embodiment of the present invention, others looking at the "Story" may be able to see those consumers/users that liked the Story.

The term "Share" may be used herein to refer to the act of initiating the communication of information with other users.

The term "Tag" may be used herein to refer to an alphanumeric character string that may represent a certain subject matter of interest to users, and may be associated with an Item, Object, and/or Story, by a user, or by a system such as that described herein. The "Tag" may, for example, be used to enable searches for the Items, Objects, and/or Stories associated with the Tag having a certain string of alphanumeric characters The term "Publishing Tool" may be used herein to refer to a user device employed to submit user input.

As utilized herein, the terms "exemplary" or "example" means serving as a non-limiting example, instance, or illustration. As utilized herein, the term "e.g." introduces a list of one or more non-limiting examples, instances, or illustrations.

A representative embodiment of the present invention may employ relevancy algorithms to personalize the newsfeeds.

It should be noted that the exact sizes, colors, and fonts to be used for the text and graphics of the user interface (IU) of a newsfeed are not provided herein, as these may chosen in accordance with graphic designs and user interface guidelines of a specific embodiment, and such specific choices do not depart from the scope and spirit of the present invention.

In a representative embodiment of the present invention, a newsfeed may provide a consumer/user with a stream of information about a collection of items or Objects. The Objects of a newsfeed may be organized in chronological order, where information about the latest (i.e., most recently)

updated Object is, for example, positioned at the top of the Graphical User Interface (GUI) (e.g., web page). The date/time of the last (i.e., most recent) update for an Object may be determined by the latest (i.e., most recent) action made on/by one of the Stories found under this Object (e.g., a new Story or new Comment added under an existing one).

In a representative embodiment of the present invention, Stories aggregated under an Object may, for example, be organized by chronological order, in which the latest (i.e., most recently) updated Story is positioned at the top. The date/time of a Story may be determined by the last (i.e., most recent) action made on/by the Story (e.g., the date/time that a new Story was created or a new Comment added).

It should be noted that in a representative embodiment of the present invention, a "Like" action on a Story may not change the time stamp of the Story, and therefore may not change the position of the Story in the newsfeed.

In some representative embodiments of the present invention, Comments may be organized from oldest (at the top of a list of Comments) to the newest (at the bottom of the list of Comments) for each Story.

FIG. 1 is an illustration of an exemplary newsfeed 100 that may be referred to herein as a "grid" or "grid mode" newsfeed, having a number of Objects organized in multiple columns, each of the Objects having one or more Stories, where each Story has one or more Comments, in accordance with one representative embodiment of the present invention. In the example of FIG. 1, the ordering of Objects in each column, the ordering of Stories for each Object, and the ordering of Comments related to each Story, are arranged such that the lower the number of the Object, the Story, or the Comment, the newer or more recent the Object, the Story, or the Comment is. It should be noted that the term "item" may be used herein to refer collectively to an image of an Object, any Stories for the Object, and any consumer/user Comments for the Stories of the Object.

In a representative embodiment of the present invention, such as the exemplary embodiment shown in FIG. 1, the number of columns into which the Objects may be arranged may be configurable by the consumer/user. Therefore, the width of each column containing the Objects of the grid newsfeed 100 may also be determined by the consumer/user. The grid mode newsfeed of the present invention allows for a more visual experience of the feed by the consumer/user. In a representative embodiment of the present invention, the images of the Objects may take up most of the available space for a displayed item. The width of an item (i.e., that of the Object, Stories, and Comments) may be limited only by the fixed width of the column of the grid. In a representative embodiment of the present invention, an item in a grid mode newsfeed may be displayed without a height limitation. In a representative embodiment of the present invention, specific limitations may apply per Object or Story type, as will be described in further detail, below.

FIG. 2 is an illustration of an exemplary newsfeed 200 that may be referred to herein as a "list" or "list mode" newsfeed, showing a number of Objects organized as a single column, where each of the Objects has one or more Stories, and each Story has one or more Comments, in accordance with one representative embodiment of the present invention. A list mode newsfeed allows for a more informational and chronological experience of the feed. Each Object may contain a significant amount of information and may appear somewhat like a Quickview version of that Object. The nature of a Quickview version of an Object will be discussed further below.

In a representative embodiment of the present invention, the width of an item may be dynamically determined by the available width of the display, and may depend on the device and resolution employed by the consumer/user to access the web site/portal. In a representative embodiment of the present invention, an item in a list mode newsfeed may be displayed without a height limitation.

In a representative embodiment of the present invention, Objects may have certain common characteristics that apply for all Objects. For example, an Object may host multiple Stories under the Object, and may operate in a minimum of two modes, which may be referred to herein as "Simple" mode and "Hover" mode.

In "Simple" mode, an Object is displayed without overlays, layers, or popovers, and instead simply shows the images, text, and graphics of the Object.

In "Hover" mode, a menu may be displayed that offers a consumer/user basic actions that may include, for example, the ability to share the Object with others, the ability to report the Object, and the ability to hide the Object. An Object may switch from "Simple" mode to "Hover" mode once a consumer/user continuously positions or "hovers" the cursor over the area of the Object for a minimum amount of time such as, for example, 100 milliseconds. The Object may switch from "Hover" mode back to "Simple" mode once the consumer/user moves the cursor outside of the area of the "Object" for another minimum amount of time. The minimum amount of time "hovering" over the Object before "Hover" mode is entered, and the minimum amount of time the cursor is required to be outside of the area of the Object before "Hover" mode ends and "Simple" mode is active, may be configurable by the user. Further details about hover behavior and its implication will be discussed below for a variety of types of Objects.

In a representative embodiment of the present invention, each Object may have what may be referred herein as a "mini-menu" having a set of basic actions. Some Objects may also have an extended list of actions in addition the basic set. A "menu teaser," which may be displayed as, for example, a downward facing arrow, may be made visible when "Hover" mode is active for an Object. A consumer/user may click on the menu teaser to open the mini-menu, displaying the list of actions available for the associated Object. In a representative embodiment of the present invention, the actions display in the mini-menu may be divided into two main sections, a prominent section at the top of the mini-menu, listing common or promoted actions that may be selected, and a smaller section at the bottom of the mini-menu, listing advanced or secondary actions available for selection. The basic actions may include, for example, a "Share it" action, which opens a "share" dialog for the specific Object. This action may reside in the top, prominent section of the mini-menu. The basic actions may also include a "Hide-It" action, which opens a "hide" dialog, if possible with pre-populated selection based on the Object. In addition, the basic actions may include a "Report it" action, which may open a "report an object" dialog.

FIG. 3 illustrates the appearance of three exemplary Objects in accordance with a representative embodiment of the present invention. The first Object 300 may correspond to "Simple" mode, the second Object 310 may correspond to Object 300 when in "Hover" mode showing a menu teaser 322, and the third Object 320 may correspond to Object 310 following clicking of the menu teaser 322 by a consumer/user.

In a representative embodiment of the present invention, some Objects may have a "Quickview" mode. The Quickview mode may comprise a visible layer that appears in front of the Object. Such a Quickview layer may appear directly above the Object to avoid a "shivering" effect. The Quickview layer may remain open for as long as the consumer/user hovers above the Quickview layer, and may disappear once the consumer/user moves the cursor outside of the Quickview layer area for a minimum amount of time such as, for example, 300 ms. This minimum amount of time may be configurable by the user.

In a representative embodiment of the present invention, Objects may be of any of a number of types. For example, one type of Object may be a "Product" Object. An Object of type "Product" may be appear in a "Simple Product" mode, a "Multiple Products" mode, a "Deal" mode, and a "Quickview" mode. Additional details about Objects of type "Product" are provided in the following discussion.

FIG. 4 is an illustration of an exemplary Object 400 of type "Product" as it may appear in "Simple Product" mode, in accordance with a representative embodiment of the present invention. An Object in "Simple Product" mode may, for example, include a product image 410, a product name 420, and a product price 430. The product image may be displayed in the largest possible size, subject to the width of the newsfeed column, and may be displayed in a manner that does not stretch the image beyond its natural size. A product image smaller than the column width may be centered within the column width. Clicking upon the area of the product image, excluding the area of any menu teaser or mini-menu, may result in the display of a more detailed product page for the product show by the product image 410. The product name 420 displayed in "Simple Product" mode may be displayed in full, and a consumer/user clicking upon the product name 420 may result in the display of a product page for the product. The product price 430 displayed in "Simple Product" mode may be displayed in full, down to the number of cents, and may include a currency symbol.

FIG. 5 is an illustration of an exemplary Object 500 of type "Product" as it may appear in "Multiple Products" mode, in accordance with a representative embodiment of the present invention. An Object in "Multiple Products" mode may include, for example, the behaviors described above for an Object in "Simple Products" mode. In addition, an Object in "Multiple Products" mode may include, for example, two or three "thumbnail" images such as product thumbnail images 510, 512, 514 of FIG. 5. One thumbnail image such as, for example, thumbnail image 510, may be selected by default, and displayed in full detail and color, for example, with the corresponding product name 530 and product price 540 displayed directly below the product image 520, while the remaining thumbnail images (e.g., 512 and 514) may be "grayed out," obscured, hazed, or of lesser color, contrast, or detail. A consumer/user clicking upon a non-selected thumbnail image such as thumbnail images 512, 514 of FIG. 5 results in selection of the thumbnail image, and results in display of the product image 520, along with the corresponding product name 530 and product price 540, which may be displayed directly below the product image 520, as shown in the example of FIG. 5.

FIG. 6 is an illustration of an exemplary Object 600 appearing in "Deal" mode, in accordance with a representative embodiment of the present invention. In a representative embodiment of the present invention, the "Deal" mode may coexist with either of the "Single Product" mode or the "Multiple Products" mode of an Object. As illustrated in the example of FIG. 6, an Object of type "Product" in "Deal" mode may include a special stamp or graphic that is added or "fused" to the product image, shown in FIG. 6 as deal stamp 610. In a representative embodiment of the present invention, the special stamp or graphic for an Object may appear only in the larger product image such as the product image 620 of FIG. 6, and may not appear in a thumbnail image of an Object of type "Product" in "Multiple Products" mode, such as the thumbnail images 510, 512, 514 of FIG. 5. The product price of an Object in "Deal" mode may be displayed with a "strike-though" and a "sale price" may also be displayed, as shown by product price 630. For Objects of type "Product" in "Multiple Products" mode, a deal stamp such as the deal stamp 610 may change when the product selected by the consumer/user changes.

In a representative embodiment of the present invention, the behavior of "Hover" mode may be the same for "Single Product," "Multiple Products," and "Deal" mode. That is, a consumer/user hovering the cursor for at least a minimum amount of time over a product image such as the product image 410 of FIG. 4, the product image 520 of FIG. 5, or the product image 620 of FIG. 6 may result in appearance of a menu teaser that when selected by clicking may result in the display of a mini-menu. Clicking the mini menu may reveal the set of basic actions described above, and in addition may display a menu option "Add to catalog," and an "Add to cart" option, if the product displayed by the product image is able to be added to a shopping cart, which may be referred to herein as being "cartable."

Figure 7:
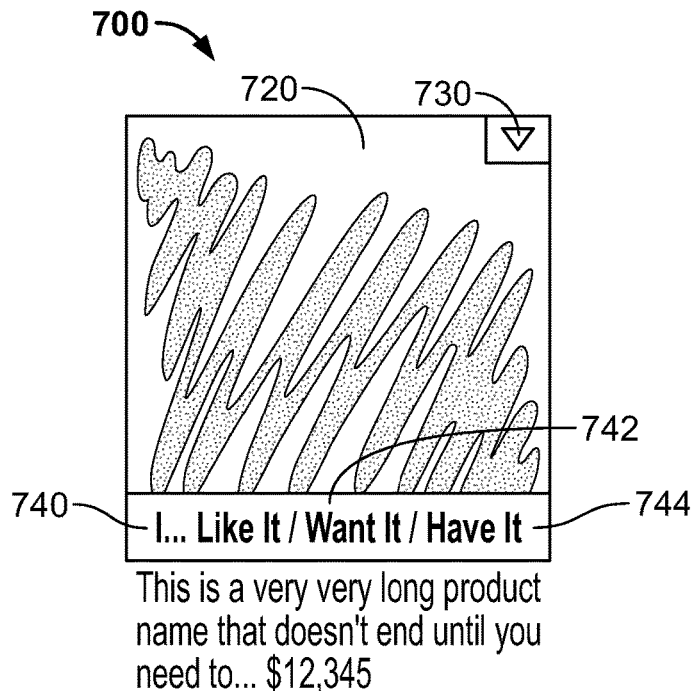
FIG. 7 illustrates an exemplary Object of type "Product" which includes a number of additional consumer/user actions, in accordance with a representative embodiment of the present invention.

FIG. 7 illustrates an exemplary Object 700 of type "Product" which includes a number of additional consumer/user actions, in accordance with a representative embodiment of the present invention. The Object 700 of FIG. 7 includes a product image 720 and is shown with a menu teaser 730. In addition, the Object 700 illustrates a "Like it" option 740, which may cause a product to be added to a "Things I like" catalog. In a representative embodiment of the present invention, if the displayed product is already in the "Things I like" catalog for the consumer/user, an indication of that condition may, for example, be displayed, and display and/or selection of the "Like it" option may be disabled.

In addition, the Object 700 illustrated in FIG. 7 includes a "Want it" option that, when clicked, may add the illustrated product to a "My Wishlist" catalog. In a representative embodiment of the present invention, if the illustrated product is already in the "My Wishlist" catalog for the consumer/user, an indication of that condition may, for example, be displayed, and selection of the "Want it" option, may be disabled.

The Object 700 of FIG. 7 also illustrates a "Have it" option, which when clicked may add the illustrated product to a "My Things" catalog. In a representative embodiment of the present invention, if the illustrated product is already in the "My Wishlist" catalog for the consumer/user, an indication of that condition may, for example, be displayed, and selection of the "Have it" option may be disabled.

Finally, in accordance with a representative embodiment of the present invention, clicking upon the product image or product name features of the Object 700 (not shown in FIG. 7) may open a "quick-view" mode of the Object 700. Further details of "quick-view" mode are described below.

Figure 8:
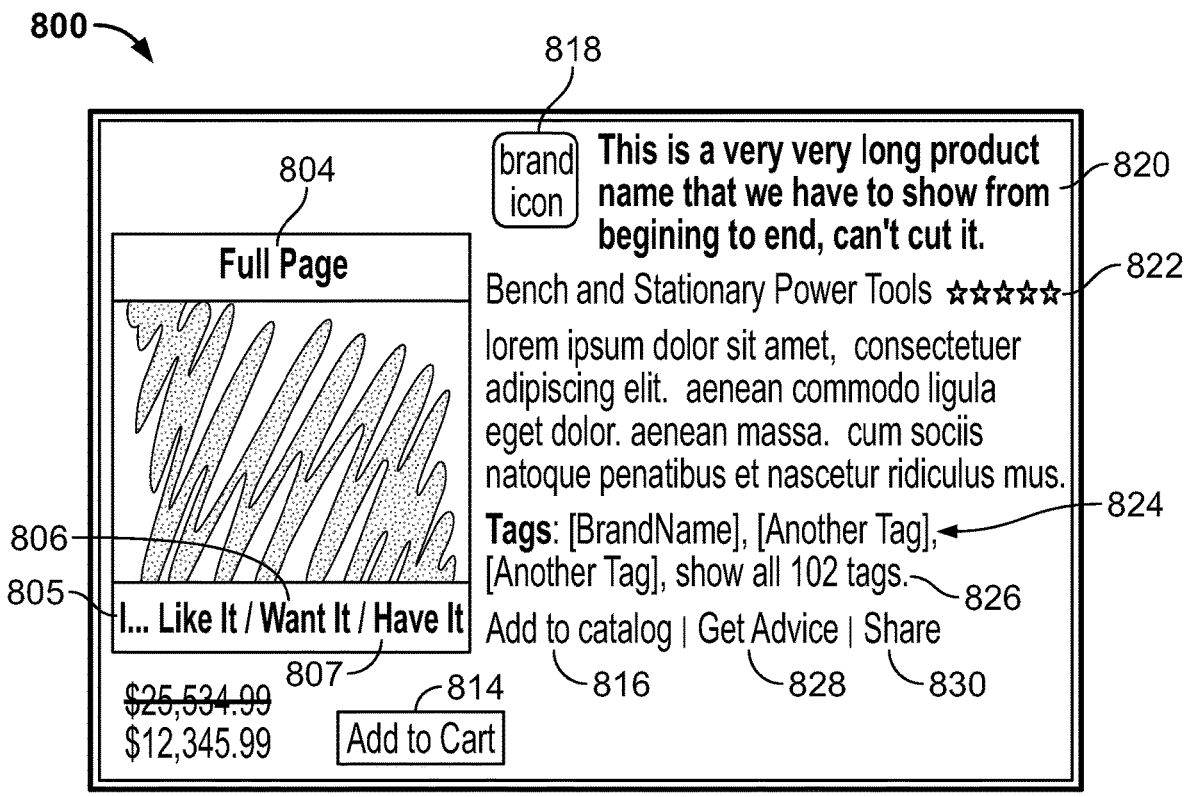
FIG. 8 is an illustration of a "quick-view" layer, in accordance with a representative embodiment of the present invention.

FIG. 8 is an illustration of a "quick-view" layer 800, in accordance with a representative embodiment of the present invention. As shown in the example of FIG. 8, the "quick-view" layer 800 of FIG. 8 includes a product description 801 that may include lines of text describing the product shown by a product image 802. If the available text of the product description exceeds a certain number of lines (e.g., five), the product description 801 may, for example, be truncated, and may end with a clickable option 803 such as, for example, " . . . read more." Clicking on the " . . . read more" option 803 may result in the display of a product page with a more complete description of the product.

The quick-view layer 800 may also include a "Full Page" option 804, which when clicked may result in the display of a detailed product page. The "quick-view" layer 800 of FIG. 8 also includes "Like it"/"Want it"/"Have it" options 805, 806, 807, which when clicked may result in actions similar to those described above for the similarly named options of FIG. 7. In addition, the "quick-view" layer 800 includes a product price 810 and a product name 812 as described above with respect to FIG. 4. The "quick-view" layer 800 as illustrated includes an "Add to Cart" option 814 and an "Add to Catalog" option 816, which when clicked may, for example, result in the actions described above for the similarly named options of FIG. 7.

In addition to the above, FIG. 8 illustrates a brand icon 818 that may be displayed if such a graphic is available. Clicking on the brand icon 818 may result in display of a page for the indicated brand. The "quick-view" layer 800 also includes a category name 820 that indicates a category to which the product belongs. Clicking on the category name 820 may, for example, result in the display of a category page. The "quick-view" layer 800 may include a rating 822 such as, for example, a rating indicating one to five stars.

The "quick-view" layer 800 may also show a list of tags 824 that may include, for example, the five most relevant tags. Selection of the tags to be displayed on the "quick-view" layer 800 may be based on a relevancy algorithm. If more than five tags exist for the displayed product, a representative embodiment of the present invention may show only a subset (e.g., three) of the tags, followed by a "show all [Total number of tags] tags" option 826. Clicking the "Show all [Total number of tags] tags' option 826 may cause the cause the display of an expanded list of tags having the same structure as the list of tags 824, and the height of the "quick-view" layer 800 may be adjusted accordingly.

The "quick-view" layer 800 may also include a "Get Advice" option 828, which when clicked may result in the opening of a "Get Advice" dialog, and the closing of the "quick-view" layer 800. The "quick-view" layer 800 may also include a "Share" option 830, which may result in sharing with another consumer/user of all or only a portion of the information shown in the "quick-view" layer 800.

In a representative embodiment of the present invention, an Object of a newsfeed may also be of a "Picture" type. The following discussion provides additional details of this aspect of the present invention.

Figure 9:
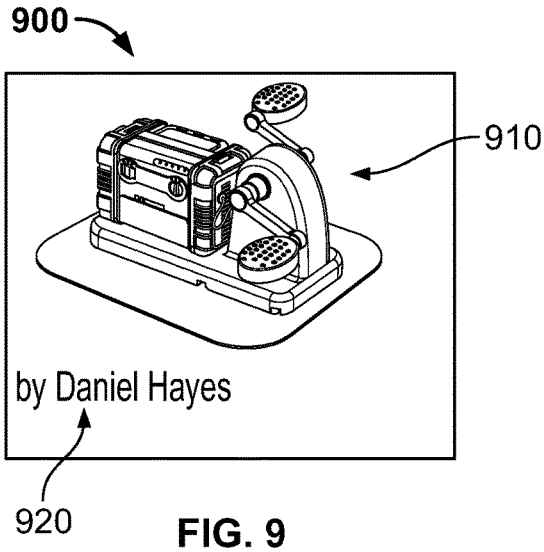
FIG. 9 is an illustration of an exemplary Object of type "Picture," in accordance with a representative embodiment of the present invention.

FIG. 9 is an illustration of an exemplary Object 900 of type "Picture," in accordance with a representative embodiment of the present invention. As can be seen in FIG. 9, such an embodiment may include a picture 910, which may be the largest image possible subject to the newsfeed column width, and arranged so that the image is not stretched beyond its natural size. Clicking on the picture 910 may result in display of a picture "quick-view" layer, which is described below with respect to FIG. 13. In addition, the Object 900 may include a line of text 920 indicating the name of the person/Tag that uploaded the image of the picture 910. Clicking the person/Tag may result in display of a corresponding profile/Tag page.

Figure 10:
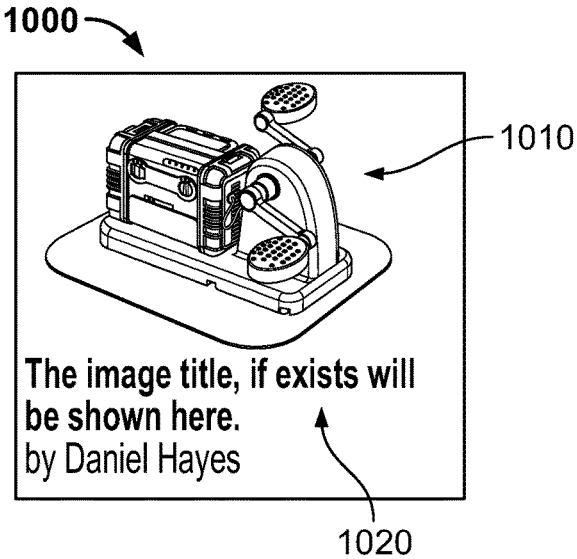
FIG. 10 is an illustration of another exemplary Object of type "Picture," in accordance with a representative embodiment of the present invention.

FIG. 10 is an illustration of another exemplary Object 1000 of type "Picture," in accordance with a representative embodiment of the present invention. The Object 1000 of FIG. 10 is similar to the Object 900 of FIG. 9 in that it includes a picture 1010. The Object 1000, however, also includes a title 1020. Clicking on the title 1020 may result in the display of a picture "quick-view" layer, which is described in further detail below with respect to FIG. 13.

Figure 11:
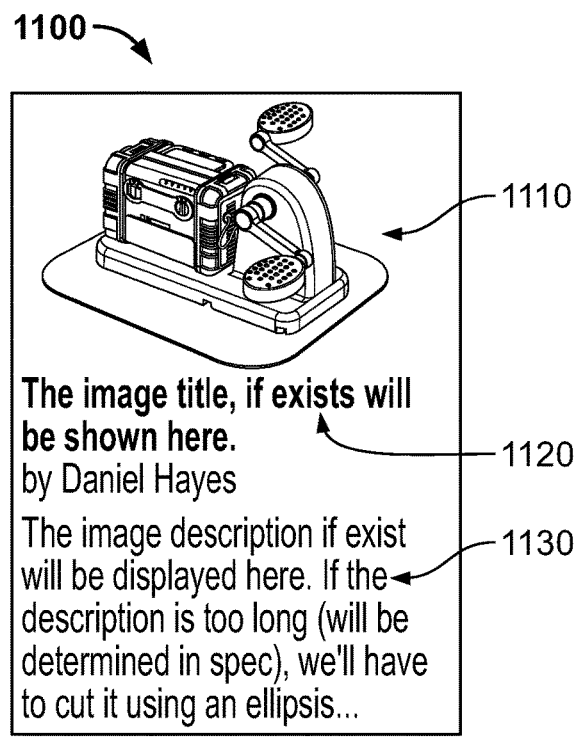
FIG. 11 is an illustration of yet another exemplary Object of type "Picture," in accordance with a representative embodiment of the present invention.

FIG. 11 is an illustration of yet another exemplary Object 1100 of type "Picture," in accordance with a representative embodiment of the present invention. The Object 1100 of FIG. 11 is similar to the Object 1000 of FIG. 10, in that it includes a picture 1110 and a title 1120, but in addition, the Object 1100 also displays a description 1130 below the person/Tag that uploaded the image of the picture 1110. In a representative embodiment of the present invention, clicking upon the description 1130 may not have any effect (i.e., it may not be "clickable").

FIG. 12 is an illustration of an exemplary Object 1200 of type "Picture" exhibiting "hover" behavior, in accordance with a representative embodiment of the present invention. The Object 1200 may correspond to an Object such as the Object 1100 of FIG. 11 when a consumer/user hovers over the Object 1200 by positioning the cursor in the area of the picture 1210 for at least minimum amount of time, which may cause the menu teaser 1220 to appear. Clicking on the menu teaser 1220 may result in the display of a list of options that may include the basic options described above. In addition, the mini-menu of an Object of type "Picture" may include, for example, an "Add to catalog" option, which when clicked may result in an "Add to catalog" dialog, as previously described above.

FIG. 13 is an illustration of an exemplary "quick-view" layer 1300 for an Object of type "Picture," in accordance with a representative embodiment of the present invention. As shown in FIG. 13, the exemplary "quick-view" layer 1300 includes an image or picture 1302, which may be a larger version of a picture such as the pictures 1010, 1110, 1210 described above with respect to FIGS. 10, 11, and 12. In addition, the "quick-view" layer 1300 of FIG. 13 includes a title 1304 of the picture 1302, and a line of text 1306 such as, for example, "Added by [person/TagName]," where [person/TagName] may be the first and/or last name, or a tag, identifying the person or entity that added the Object Clicking on the line of text 1306 may result in the display of a corresponding page. The "quick-view" layer 1300 may also include a list of tags 1308 such as the list of tags 824 described above with respect to FIG. 8, for example. Similar to the action described above with respect to FIG. 8, the height of the "quick-view" layer 1300 may be adjusted, depending upon the total number of tags displayed.

In addition to the features already described, the "quick-view" layer 1300 may include an "Add to catalog" option 1310, which may, for example, operate in a manner similar to that of the "Add to catalog" options described above with respect to FIGS. 6, 8, and 12. The "quick-view" layer 1300 may also include a "Share" option 1312, which may, for example, result in sharing of information with another consumer/user of all or only a portion of the information shown in the "quick-view" layer 1300.

In a representative embodiment of the present invention, an Object of a newsfeed may be of a type referred to herein as a "Video" Object. The following discussion provides additional details of this aspect of the present invention.

FIG. 14 is an illustration of an exemplary Object 1400 of type "Video," in accordance with a representative embodiment of the present invention. As can be seen in FIG. 14, such an embodiment may include a video thumb or thumbnail 1402, which may be represent a video sequence for viewing. The video thumb 1402 may be the largest image possible subject to the newsfeed column width, and may be arranged so that the image of the video thumb 1402 is not stretched beyond its natural size. The video thumb 1402 may be centered, if smaller than the width of the newsfeed column. Clicking on the area of the video thumb 1402 (i.e., in an area other than that of the menu teaser or mini-menu) may result in the display of a video "quick-view" layer, which is described below with respect to FIGS. 16 and 17. In addition, the Object 1400 may include a title 1404 that displays the uncut (i.e., unabbreviated or full) title of the "Video" Object 1400, and a line of text 1406 such as, for example, "added by [Person/Tag]" indicating the name of the person/Tag that uploaded the video represented by the video thumb 1402. Clicking a person/Tag displayed in line of text 1406 may result in display of a corresponding profile/Tag page. In a representative embodiment of the present invention, if the video was not added by a person/Tag, the line of text 1406 may not be displayed.

FIG. 15 is an illustration of an exemplary "Video" Object 1500 in "hover" mode, showing a menu teaser 1502, in accordance with a representative embodiment of the present invention. As previously described above, a menu teaser such as the menu teaser 1502 of FIG. 15 becomes visible when a user continuously hovers the cursor over an area of the Object 1500 such as, for example, the video thumb 1504, for a minimum period of time (e.g., 100 ms.). Clicking on the menu teaser 1502 may result in the display of a mini-menu (not shown in FIG. 15), similar to the mini-menus described above. In addition to the basic options previously described above, the mini-menu of the "Video" Object 1500 may, for example, also include an "Add to catalog" option (not shown) that operates in the manner described above with respect to FIGS. 8, 12, and 13, for example.

FIG. 16 and FIG. 17 illustrate, respectively, an exemplary video player settings dialog 1600 and an exemplary video "quick-view" layer 1700, in accordance with a representative embodiment of the present invention. As described above, clicking on the area of the video thumb 1402 (i.e., other than the area of the menu teaser or mini-menu) of FIG. 14 may result in the display of a video "quick-view" layer, such as that shown in FIG. 17. As a part of the display of the video "quick-view" layer 1700, a representative embodiment of the present invention may first display a video player settings dialog 1600 as shown in FIG. 16. The video player settings dialog 1600 permits a consumer/user to select parameters and settings such as, for example, a check box 1602 to request that suggested videos be displayed when the "Video" Object 1400 finishes, a check box 1604 that requests that a particular protocol (e.g., "https") be used, a check box 1606 that requests that a "privacy-enhanced" mode be employed, and a check box 1608 that requests that old embed code be used. In addition, the video player settings dialog 1600 permits the consumer/user to select the resolution to be used for the display of the video information associated with the "Video" Object 1400, for example.

FIG. 17 illustrates an exemplary video "quick-view" layer 1700, in accordance with a representative embodiment of the present invention. The video "quick-view" layer 1700 may include an image or picture 1702, which may, for example, be a larger version of a video thumb described above with respect to FIG. 14. In addition, the video "quick-view" layer 1700 includes a title 1704 of the picture 1702, and a line of text 1706 such as, for example, "Added by [person/TagName]." Clicking on the line of text 1706 may result in the display of a corresponding page. The video "quick-view" layer 1700 may also include a list of tags 1708 such as the list of tags 824 described above with respect to FIG. 8, for example. Similar to the action described above with respect to FIG. 8, the height of the video "quick-view" layer 1700 may be adjusted, depending upon the total number of tags displayed.

In addition to the features already described, the video "quick-view" layer 1700 may include an "Add to catalog" option 1710, which may operate in a manner similar to that of the "Add to catalog" options described above with respect to FIGS. 6, 8, and 12. The video "quick-view" layer 1700 may also include a "Share" option 1712, which when clicked/selected by a consumer/user may result in the sharing with another consumer/user of all or only a portion of the information shown in the "quick-view" layer 1700.

In a representative embodiment of the present invention, an Object may also be of a type referred to herein as a "Text/Status" Object. The following discussion provides additional details of this aspect of the present invention.

FIG. 18 is an illustration of an exemplary "Text/Status" Object 1800, in accordance with a representative embodiment of the present invention. The "Text/Status" Object 1800 may include, for example, a text block 1802 showing one or more lines of text, which may begin, for example, with a large quote mark that appears in the upper left corner. The text of the text block 1802 may be in a particular font (e.g., an italic font), and the lines of the text block 1802 may not be enabled for selection by clicking by the consumer/user. In addition, the "Text/Status" Object 1800 may include a line of text 1820 indicating the name of the person/Tag (e.g., entity) that wrote/submitted the text of the text block 1802. Clicking the person/Tag may result in display of a corresponding profile/Tag page. If the amount of text in the text block 1802 exceeds a certain amount (e.g., 1000 characters), the text of the text block 1802 may be truncated or cut, and a short text string such as, for example, "read more . . . ," representing a user selectable text expand option may be placed at the end of the text block 1802.

Figures 19, 20, 21:
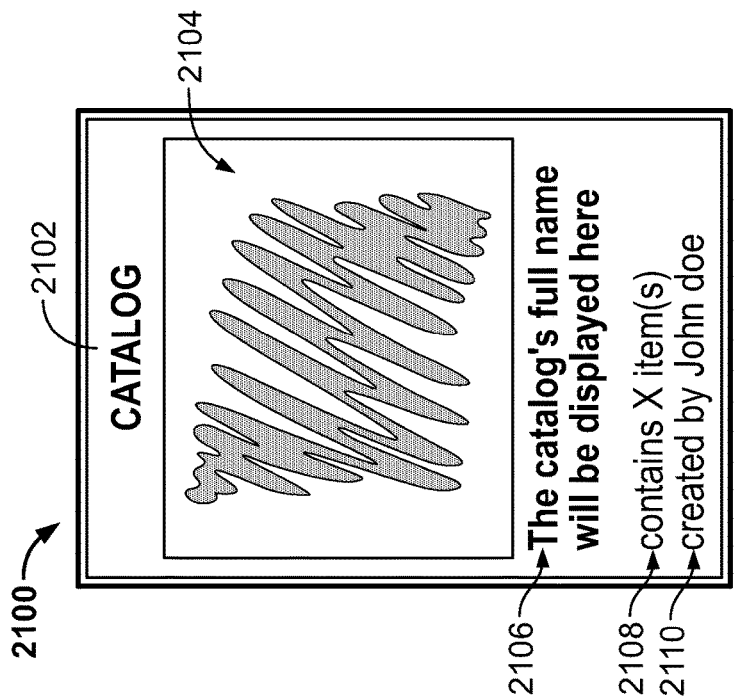
FIG. 19 illustrates an exemplary "Text/Status" Object in which the amount of text in a text block exceeds a certain amount, in accordance with a representative embodiment of the present invention.
FIG. 20 illustrates an exemplary "Text/Status" Object exhibiting "hover" mode behavior, in accordance with a representative embodiment of the present invention.
FIG. 21 illustrates an exemplary "Catalog" Object in what may be referred to herein as "Standard" mode, in accordance with a representative embodiment of the present invention.

FIG. 19 illustrates an exemplary "Text/Status" Object 1900 in which the amount of text in a text block 1902 exceeds a certain amount, in accordance with a representative embodiment of the present invention. As shown in FIG. 19, the text of a text block 1902 is followed by a short text string 1904 that prompts a user to "read more . . . " by clicking on/selecting the short text string 1904. Clicking on/selecting the short text string 1904 may result in the expansion in the display of the full text corresponding to that display in truncated or shortened form in the text block 1802 of "Text/Status" Object 1800, for example. In a representative embodiment of the present invention, the expanded or non-truncated form of the text is shown in the same format and location in the newsfeed as the truncated or shortened text. Once expanded, a text block may not be able to be returned to the truncated form without the consumer/user refreshing the page displaying the newsfeed.

FIG. 20 illustrates an exemplary "Text/Status" Object 2000 exhibiting "hover" mode behavior, in accordance with a representative embodiment of the present invention. The illustration of FIG. 20 shows the appearance of a menu teaser 2002 that appears following a consumer/user continuously positioning the cursor over an area of the "Text/Status" Object, excluding that of the menu teaser 2002 itself, for a minimum period of time. In a representative embodiment of the present invention, clicking on/selecting the menu teaser 2002 may result in the display of a mini-menu listing a basic set of options, as described above.

In a representative embodiment of the present invention, an Object may also be of a type referred to herein as a "Catalog" Object. The following discussion provides additional details of this aspect of the present invention.

FIG. 21 illustrates an exemplary "Catalog" Object 2100 in what may be referred to herein as "Standard" mode, in accordance with a representative embodiment of the present invention. As shown in FIG. 21, the "Standard" mode "Catalog" Object 2100 may include a static header 2102 indicating that the Object 2100 relates to a "Catalog," and a single large image 2104. The image 2104 is preferably a "Tag-able" visual or standard catalog cover, if available, or an image of the latest added item (i.e., the item most recently added to the catalog represented by the "Catalog" Object 2100). Clicking on/selecting the image 2104 may result in the display of a corresponding page of the catalog.

The "Catalog" Object 2100 of FIG. 21 also comprises a catalog name 2106 that displays the full name of the catalog represented by the "Catalog" Object 2100. Clicking on the catalog name 2106 may result in the display of the page for the corresponding catalog. A "Catalog" Object may also include an indication of the number of items in the catalog, shown in FIG. 21 as item count string 2108. The "Catalog" Object 2100 may in addition include an author string 2110 indicating, for example, that the "Catalog" Object 2100 was "created by [Tag/PersonName]." Clicking on/selecting the author string 2110 may result in the display of a page corresponding to the indicated "Tag/Person."

Figure 22:
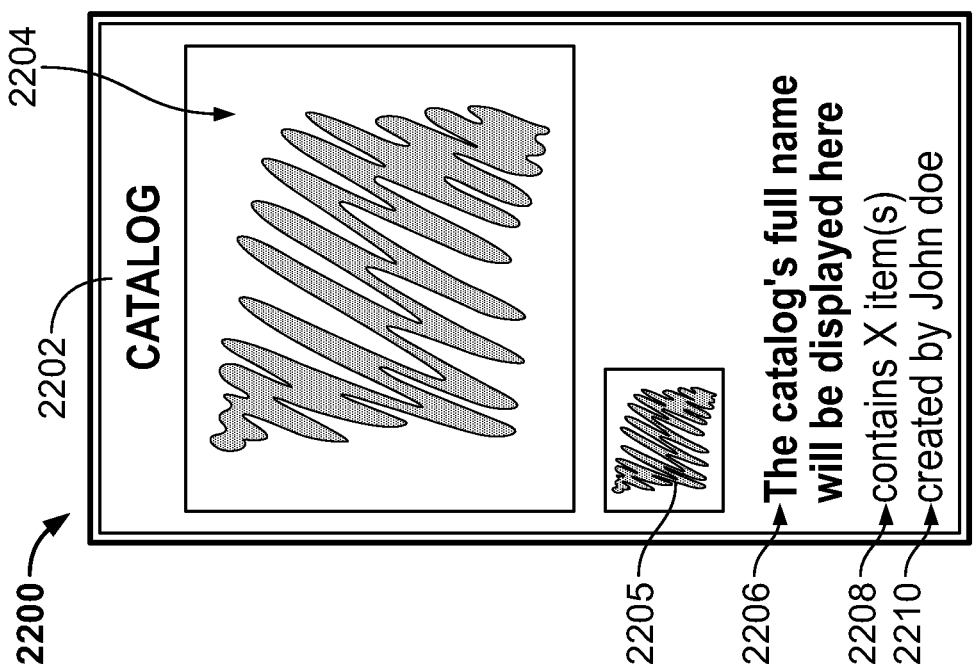
FIG. 22 illustrates an exemplary "Catalog" Object in "Standard" mode, in which the associated catalog contains two items, in accordance with a representative embodiment of the present invention.

FIG. 22 illustrates an exemplary "Catalog" Object 2200 in "Standard" mode, in which the associated catalog contains two items, in accordance with a representative embodiment of the present invention. As shown in FIG. 22, the "Standard" mode "Catalog" Object 2200 may include a static header 2202 indicating that the Object 2200 relates to a "Catalog," a single relatively larger image 2204 representing a first catalog item, and a second relatively smaller image 2205 below and aligned to the left, representing a second catalog item. As in the example of FIG. 21, the relatively larger image 2204 is preferably a "Tag-able" visual or standard catalog cover, if available, or an image of the latest added item (i.e., the item most recently added to the catalog represented by the "Catalog" Object 2200). Clicking on the image 2204 may result in the display of a corresponding page of the catalog. The consumer/user is also enabled to click on/select the second relatively smaller image 2205, which may result in the display of a catalog page corresponding to the second item.

The "Catalog" Object 2200 of FIG. 22 also comprises a catalog name 2206 that displays the full name of the catalog represented by the "Catalog" Object 2200. Clicking on/selecting the catalog name 2206 may result in the display of the page for the corresponding catalog. A "Catalog" Object may also include an indication of the number of items in the catalog, shown in FIG. 22 as item count string 2208. The "Catalog" Object 2200 may in addition include an author string 2210 indicating, for example, that the "Catalog" Object 2200 was "created by [Tag/PersonName]." Clicking on the author string 2210 may result in the display of a page corresponding to the indicated "Tag/Person."

Figure 23:
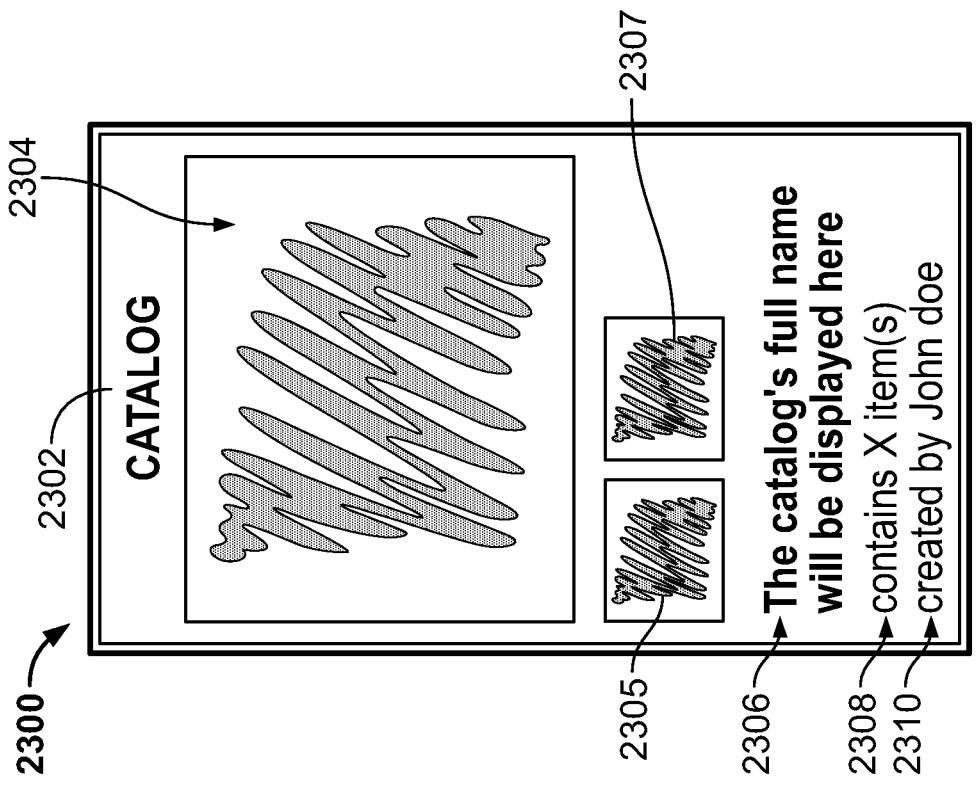
FIG. 23 illustrates an exemplary "Catalog" Object in "Standard" mode, in which the associated catalog contains three items, in accordance with a representative embodiment of the present invention.

FIG. 23 illustrates an exemplary "Catalog" Object 2300 in "Standard" mode, in which the associated catalog contains three items, in accordance with a representative embodiment of the present invention. As shown in FIG. 23, the "Standard" mode "Catalog" Object 2300 may include a static header 2302 indicating that the Object 2300 relates to a "Catalog," a single relatively larger image 2304 representing a first catalog item, a second, relatively smaller image 2305 below and aligned to the left, representing a second catalog item, and a third image 2307 similar to the second image 2305, below and centered, representing a third catalog item. As in the example of FIG. 22, the relatively larger image 2304 is preferably a "Tag-able" visual or standard catalog cover, if available, or an image of the latest added item (i.e., the item most recently added to the catalog represented by the "Catalog" Object 2300). Clicking on the image 2304 may result in the display of a corresponding page of the catalog. The consumer/user is also enabled to click on the second relatively smaller image 2305, which may result in the display of a catalog page corresponding to the second item, or may click on the third relatively smaller image 2307, which may result in the display of a catalog page corresponding to the third item.

The "Catalog" Object 2300 of FIG. 23 also comprises a catalog name 2306 that displays the full name of the catalog represented by the "Catalog" Object 2300. Clicking on/selecting the catalog name 2306 may result in the display of the page for the corresponding catalog. A "Catalog" Object may also include an indication of the number of items in the catalog, shown in FIG. 23 as item count string 2308. The "Catalog" Object 2300 may in addition include an author string 2310 indicating, for example, that the "Catalog" Object 2300 was "created by [Tag/PersonName]." Clicking on the author string 2310 may result in the display of a page corresponding to the indicated "Tag/Person."

Figure 24:
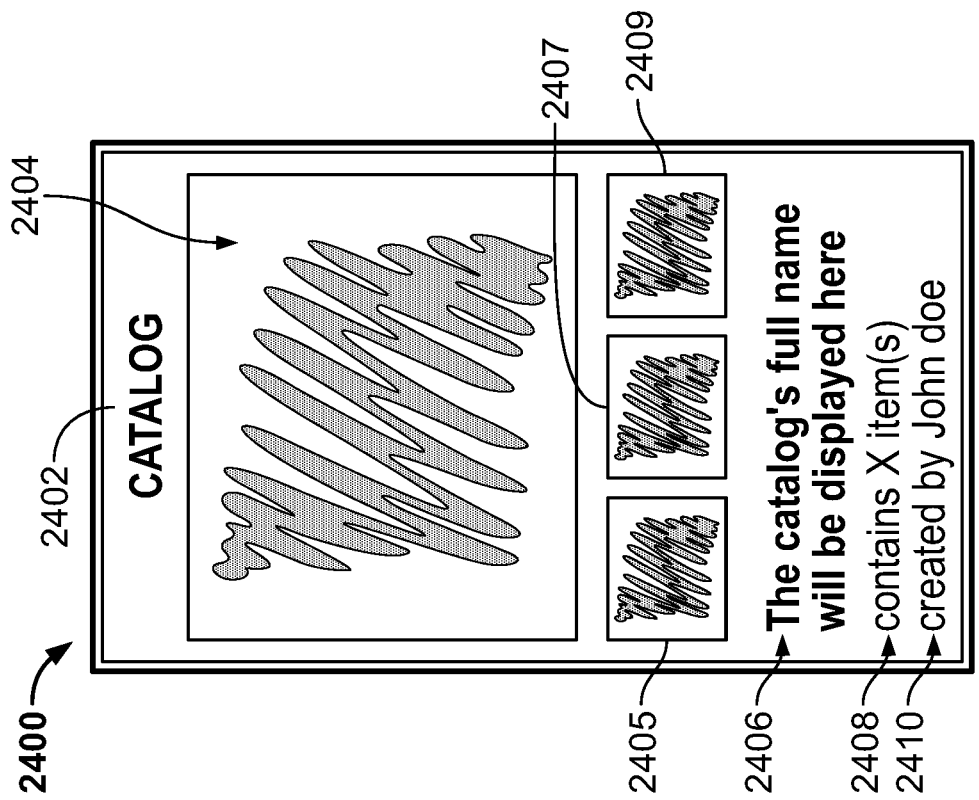
FIG. 24 illustrates an exemplary "Catalog" Object in "Standard" mode, in which the associated catalog contains four or more items, in accordance with a representative embodiment of the present invention.

FIG. 24 illustrates an exemplary "Catalog" Object 2400 in "Standard" mode, in which the associated catalog contains four or more items, in accordance with a representative embodiment of the present invention. As shown in FIG. 24, the "Standard" mode "Catalog" Object 2400 may, for example, include a static header 2402 indicating that the "Catalog" Object 2400 relates to a "Catalog," and a single relatively larger image 2404 representing a first catalog item. The "Catalog" Object 2400 may, for example, also include a second, relatively smaller image 2405 below and aligned to the left, representing a second catalog item, a third image 2407 similar to the second image 2405, below and centered, representing a third catalog item, and a fourth image 2409 similar to the second and third images 2405, 2407, below and aligned to the right, representing a fourth catalog item. As in the example of FIG. 23, the relatively larger image 2404 is preferably a "Tag-able" visual or standard catalog cover, if available, or an image of the latest added item (i.e., the item most recently added to the catalog represented by the "Catalog" Object 2400). Clicking on/selecting the image 2404 may result in the display of a corresponding page of the catalog. The consumer/user is also enabled to click on/select the second relatively smaller image 2405, which may result in the display of a catalog page corresponding to the second item, to click on/select the third relatively smaller image 2407, which may, for example, result in the display of a catalog page corresponding to the third item, or to click on the fourth relatively smaller image 2409, which may result in the display of a catalog page corresponding to the fourth catalog item. In a representative embodiment of the present invention, the ordering of the images of a "Catalog" Object such as Object 2400 may start with the most recently added catalog item appearing as the relatively larger image 2404, the second most recently added catalog item appearing as the second relatively smaller image 2405, and so on, in order of the increasing amount of time since the item was added to the catalog.

The "Catalog" Object 2400 of FIG. 24 also comprises a catalog name 2406 that displays the full name of the catalog represented by the "Catalog" Object 2400. Clicking on/selecting the catalog name 2406 may result in the display of the page for the corresponding catalog. A "Catalog" Object may also include an indication of the number of items in the catalog, as shown in FIG. 24 as item count string 2408. The "Catalog" Object 2400 may in addition include an author string 2410 indicating, for example, that the "Catalog" Object 2400 was "created by [Tag/PersonName]." Clicking on the author string 2410 may result in the display of a page corresponding to the indicated "Tag/Person."

Figure 25:
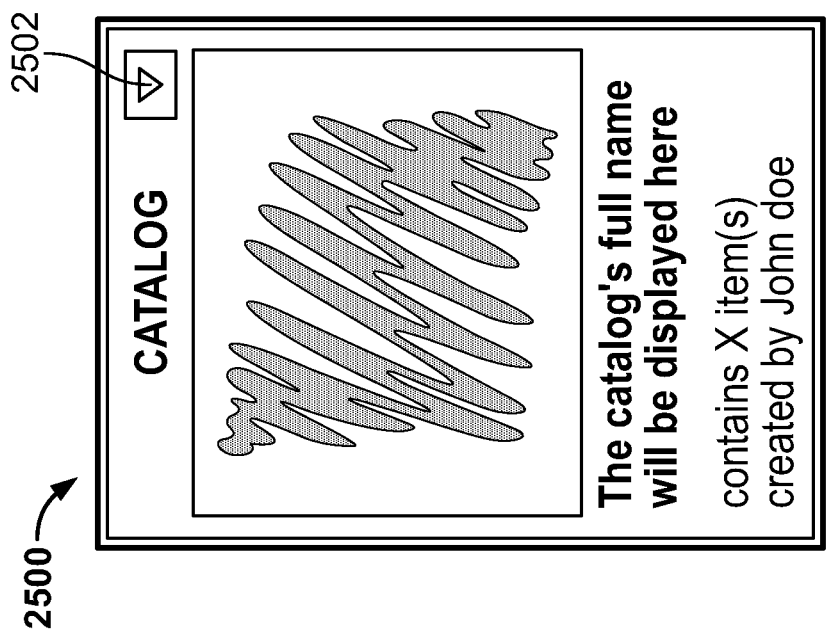
FIG. 25. Illustrates an exemplary "Catalog" Object exhibiting "hover" mode behavior, in accordance with a representative embodiment of the present invention.

FIG. 25. Illustrates an exemplary "Catalog" Object 2500 exhibiting "hover" mode behavior, in accordance with a representative embodiment of the present invention. The illustration of FIG. 25 shows the appearance of a menu teaser 2502 that appears following a consumer/user continuously positioning the cursor over an area of the "Catalog" Object 2500, excluding that of the menu teaser 2502 itself. In a representative embodiment of the present invention, clicking on/selecting the menu teaser 2502 may result in the display of a mini-menu (not shown), listing a basic set of options, as described above. In addition, the mini-menu of the "Catalog" Object 2500 may include a "Follow Catalog" option that may appear in the lower portion of the mini-menu. By clicking on/selecting the "Follow Catalog" option, a consumer/user may start to "follow" the catalog. If the consumer/user is already "following" the catalog represented by the "Catalog" Object 2500, the "Follow Catalog" option may not appear in the mini-menu.

Figure 26:
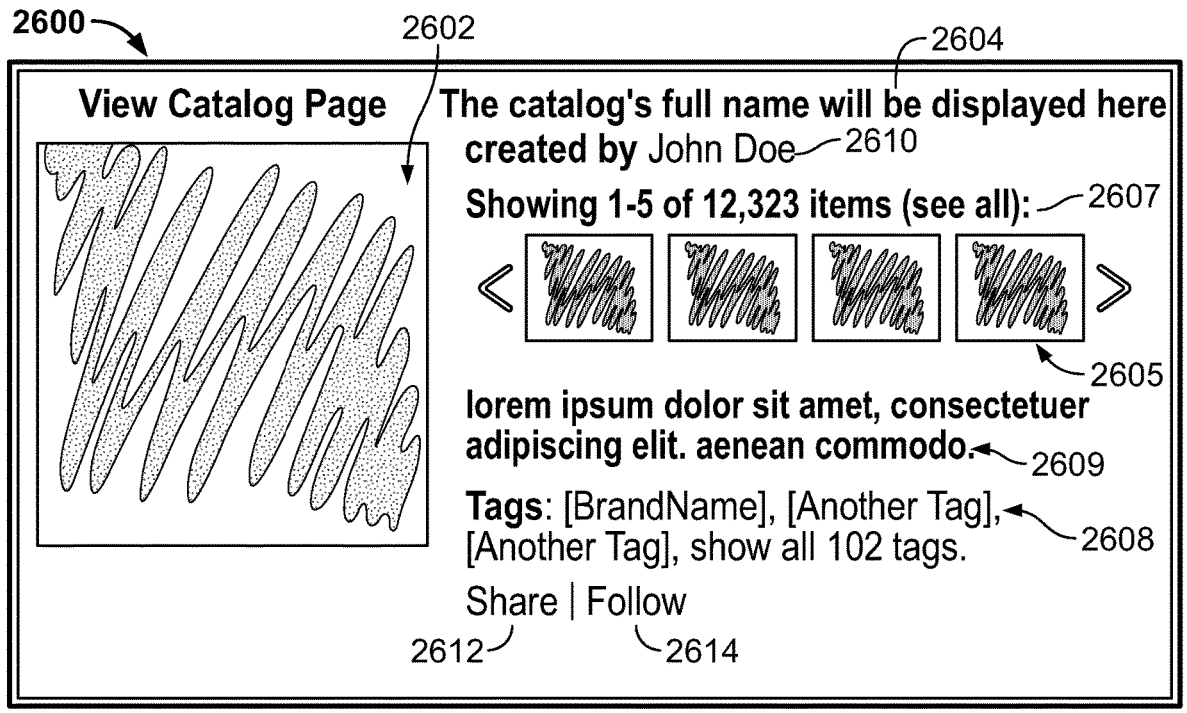
FIG. 26 is an illustration of a catalog "quick-view" layer, in accordance with a representative embodiment of the present invention.

FIG. 26 is an illustration of a catalog "quick-view" layer 2600, in accordance with a representative embodiment of the present invention. The catalog "quick-view" layer 2600 may include an image or picture 2602, which may be a standard cover image, if available, or an image representing the latest item (i.e., most recent item) that was added to the associated "Catalog" Object. In addition, the catalog "quick-view" layer 2600 includes a catalog name 2604, which shows the full name of the catalog. Clicking on/selecting the catalog name 2604 may result in the display of a page for the corresponding catalog. The catalog "quick-view" layer 2600 of FIG. 26 also includes an author string 2610 indicating, for example, that a "Catalog" Object such as the "Catalog" Object 2500, for example, was "created by [Tag/PersonName]." Clicking on/selecting the author string 2610 may result in the display of a page corresponding to the indicated "Tag/Person."

The catalog "quick-view" layer 2600 may also include a product carousel 2605, which may be revealed if the catalog represented by the catalog "quick-view" layer 2600 has more than one item. The product carousel 2605 may be have an accompanying title 2607 that updates with each move of the carousel, and that indicates the range of items currently being displayed. The title 2607 may, for example, indicate "Showing [VisibleStartingIndex]–[VisibleEndingIndex] of [TotalItems]", where the variable "VisibleStartingIndex" represents the item number within the catalog of the left most visible product carousel item, and the variable "VisibleEndingIndex" represents the item number within the catalog of the right most visible product carousel item. The variable "TotalItems" may represent the total number of items currently in the catalog. The item number of the item most recently added to the catalog may be set to 1. If the catalog contains more than four items, a "teaser" such as, for example, "(see all)" may be added to the catalog "quick-view" layer 2600 that when clicked/selected may result in the display of the page for the associated catalog. When "hover" behavior is active, items in the product carousel 2605 may, when hovered over, be displayed with a "tooltip."

The catalog "quick-view" layer 2600 may also include a catalog description 2609, if one is available. If the catalog description 2609 would appear as more than a certain number of rows of text such as, for example, three, the catalog description 2609 may be displayed in an truncated, shortened, or cut form, followed by a short text string such as, for example, "read more . . . ," which when clicked may result in the display of the page for the corresponding catalog.

The catalog "quick-view" layer 2600 may also include a list of tags 2608 such as the list of tags 824 described above with respect to FIG. 8, for example. Similar to the action described above with respect to FIG. 8, the height of the catalog "quick-view" layer 2600 may change, depending upon the total number of tags displayed.

In addition to the features already described, the catalog "quick-view" layer 2600 may include a "Share" option 2612, which may result in sharing of information with another consumer/user of all or only a portion of the information shown in the catalog "quick-view" layer 2600, and a "Follow" option 2614. By clicking on/selecting the "Follow" option, a consumer/user may start following the catalog. If the consumer/user is already following the catalog associated with the catalog "quick-view" layer 2600, the "Follow" option 2614 may not appear in the catalog "quick-view" layer 2600. The catalog "quick-view" layer 2600 may not enable a consumer/user to end the "following" of the related catalog.

Figure 27:
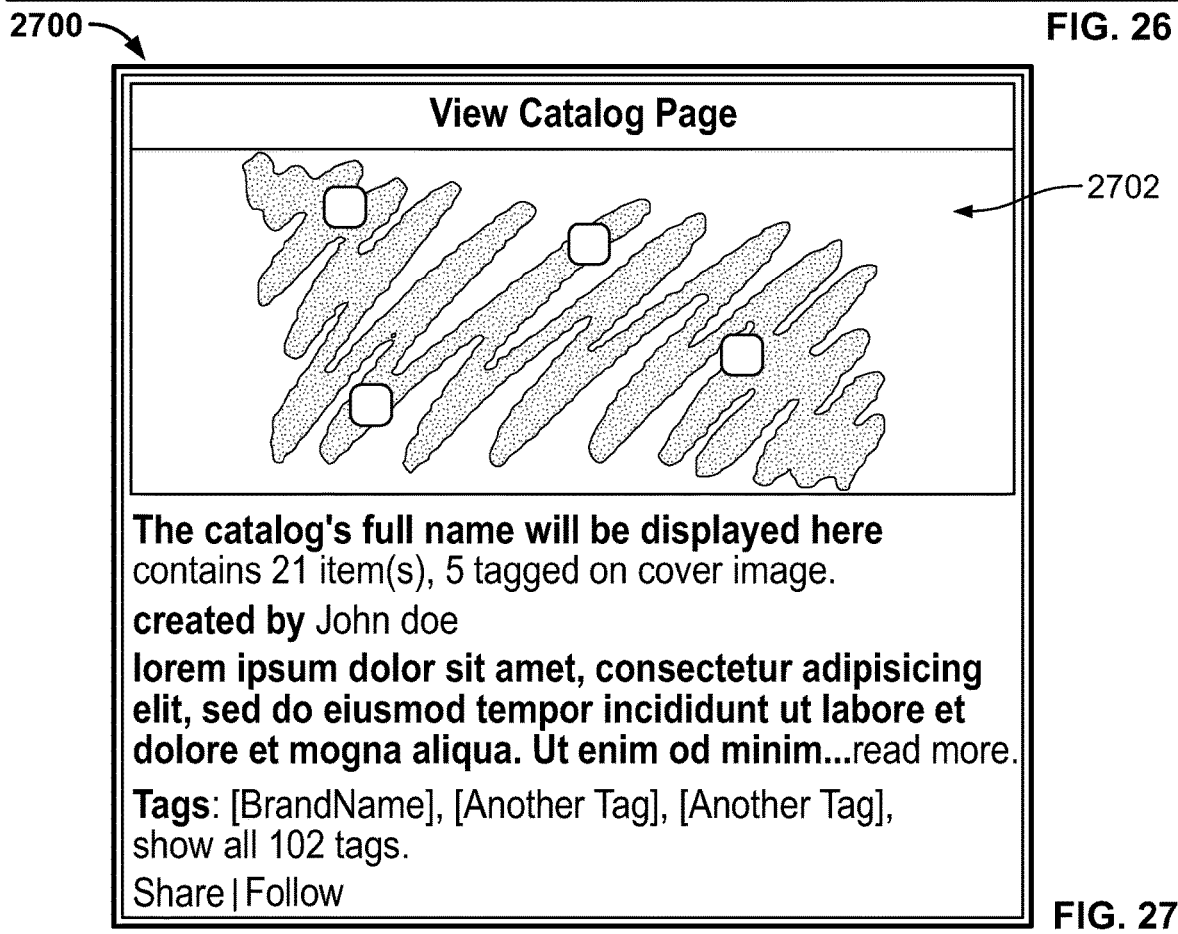
FIG. 27 is an illustration of an exemplary catalog "quick-view" layer that may be displayed in place of the catalog "quick-view" layer of FIG. 26, when the associated catalog is what is referred to herein as a "visual catalog," in accordance with a representative embodiment of the present invention.

FIG. 27 is an illustration of an exemplary catalog "quick-view" layer 2700 that may be displayed in place of the catalog "quick-view" layer 2600 of FIG. 26, when the associated catalog is what is referred to herein as a "visual catalog," in accordance with a representative embodiment of the present invention. The catalog "quick-view" layer 2700 of FIG. 27 is similar in many ways to the catalog "quick-view" layer 2600 of FIG. 26, with the following differences. The catalog "quick-view" layer 2700 may include a Tag-able cover image 2702 larger than the image 2602 of FIG. 26, where the image 2702 is displayed in its original height to width ratio. Clicking on/selecting the image 2702 may result in the display of the related catalog page, and may display the tagged areas. In addition, the catalog "quick-view" layer 2700 may display Catalog Info below the image 2702. Further, the catalog "quick-view" layer 2700 may include information such as, for example, "contains [TotalItems] item(s), [TaggedItems] tagged on cover image," where the variable "TotalItems" is the total number of items in the catalog, and "TaggedItems" is the number of tagged items appearing on the cover image. Finally, the catalog "quick-view" layer 2700 may be displayed without a product carousel such as the product carousel 2605 of FIG. 26.

In a representative embodiment of the present invention, an Object may also be of a type referred to herein as a "Topical Poll" Object. The following discussion provides additional details of this aspect of the present invention.

Figures 28, 29, 30:
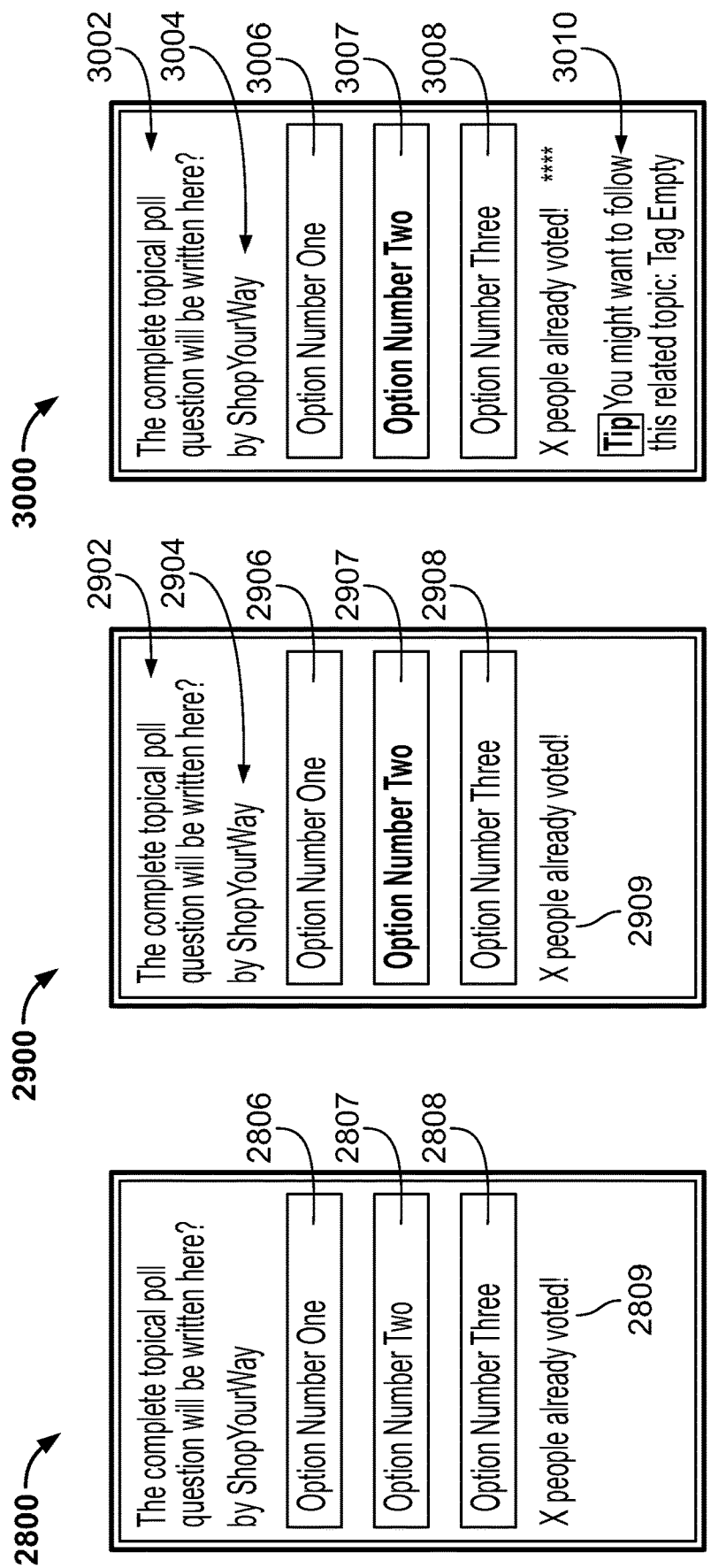
FIG. 28 is an illustration of an exemplary "Topical Poll" Object before voting has taken place, in accordance with a representative embodiment of the present invention.
FIG. 29 is an illustration of an exemplary "Topical Poll" Object that may correspond to, for example, the "Topical Poll" Object after voting has taken place, in accordance with a representative embodiment of the present invention.
FIG. 30 illustrates an exemplary "Topical Poll" Object that is similar in many ways to the "Topical Poll" Object of FIG. 29, in accordance with a representative embodiment of the present invention.

FIG. 28 is an illustration of an exemplary "Topical Poll" Object 2800 before voting has taken place, in accordance with a representative embodiment of the present invention. The "Topical Poll" Object 2800 illustrates the appearance that a consumer/user may see before the "Topical Poll" Object 2800 has been voted on, when in "standard" (not "hover") mode. As illustrated in FIG. 28, the "Topical Poll" Object 2800 comprises a title 2802, which displays the complete title of the poll, and a short string of text identifying the poll author 2804 such as, for example, "By [Person/TagEntity]." Clicking on the poll author 2804 may result in the display of a corresponding page.

The "Topical Poll" Object 2800 may also include a number of options 2806, 2807, 2808 on which the consumer/user may vote, and vote status information 2809 that may depend on the voting status for the poll represented by the "Topical Poll" Object 2800. If no one has yet voted, the voting status information 2809 may display text promoting the consumer/user to vote, or indicating the number of votes already cast in the related poll.

FIG. 29 is an illustration of an exemplary "Topical Poll" Object 2900 that may correspond to, for example, the "Topical Poll" Object 2800 after voting has taken place, in accordance with a representative embodiment of the present invention. The "Topical Poll" Object 2900 illustrates the appearance that a consumer/user may see after the "Topical Poll" Object 2900 has been voted on, and when in "standard" (not "hover") mode. The illustration of FIG. 29 shows the "Topical Poll" Object 2900 having a title 2902, which display the complete title of the poll, and a short string of text identifying the poll author 2904 such as, for example, "By [Person/TagEntity]." Clicking on/selecting the poll author 2904 may result in the display of a corresponding page.

The "Topical Poll" Object 2900 also include the options 2906, 2907, 2908 on which the consumer/user has voted, and vote status information 2909 that may depend on the voting status for the poll represented by the "Topical Poll" Object 2900. As can be seen in the illustration of FIG. 29, after the voting has taken place, the options 2906, 2907, 2908 may be filled with background color from left to right based on the percentage of votes for a particular option. The colored portion of each the options 2906, 2907, 2908 may be a gradient from 0% of votes (no background color) to 100% full background color. The option for which the consumer/user voted may be marked in a distinguishing manner, to indicate that it is the option voted by the consumer/user.

FIG. 30 illustrates an exemplary "Topical Poll" Object 3000 that is similar in many ways to the "Topical Poll" Object 2900 of FIG. 29, in accordance with a representative embodiment of the present invention. The "Topical Poll" Object 3000 illustrates the appearance that a consumer/user may see after the "Topical Poll" Object 2800 has been voted on, and when in "standard" (not "hover") mode. The illustration of FIG. 30 shows the "Topical Poll" Object 3000 having a title 3002, which display the complete title of the poll, and a short string of text identifying the poll author 3004 such as, for example, "By [Person/TagEntity]." Clicking on the poll author 3004 may result in the display of a corresponding page.

The "Topical Poll" Object 3000 also include the options 3006, 3007, 3008 on which the consumer/user have voted, and vote status information 3009 that may depend on the voting status for the poll represented by the "Topical Poll" Object 3000. As can be seen in the illustration of FIG. 30, after the voting has taken place, the options 3006, 3007, 3008 may be filled with background color from left to right based on the percentage of votes for a particular option. The colored portion of each the options 2906, 2907, 2908 may be a gradient from 0% of votes (no background color) to 100% full background color. The option for which the consumer/user voted may be marked in a distinguishing manner, to identify the option voted on by the consumer/user. In addition, as shown in the illustration of FIG. 30, if the option voted on by the consumer/user was "tagged," the "Topical Poll" Object 3000 may display a tip 3010 to the consumer/user, identifying a "TagName" of a topic that the consumer/user may wish to follow. In response to the display of the tip 3010, the consumer/user may click on/select the displayed "TagName," which may result in the display of a page for the identified tag.

FIG. 31 is an illustration of a "Topical Poll" Object 3100 exhibiting "hover" mode behavior before voting has taken place, in accordance with a representative embodiment of the present invention. The "Topical Poll" Object 3100 may correspond, for example, to the "Topical Poll" Object 2800, in which a consumer/user has continuously positioned the cursor over the area of the "Topical Poll" Object 2800 for more than the minimum period of time required to enter "hover" mode, as indicated by the visibility of the menu teaser 3112 in FIG. 31. In addition, the illustration of FIG. 31 shows "hover" mode behavior in the display of a tooltip 3114, by which the consumer/user is urged to vote in the poll of the "Topical Poll" Object 3100, when the consumer/user hovers the cursor above the option 3107 on which the consumer/user has not yet voted.

FIG. 32 illustrates a "Topical Poll" Object 3200 exhibiting "hover" mode behavior after voting has taken place, in accordance with a representative embodiment of the present invention. The "Topical Poll" Object 3200 may correspond, for example, to the "Topical Poll" Object 2800, in which a consumer/user has continuously positioned the cursor over the area of the "Topical Poll" Object 2900 for more than the minimum period of time required to enter "hover" mode, as indicated by the visibility of the menu teaser 3212 in FIG. 32. As can be seen in the illustration of FIG. 32, the "Topical Poll" Object 3200 shows "hover" mode behavior in the display of a tooltip 3214 in which the consumer/user is offered the choice to "un-vote" a previously cast vote in the poll of the "Topical Poll" Object 3200, when the consumer/user hovers the cursor above the option 3207 on which the consumer/user has already voted. In a representative embodiment of the present invention, the user may also be shown additional tooltips urging the consumer/user to vote for those options (e.g., options 3206 and 3208) on which the consumer/user has not voted.

In a representative embodiment of the present invention, an Object may also be of a type referred to herein as a "Tag Entity" Object. The following discussion provides additional details of this aspect of the present invention.

In a representative embodiment of the present invention, a "Tag Entity" Object may be identified as a "Store," a "Tag (topic)," a "Brand," a "Clique," a "Category," a "Location," a "Website," a "Person," a "Poll (Help me choose)," a "Review," an "Article," a "Badge," and a "Complex Object." Each of the above may have behaviors in a "Standard" mode, "Hover" mode, and "Quickview" mode.

As previously discussed above, a newsfeed may have a number of Objects organized in one column or in a grid arrangement having multiple columns, each of the Objects having one or more Stories, where each Story may have one or more Comments, in accordance with a representative embodiment of the present invention. Additional details about the Story aspect of a newsfeed are provided below.

As described above, a representative embodiment of the present invention may comprise a number of "Stories," which have a common format. The format of a Story in accordance with a representative embodiment of the present invention may appear as follows:

[StoryTypeIcon] [StoryText]

[TimeStamp] via [PublishingTool]

In order for the consumer/user to understand the logic of the order of a newsfeed, each newsfeed Story may have its own creation "timestamp." The format of the "TimeStamp" portion above depends upon the amount of time that has passed since the Story was created. Examples of various forms of the "TimeStamp" portion of the Story are shown below:

| Time since creation | TimeStamp |
| --- | --- |
| Under 1 minute | "A few seconds ago" |
| Under 1 hour | "X minutes ago" (e.g., "5 minutes ago") |
| Under 1 day | "X hours ago" (e.g., "6 hours ago") |
| Under 30 days | "X days ago" (e.g., "7 days ago") |
| 30 days and over, same calendar year: | "Month Day" (e.g., "Feb 6") |
| 30 days and over, different calendar year: | "Month Day, Year" (e.g., "Feb. 6, 2010") |

The format of a Story may also indicate the "publishing tool" used to create the Story. Examples of various formats of the "PublishingTool" portion of the Story are shown below:

In a representative embodiment of the present invention, if a Story was created by a consumer/user using any non-web applications or by an organization using an external application program interface (API), a suffix may be added to the timestamp, as in "[Timestamp] via [PublishingTool]". A few possible examples of this form include the following:
"[Timestamp] via iPhone"
"[Timestamp] via Bookmarklet"
"[Timestamp] via BlackBerry"
"[Timestamp] via Android"
"[Timestamp] via Apple.com"
"[Timestamp] via Gift Registry"
"[Timestamp] via Contests & Sweepstakes"
"[Timestamp] via Sears.com Lists app"

A representative embodiment of the present invention may have an "actions menu." The actions menu of each Story may have a "standard" or "basic" set of actions, and some Stories may have an actions menu with an extended list or set of actions that are in addition to the basic set of actions. The Story actions menu, which may be displayed in a "Tooltip" type layer, may become visible/accessible when the user continuously positions or "hovers" the cursor over the areas of an Object that display Stories or Comments. Detailed information about Comments will be provided below. In a representative embodiment of the present invention, an actions menu may contain a list of all possible actions for a given type of Story. The actions in the actions menu may be divided into two main sections, a prominent section at the top of the actions menu listing common/promoted actions, and a second, possibly smaller section at the bottom of the actions menu listing advanced/secondary actions.

In a representative embodiment of the present invention, the basic set of actions of an actions menu may include a "Comment" action, which when selected may permit consumer/user entry of a new Comment at the bottom or end of the Comment thread for the Object. Additional information about the specifics of a Comment is provided below.

The basic set of actions of the actions menu may also include a "Like" action, which may reside in the top or prominent section of the actions menu, and which when selected may result in an indication that the consumer/user "likes" the Story. If the consumer/user has already "liked" the Story, the actions menu may instead display an action to "Unlike" the Story. In a representative embodiment of the present invention, visual representations of all "Likes" may appear with the Story.

The basic set of actions may also include a "Share" action, which may open a share dialog for the specific Story. The "Share" action may reside in the top, prominent section of the actions menu. In addition, the basic set of actions may include a "Hide" action, which when selected may open a "Hide" dialog that may be pre-populated based on the Story. The basic set of actions may also include a "Report" action, which when selected may open a "Report a story" dialog.

In a representative embodiment of the present invention, Stories may be grouped together under a specific Object subject to certain conditions. For example, Stories that are directly associated with a given Object may be grouped under the Object. Also, instances of Stories that naturally appeared in the viewed feed (tag page, popular, etc.) may be grouped under a given Story. To be grouped together under an Object, Stories may have occurred with a certain amount of time, which may be configurable (e.g., twelve hours). When grouped under a given Object, Stories may, for example, be ordered from the newest (at the top or beginning of the group of Stories) to the oldest (at the bottom or end of the group of Stories). As noted, ordering of Stories in a group may be based on the date/time of creation of the Story or may be based on the date/time of the last Comment made on the Story, if any Comments are available for the Story. Detailed Information about Comments is provided below.

A large variety of Story types are contemplated and may be presented by a representative embodiment of the present invention. For example, a representative embodiment of the present invention may include a type of Story referred to herein as a "New Arrivals" Story, which may appear in the Object as:
"[NewArrivalIcon] New arrival in [TagName]!"

The act of a consumer/user clicking on the [TagName] may, for example, result in the display of a corresponding page for "TagName." The actions available upon display of an actions menu may be the standard or basic set of actions described above.

A representative embodiment of the present invention may also include a type of Story referred to herein as an "AdYourWay" Story, which may appear in the Object as:
"[AdYourWayIcon] Recommended since you [Action Name] [TriggerName]:"

The [ActionName] portion may represent an action performed on an item identified by the field identified by [TriggerName], and which triggered the creation of the "AdYourWay" story. Just a few of many possible values for the [ActionName] field include, for example, "viewed," "rated," "reviewed," "bought," "like," "want," and "followed." The [ActionName] field may not be clickable/selectable. The [TriggerName] field may identify the item that the consumer/user acted upon, and which triggered the creation of the "AdYourWay" Story. Possible examples, by way of illustration and not limitation, include a [ProductName], a [CatalogName], and a [TagEntityName]. Clicking/selecting the [TriggerName] field may result in the display of a page corresponding to the [TriggerName]. The actions available upon display of an actions menu may be the standard or basic set of actions described above.

A representative embodiment of the present invention may also include a type of Story referred to herein as a "Top Sellers" Story, which for a single product may appear in an Object as:
"[TopSellerIcon] Top selling product in [TagEntity Name]."
and for multiple products may appear as:
"[TopSellerIcon] Top selling products in [TagEntity-Name]."

Top selling products may be those products that have sold the greatest number of units over a certain time frame.

Clicking the [TagEntityName] field may, for example, result in the display of a corresponding page for the TagEntity. The actions available upon display of an actions menu may be the standard or basic set of actions described above.

A representative embodiment of the present invention may also include a type of Story referred to herein as an "Trending Products" Story, which for a single product may appear in an Object as:

"[Trending Icon] Trending product in [TagEntityName]."

and for multiple products may appear as:

"[Trending Icon] Trending products in [TagEntity Name]."

Trending products may be those products whose sales have been growing over a certain time frame.

Clicking the [TagEntityName] field may, for example, result in the display of a corresponding page for the TagEntity. The actions available upon display of an actions menu may be the standard or basic set of actions described above.

A representative embodiment of the present invention may also include a type of Story referred to herein as an "Rated Product" Story, which may appear in an Object, without "one-liner text," as:

"[Person/Tag Image] [Person/Tag Name] rated this [StarIcons]"

and may appear, with "one-liner text," as:

"[Person/Tag Image] [Person/Tag Name] rated this [StarIcons][OneLinerText]"

Clicking the [Person/Tag Image] field or [Person/Tag Name] field may, for example, result in the display of a corresponding page for the Profile/Tag. The [OneLinerText] field may always begin on a new line. The actions available upon display of an actions menu may be the standard or basic set of actions described above. If the [Person/Tag Image] or [Person/Tag Name] that rated the product is not "followed" by the consumer/user viewing the Story, the top portion of the actions menu may include a "Follow [Tag/Person Name]" action. In addition, clicking/selecting "Follow [Tag/Person Name]" may, for example, elicit the same behavior as when clicking/selecting these buttons in their native pages.

A representative embodiment of the present invention may also include a type of Story referred to herein as an "Pre Orders" Story, which may appear in an Object as:

"[PreOrderIcon] This product is now available for pre-order. Scheduled for arrival on [Date]."

The format of the [Date] field of this Story may, for example, appear as:

"Month Day, Year" (e.g., "April 4, 2012")

Clicking on/selecting "pre-order" may, for example, result in the display of a "How Does the Pre-order Process Work?" informational popover. The actions available upon display of an actions menu may be the standard or basic set of actions described above.

A representative embodiment of the present invention may also include a type of Story referred to herein as an "Recommended a Product" Story, which may appear in an Object, without a [Text] field, as:

"[Person/Tag Image] [Person/Tag Name] recommended this [EntityType] to you" and may appear, with a [Text] field as:

"[Person/Tag Image] [Person/Tag Name] recommended this [EntityType] to you" [Text]"

It should be noted that although this Story is described with respect to Objects of type "Product," this type of Story is contemplated to support all types of Objects.

Clicking/selecting the [Person/Tag Image] or [Person/Tag Name] fields leads may, for example, result in the display of a corresponding Profile/Tag page. In a representative embodiment of the present invention, the [EntityType] field may be populated as, for example, "product," "store," "topic," "brand," or "location." Other values for [EntityType] are also contemplated. In some representative embodiments of the present invention, the [Text] field may always start on a new line. The actions available upon display of an actions menu may be the standard or basic set of actions described above. If the [Person/Tag Image] or [Person/Tag Name] that recommended the product is not "followed" by the consumer/user viewing the Story, the top portion of the actions menu may include a "Follow [Tag/Person Name]" action. In addition, clicking "Follow [Tag/Person Name]" may, for example, elicit the same behavior as when clicking these buttons in their native pages.

A representative embodiment of the present invention may also include a type of Story referred to herein as a "Featured Video" Story, which may appear in an Object as:

"[Featured Video Icon] Featured video!"

The actions available upon display of an actions menu may be the standard or basic set of actions described above.

A representative embodiment of the present invention may also include a type of Story referred to herein as a "Published Topical Poll" Story. The format of a "Published Topical Poll" Story may depend on the type of the publisher of the Story. For example, one possible format of the "Published Topical Poll" Story may appear as follows:

"[Icon] [TagName] published this topical poll to the entire community."

Another possible format that may be used may appear as:

"[Tag Image][TagName] published this topical poll on their page."

With the above Story format, clicking on [Tag Image] or [TagName] may, for example, result in the display of a corresponding tag page.

Yet another example of a possible format that may be used may appear as:

"[Person Image] [PersonName] published this poll."

With the use of the Story format immediately above, clicking on/selecting [Person Image] or [PersonName] may, for example, result in the display of a corresponding profile page. The actions available upon display of an actions menu for this Story type may be the standard or basic set of actions described above.

A representative embodiment of the present invention may also include a type of Story referred to herein as a "Added Product to Catalog" Story, which may appear in an Object as:

"[Tag/PersonImage] [Tag/PersonName] added [ProductName] to this catalog."

Clicking on the [Tag/PersonImage] field or [Tag/PersonName] field may, for example, result in the display of a corresponding tag/profile page, while clicking on the [ProductName] field may result in the display of a corresponding product page. The actions available upon display of an actions menu for this Story type may be the standard or basic set of actions described above.

A representative embodiment of the present invention may also include a type of Story referred to herein as a "Added Web Page to Catalog" Story, which may appear in an Object as:

"[Tag/PersonImage] [Tag/PersonName] added [WebPageName] to this catalog."

Clicking on/selecting the [Tag/PersonImage] field or the [Tag/PersonName] field may, for example, result in the display of a corresponding tag/profile page. Clicking on/selecting the [WebPageName] field may result in display of the page at the location indicated by the Universal Resource Locator (URL) associated with [WebPageName], and may be presented in a new browser tab or browser instance. The actions available upon display of an actions menu for this Story type may be the standard or basic set of actions described above.

A representative embodiment of the present invention may also include a type of Story referred to herein as a "Added Picture to Catalog" Story, which may appear in an Object as:

"[Tag/PersonImage] [Tag/PersonName] added a picture to this catalog."

Clicking on/selecting the [Tag/PersonImage] field or [Tag/PersonName] field may, for example, result in the display of a corresponding tag/profile page. Clicking on/selecting the phrase "a picture" may result in the display of Quickview for the picture. The actions available upon display of an actions menu for this Story type may be the standard or basic set of actions described above.

A representative embodiment of the present invention may also include a type of Story referred to herein as a "Liked catalog" Story, which may appear in an Object as:

"[Tag/PersonImage] [Tag/PersonName] likes this catalog."

Clicking on/selecting the [Tag/PersonImage] field or [Tag/PersonName] field may, for example, result in the display of a corresponding tag/profile page. The actions available upon display of an actions menu for this Story type may be the standard or basic set of actions described above.

A representative embodiment of the present invention may also include a type of Story referred to herein as a "Tagged Item in catalog" Story, which may appear in an Object as:

"[Tag/PersonImage] [Tag/PersonName] tagged [ItemName] in the catalog's cover image."

In a representative embodiment of the present invention, the [ItemName] field may not be clickable. The actions available upon display of an actions menu for this Story type may be the standard or basic set of actions described above.

A representative embodiment of the present invention may also include a type of Story referred to herein as an "Updated Status/Wrote On Wall" Story, which may appear in an Object as:

"[Tag/PersonImage] [Tag/PersonName] published this on [StoryDestination]."

If the publisher identified by [Tag] published status or other information on its own stream, the [StoryDestination] field in the above Story format may appear as "its page," and "its page" may represent a link to a recent activity page of [Tag].

If the publisher identified by [PersonName] published status or other information on its own stream, the [StoryDestination] field in the above Story format may appear as "its own stream," and "own stream" may represent a link to a profile page of a person.

If the publisher identified by [Tag] published status or other information on streams other than its own, the [Story Destination] field in the above Story format may appear as "[TagName]," and "[TagName]" may represent a link to a page of [Tag].

If the publisher identified by [PersonName] published status or other information on another person's stream, the [StoryDestination] field in the above Story may appear as "[UserFullName]'s stream," and "[UserFullName]'s stream" may represent a link to a profile of User.

In addition to the Stories described above, a representative embodiment of the present invention may include a variety of other types of Stories that have been contemplated such as, for example, "Wrote On Wall," "Weekly Deals," "Featured Users," "Added Video to Product," "Added Image to Product," "Special Offers," "Deal (price dropped)," "Joined," "Started Following," "Reviewed Product," "Published Poll," "Asked Question On Product," "Unlocked Badge," "Answered Question," "Installed Mobile App," "Commented On Product," "Voted On Poll," "User Followed Product," "User Followed Brand," "Checked In," "Viewed Product," and "Performed Search."

As previously discussed above, each newsfeed may have a number of Objects organized in one column or in a grid arrangement having multiple columns, each of the Objects having one or more Stories, where each Story may have one or more Comments, in accordance with one representative embodiment of the present invention. Additional details about Comments are provided below.

In a representative embodiment of the present invention, each Comment is associated with the specific Story under which the Comment was submitted. If a collection of more than one Comment is present, the Comments may be ordered within a newsfeed item with the oldest Comment located at the top of list, and the newest located at the bottom. A Comment may formatted to appear as follows:

[CommenterTinyImage] [CommenterName]: [CommentText]
[CommentTimestamp]

In the above format, [CommenterTinyImage] and [CommenterName] may display an image representing the Commenter and the name of the Commenter (tag/person), respectively, and may act as links to the Commenter's tag/profile page. The [CommenterTinyImage] may be displayed at low contrast (e.g., to reduce general visual noise in the newsfeed) until a consumer/user viewing the Comment hovers over the Object, Story, or Comment thread. When hover mode is active, the [CommenterTinyImage] may then be displayed in full contrast.

In a representative embodiment of the present invention, the [CommentText] field or portion of the Comment may, for example, contain the simple text of the Comment. The [CommmentTimestamp] portion of the Comment follows the same rules described above as for all other timestamps appearing in the newsfeed.

FIG. 33 is an illustration of an exemplary Story 3300 having three Comments 3310, 3320, 3330, in accordance with a representative embodiment of the present invention. As shown in example of FIG. 33, the three Comments 3310, 3320, 3330 have respective CommenterTinyImages 3312, 3322, 3332, CommenterNames 3314, 3324, 3334, CommenterText 3316, 3326, 3336, and CommentTimestamps 3318, 3328, 3338. In a representative embodiment of the present invention, the Comments 3310, 3320, 3330 of FIG. 33 are ordered by the respective timestamp for each Comment, as described above.

FIG. 34 is an illustration of an exemplary Story 3400 that similar in many ways to the Story 3300 of FIG. 33, but in which more than three Comments have been submitted, in accordance with a representative embodiment of the present invention. As shown in the illustration of FIG. 34, only the three most recent Comments 3410, 3420, 3430 for the Story 3400 are displayed in the timestamp order described above. The Story 3400, however, also displays a teaser 3450 that permits the consumer/user viewing the Story 3400 to click on/select the teaser 3450 to gain access to the entire Comment thread for Story 3400, in its natural order (e.g., oldest Comment at the top). In a representative embodiment of the present invention, the consumer/user viewing the Story 3400 and Comments thread may not be able to return the displayed list of Comments back to the shorter or truncated list form without refreshing the page.

FIG. 35 is an illustration of an exemplary Story 3500 that is similar in many ways to the Story 3300 of FIG. 33, but in which a consumer/user has chosen to add an additional Comment, in accordance with a representative embodiment of the present invention. The consumer/user may add a new Comment to the Story 3500 by simply hovering the cursor over the area of the Story 3500 or the Comments 3510, 3520, 3530, which results in the display of an actions menu (not shown in FIG. 35) for the Story 3500. Some example actions that may be available via the actions menu of a Story were previously described above. Clicking on the "Comment" entry of an actions menu for the Story 3500 may, for example, cause a number of changes to the Story 3500, including insertion of a new Comment Input 3540 at the bottom of the Comments thread, scrolling of the page to insure that the Comments Input 3540 is completely visible, and placement of the keyboard cursor within the Comment Input 3540 to enable the consumer/user to immediately enter the text of the new Comment. Creation of the Comment from any Comment text that has been entered occurs upon the consumer/user pressing the "Enter" key. If no text was entered by the consumer/user, or if text was entered but the "ESC" key is pressed before the "Enter" key, the Comment Input 3540 is hidden, and no Comment is added to the Comments thread of Story 3500.

FIG. 36 illustrates the appearance of an exemplary marker 3660 that enables the deletion of a Comment 3610 from a Story 3600, in accordance with a representative embodiment of the present invention. A representative embodiment of the present invention may permit a consumer/user (e.g., person/tag) to delete various types of Comments including, for example, Comments that he/she submitted, and Comments added to a Story in which he/she is the main actor. Comments that may be deleted by the consumer/user may, for example, be marked by a clickable marker such as, for example, a clickable "[X]" button, illustrated in FIG. 36 as marker 3660, when the consumer/user hovers the cursor over the Comment 3610. Clicking upon the marker 3660 results in the display of an action popover to confirm the deletion action of the consumer/user, as described below with regard to FIG. 37.

Figure 37:
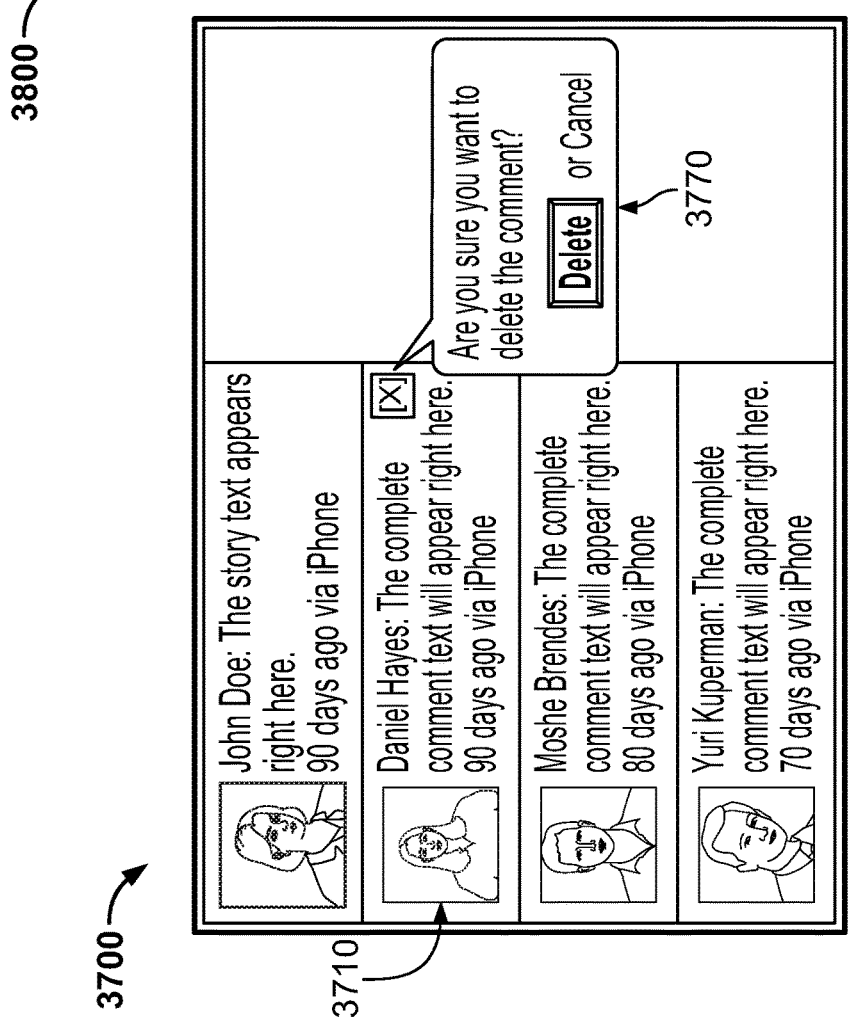
FIG. 37 illustrates the appearance of an action popover that may be used to confirm the choice by the consumer/user to delete the Comment of the Story, in accordance with a representative embodiment of the present invention.

FIG. 37 illustrates the appearance of an action popover 3770 that may be used to confirm the choice by the consumer/user to delete the Comment 3710 of the Story 3700, in accordance with a representative embodiment of the present invention. As is illustrated in FIG. 37, the action popover 3770 asks the consumer/user "Are you sure you want to delete the comment?" and provides the consumer/user with "Delete" and "Cancel" options. In the event that the consumer/user clicks/selects the "Delete" option, the marked Comment 3710 is removed and the appearance of the Story 3700 is updated accordingly. If, however, the consumer/user clicks/selects the "Cancel" option, the action popover 3770 may be closed, no change is made to the Comment 3710, and no further actions are taken.

Figure 38:
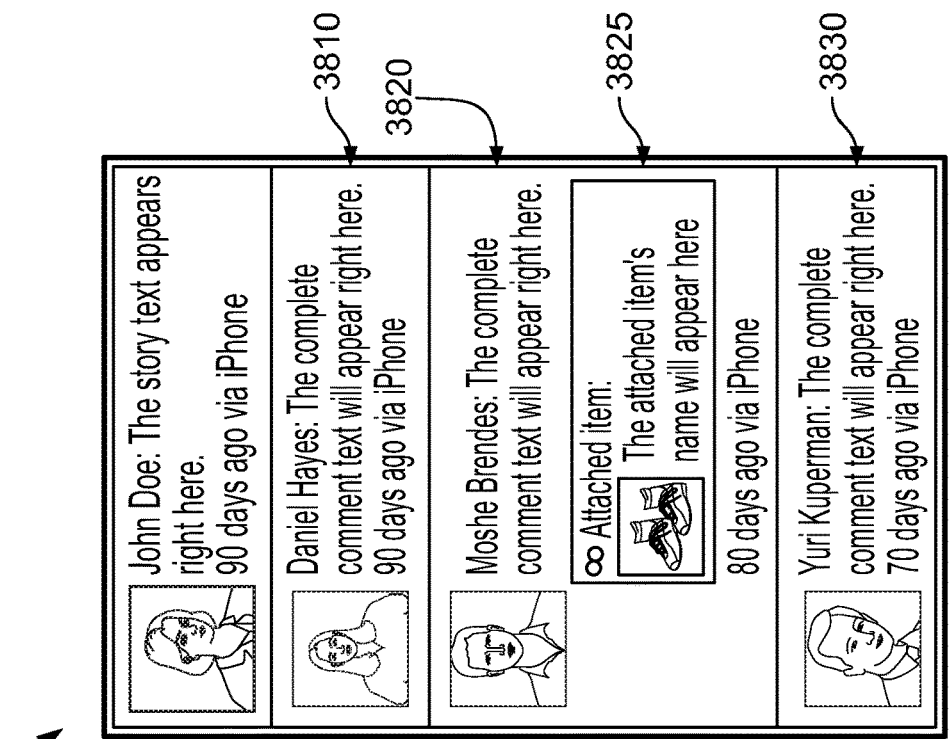
FIG. 38 is an illustration of an exemplary Story with Comments, in which an attachment is automatically displayed based on the text of the Comment, in accordance with a representative embodiment of the present invention.

FIG. 38 is an illustration of an exemplary Story 3800 with Comments 3810, 3820, 3830, in which an attachment 3825 is automatically displayed based on the text of the Comment 3820, in accordance with a representative embodiment of the present invention. In a representative embodiment of the present invention, the text of a Comment such as, for example, the Comments 3810, 3820, 3830 of FIG. 38 may, for example, be parsed to determine whether the text of any of the Comments 3810, 3820, 3830 contains a link to a known Object. If the text of any Comment contains a link to a known Object, the link may be used to display an attachment showing the corresponding Object below the text of the Comment containing the recognized link. An exemplary format for a Comment having such an attachment may be as follows:

[CommenterTinyImage] [CommenterName]: [CommentText]
"[Icon] Attached item:"
"[ItemTinyThumb] [ItemName]"
[CommmentTimestamp]

Figure 39:
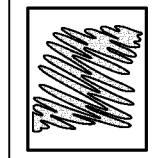
FIG. 39 illustrates an exemplary "Get Advice" dialog, in accordance with a representative embodiment of the present invention.

FIG. 39 illustrates an exemplary "Get Advice" dialog 3900, in accordance with a representative embodiment of the present invention. As illustrated in FIG. 39, the user may be shown an image of a product, and a product name, and is provided with options that when clicked/select permit the user to "Add to a poll" to request followers to vote, "Ask a question" about the pictured item, "Compare" to see a comparison of similar items, an "Talk to an expert" to chat with an expert.

FIG. 40 illustrates an exemplary matrix 4000 showing the types of Stories that are applicable to various types of Objects, in accordance with one representative embodiment of the present invention.

FIG. 41 illustrates an exemplary matrix 4100 showing the types of Stories that may appear in the context of the indicated newsfeeds, in accordance with one representative embodiment of the present invention.

Figure 42:
FIG. 42 illustrates an exemplary catalog page, in accordance with a representative embodiment of the present invention.

FIG. 42 illustrates an exemplary catalog page, in accordance with a representative embodiment of the present invention. As shown in the example of FIG. 42, the "Catalog Page" is a [pictorial collection of things that are of interest to user "Moran Haviv." The "Catalog Page" shows when the page was last updated, when it was first created, who is the "owner" of the page, the total price of the Objects listed on this "Catalog Page," and a list of "Tags" that apply to this page. The displayed Objects are in a grid format, where each shows a picture, identifying text, a price, and may include comments, for each of the items in the catalog created by "Moran Haviv."

FIG. 43 illustrates an exemplary newsfeed view, in accordance with a representative embodiment of the present invention. As shown in the illustration of FIG. 43, the newsfeed view of FIG. 43 permits the user to select the "feed width," to increase or decrease the number of columns of newsfeed objects displayed across the page. It should be noted that the width of each newsfeed column is automatically adjusted based on the number of columns selected for display.

Figure 44:
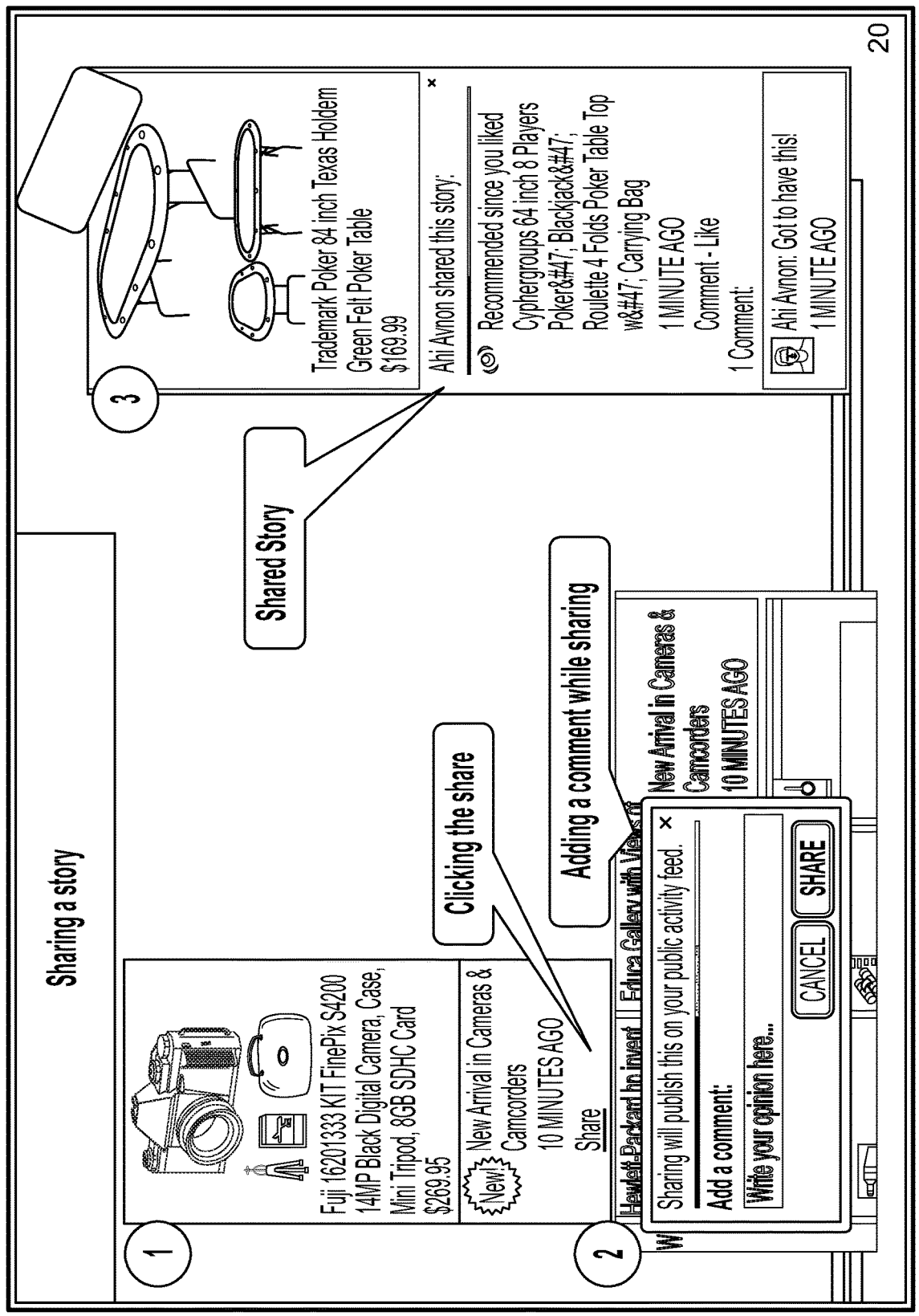
FIG. 44 illustrates an exemplary popover enabling a consumer/user to share a Story, in accordance with a representative embodiment of the present invention.

FIG. 44 illustrates an exemplary popover enabling a consumer/user to share a Story, in accordance with a representative embodiment of the present invention. As shown in FIG. 44, an Object of a newsfeed may include a "Share" link that when selected by the user may permit the user to add a comment, and to cause that comment to be added to the list of comments for the Object.

Figure 45:
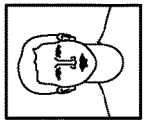
FIG. 45 illustrates exemplary hover behavior, in accordance with a representative embodiment of the present invention.

FIG. 45 illustrates exemplary hover behavior, in accordance with a representative embodiment of the present invention. As shown in FIG. 45, the user may hover a cursor over a portion of the Object on a newsfeed, and one or more additional options, in this case "Comment" and "Like" options, may be caused to display, which the user may click/select. In this manner, the Objects of the newsfeed in accordance with the present invention may initially be made smaller, permitting a larger number of Objects to be displayed in the newsfeed, while still providing the user with a set of actions or options that may be easily accessed.

Figure 46:
FIG. 46 illustrates an exemplary "Help Me Choose Poll", in accordance with a representative embodiment of the present invention.
Figure 46:
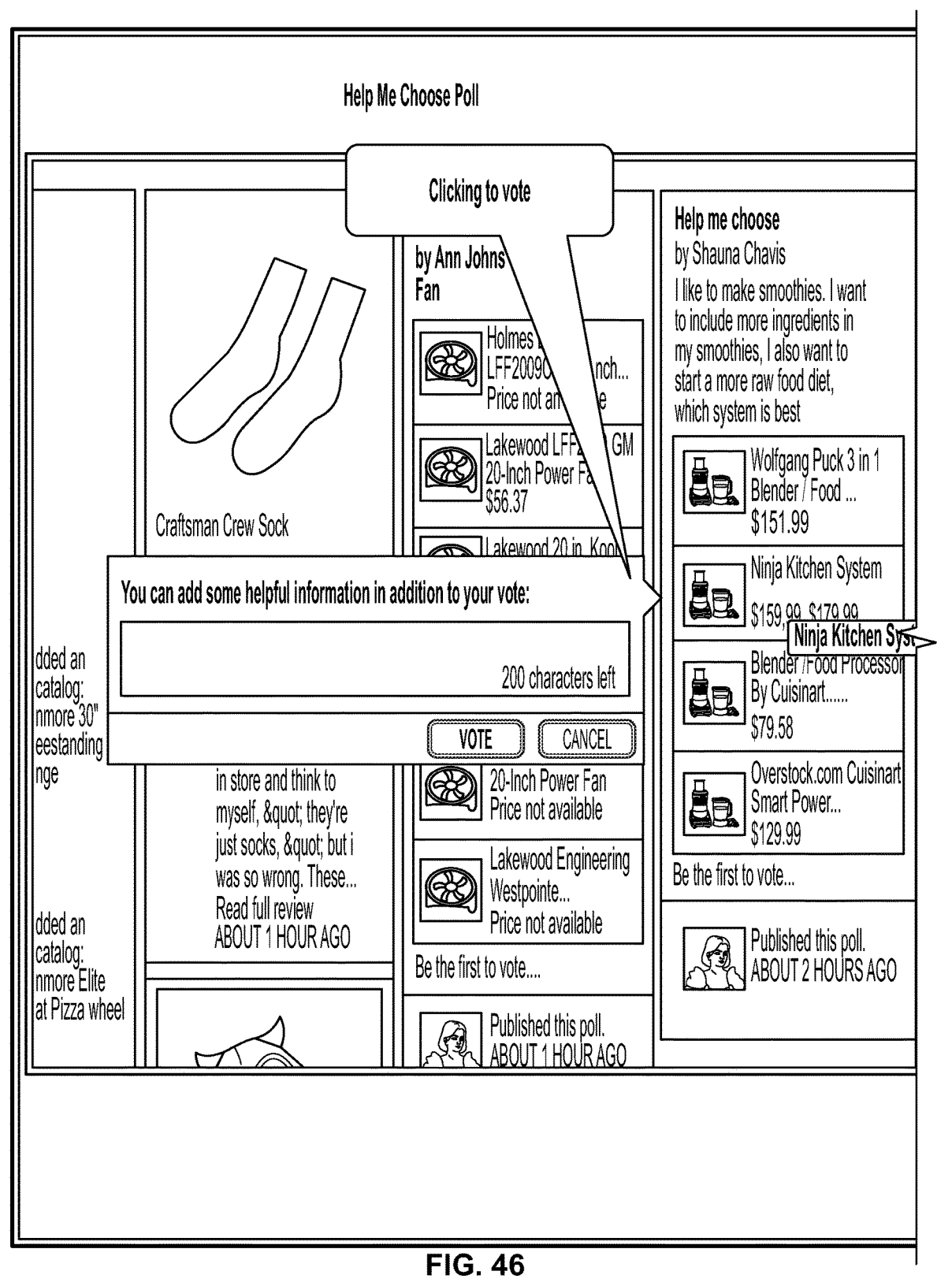

FIG. 46 illustrates an exemplary "Help Me Choose Poll", in accordance with a representative embodiment of the present invention. In the illustrative example of FIG. 46, the user may decide to respond to a user poll about a particular product, and may provide their owns views that may be reflected in the newsfeed of the user that posted the poll.

Figure 47:
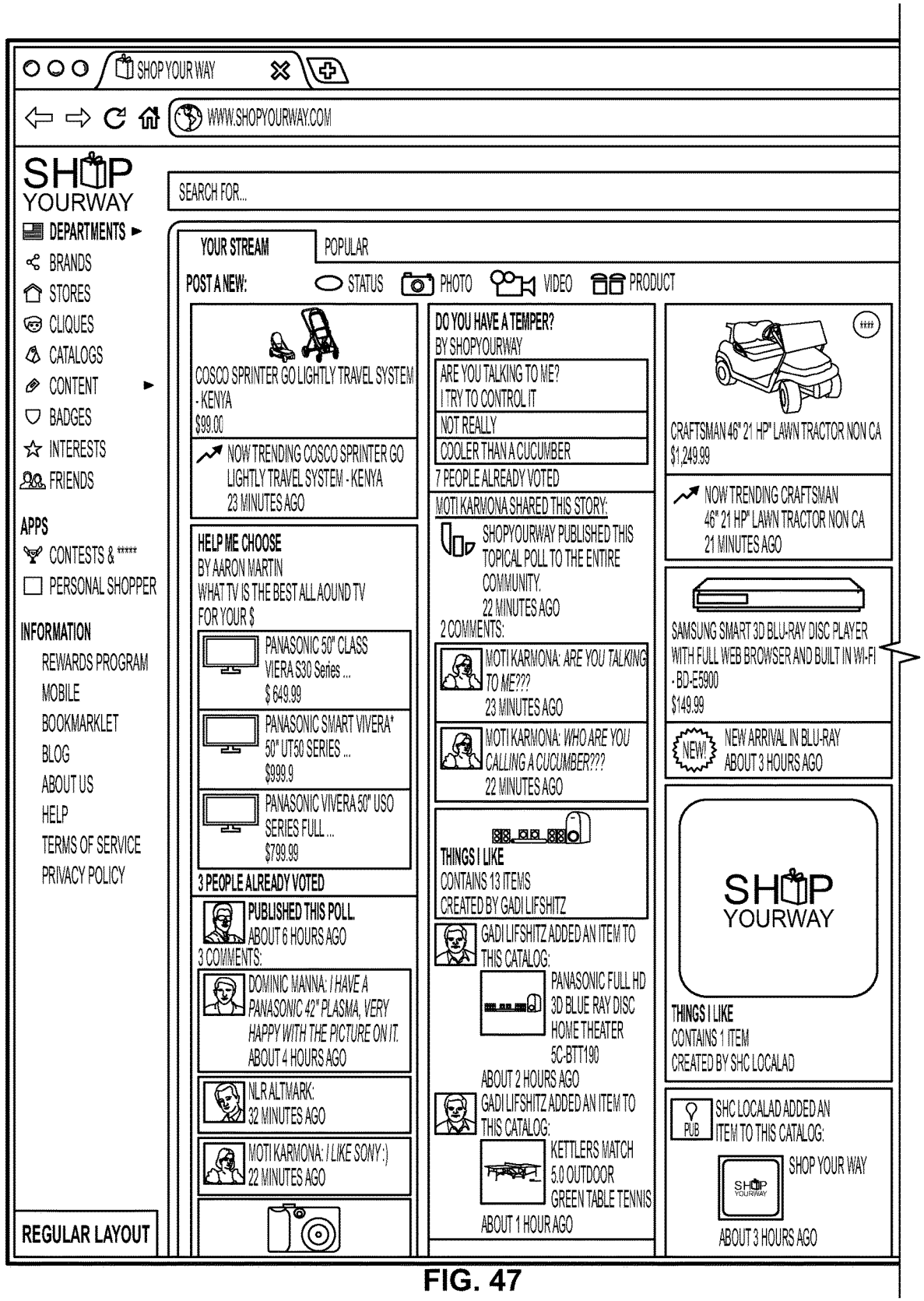
FIG. 47 illustrates an exemplary grid newsfeed, in accordance with a representative embodiment of the present invention.
Figure 47:
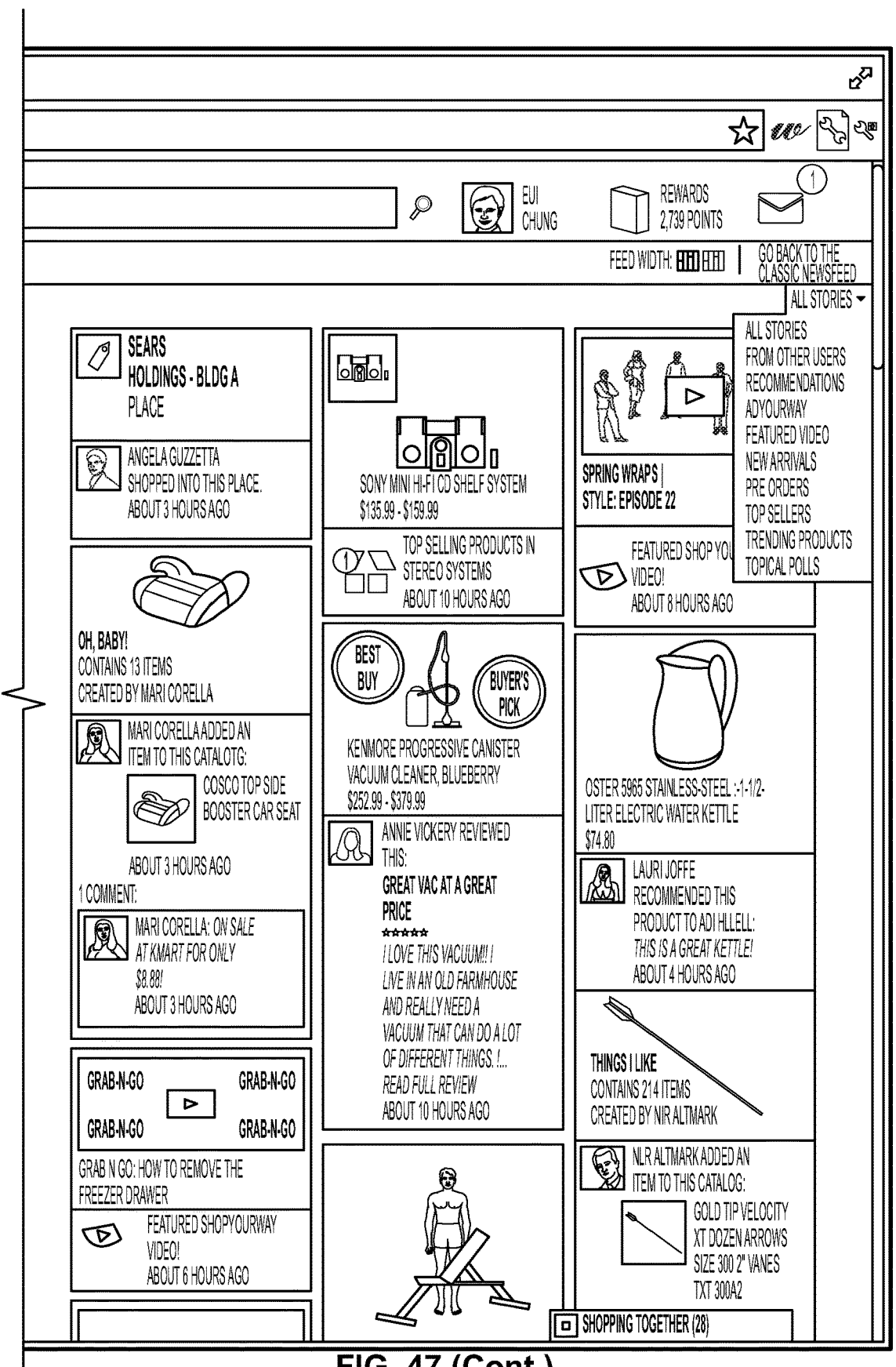

FIG. 47 illustrates an exemplary grid newsfeed, in accordance with a representative embodiment of the present invention. As shown in the illustration of FIG. 47, the user of the grid newsfeed may choose to select filtering of the Stories to be visible on the newsfeed, by selecting from, for example, "All stories," "From other users," "Recommendation," "AdYourWay," "Featured video," "New arrivals," "Pre-orders," "Top sellers," Trending products," and "Topical polls." Following selection, the Stories visible on the newsfeed of the user will be limited to those identified by the selected filter.

Figure 48:
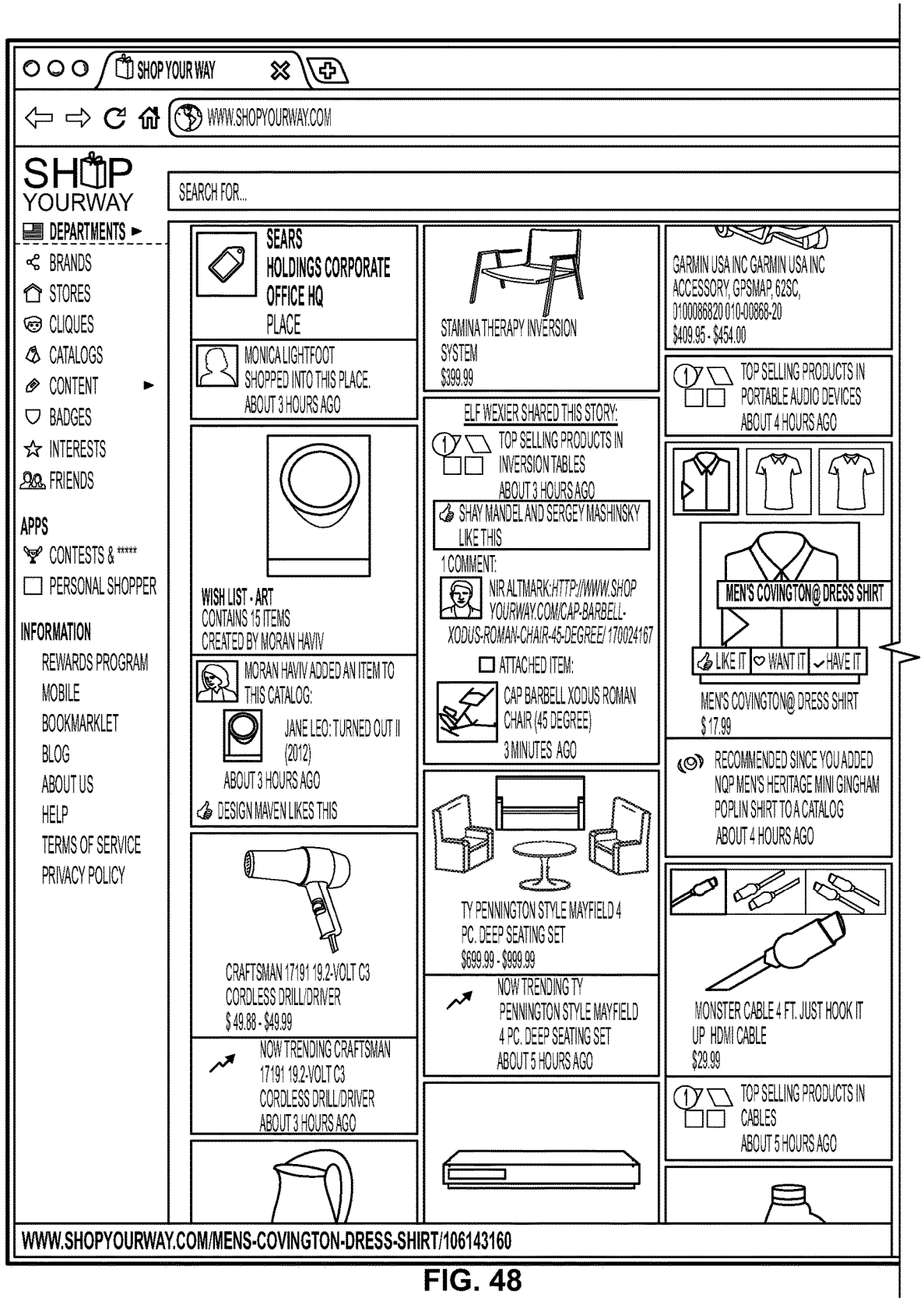
FIG. 48 illustrates another exemplary grid newsfeed, in accordance with a representative embodiment of the present invention.
Figure 48:
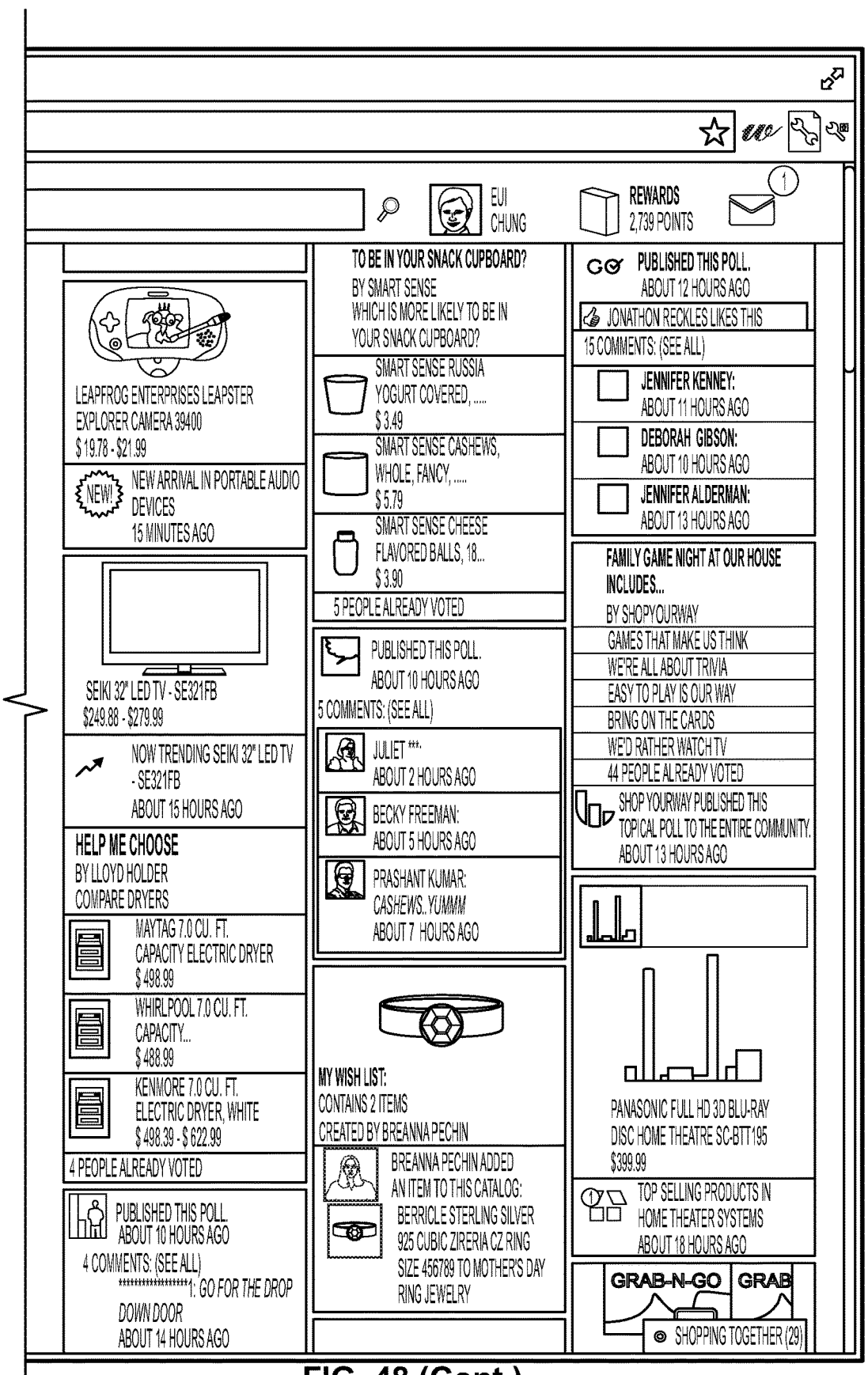

FIG. 48 illustrates another exemplary grid newsfeed, in accordance with a representative embodiment of the present invention.

Figure 49:
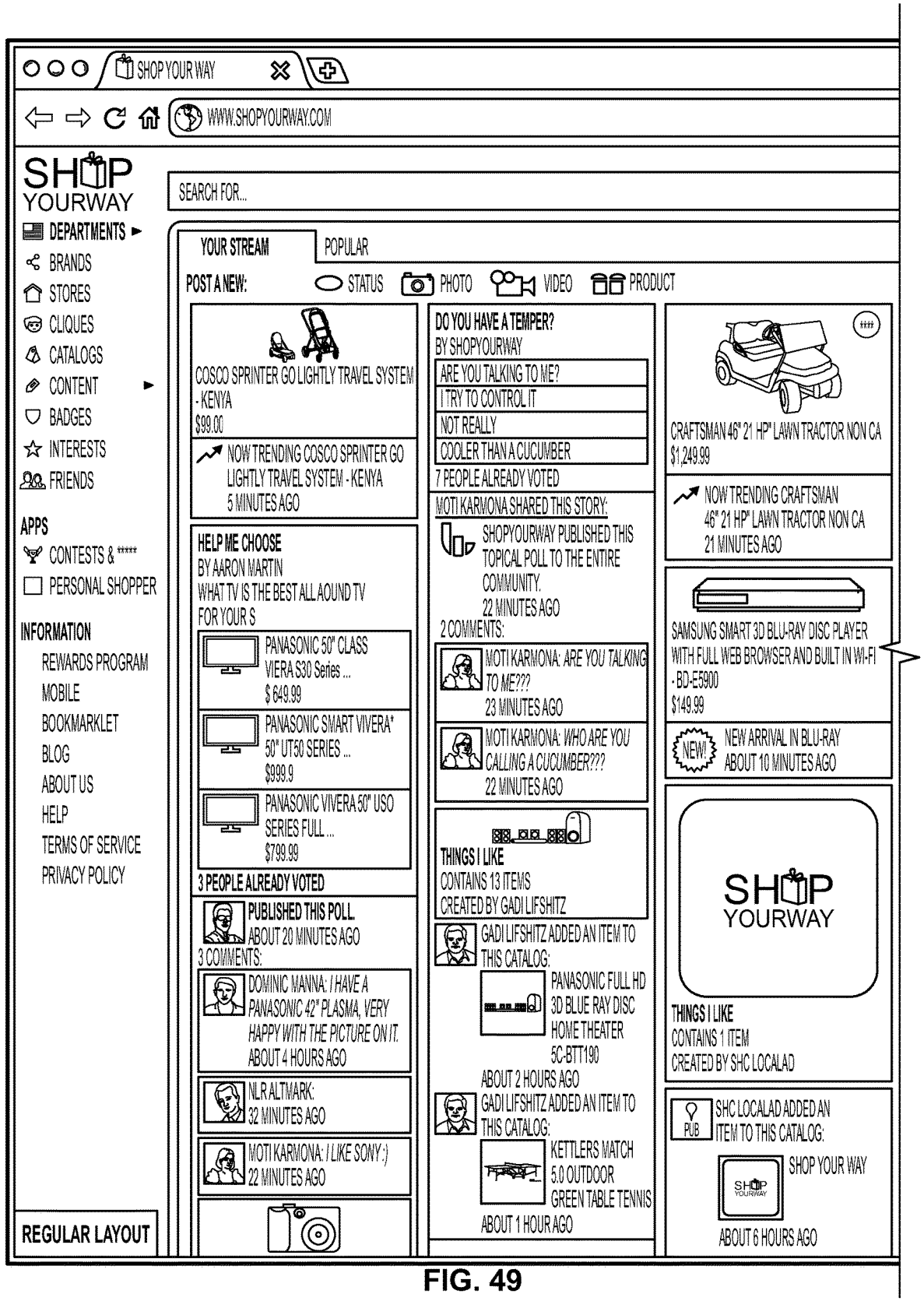
FIG. 49 illustrates an additional example of a grid newsfeed, in accordance with a representative embodiment of the present invention.
Figure 49:
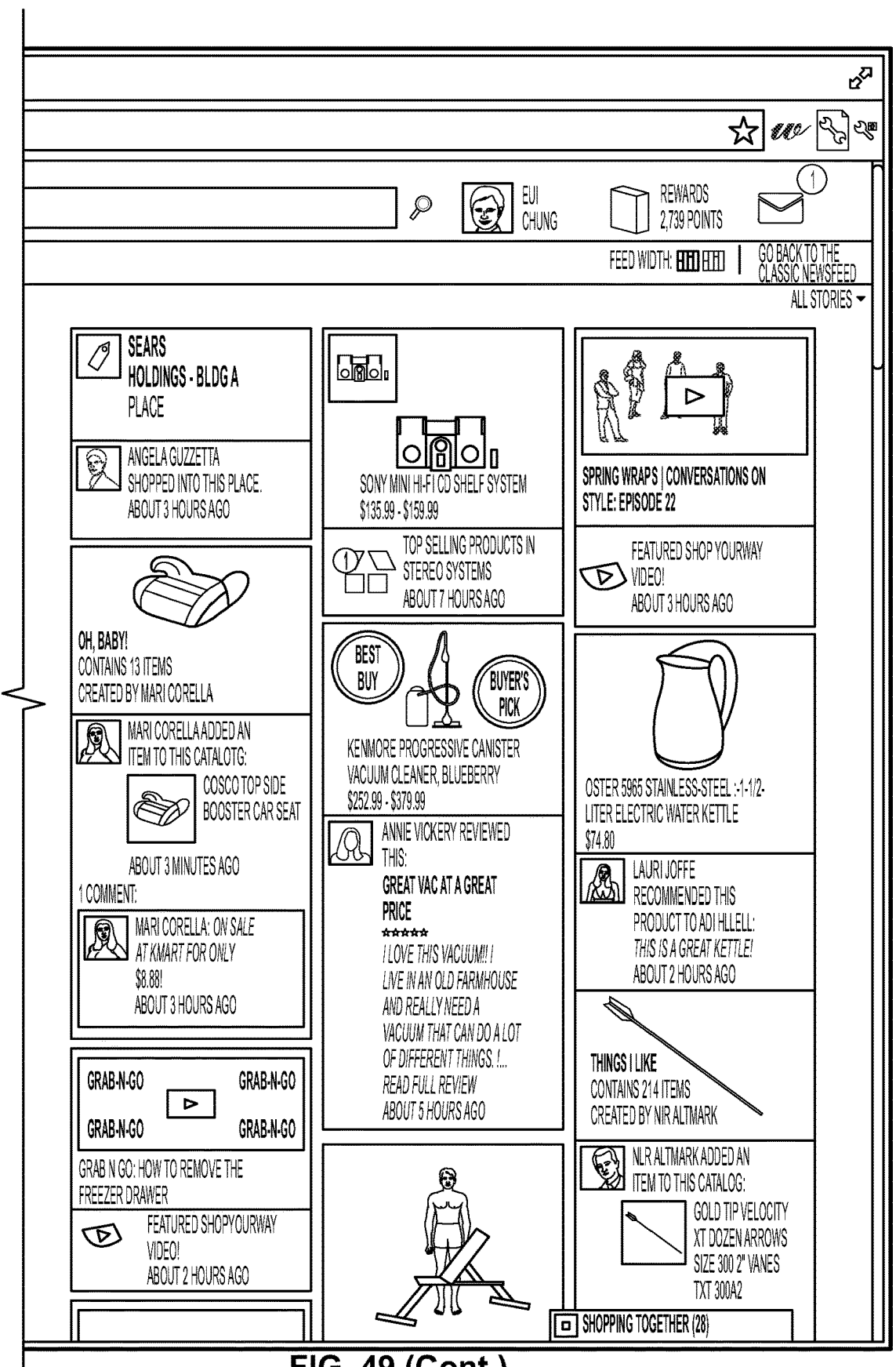

FIG. 49 illustrates an additional example of a grid newsfeed, in accordance with a representative embodiment of the present invention.

Figure 50:
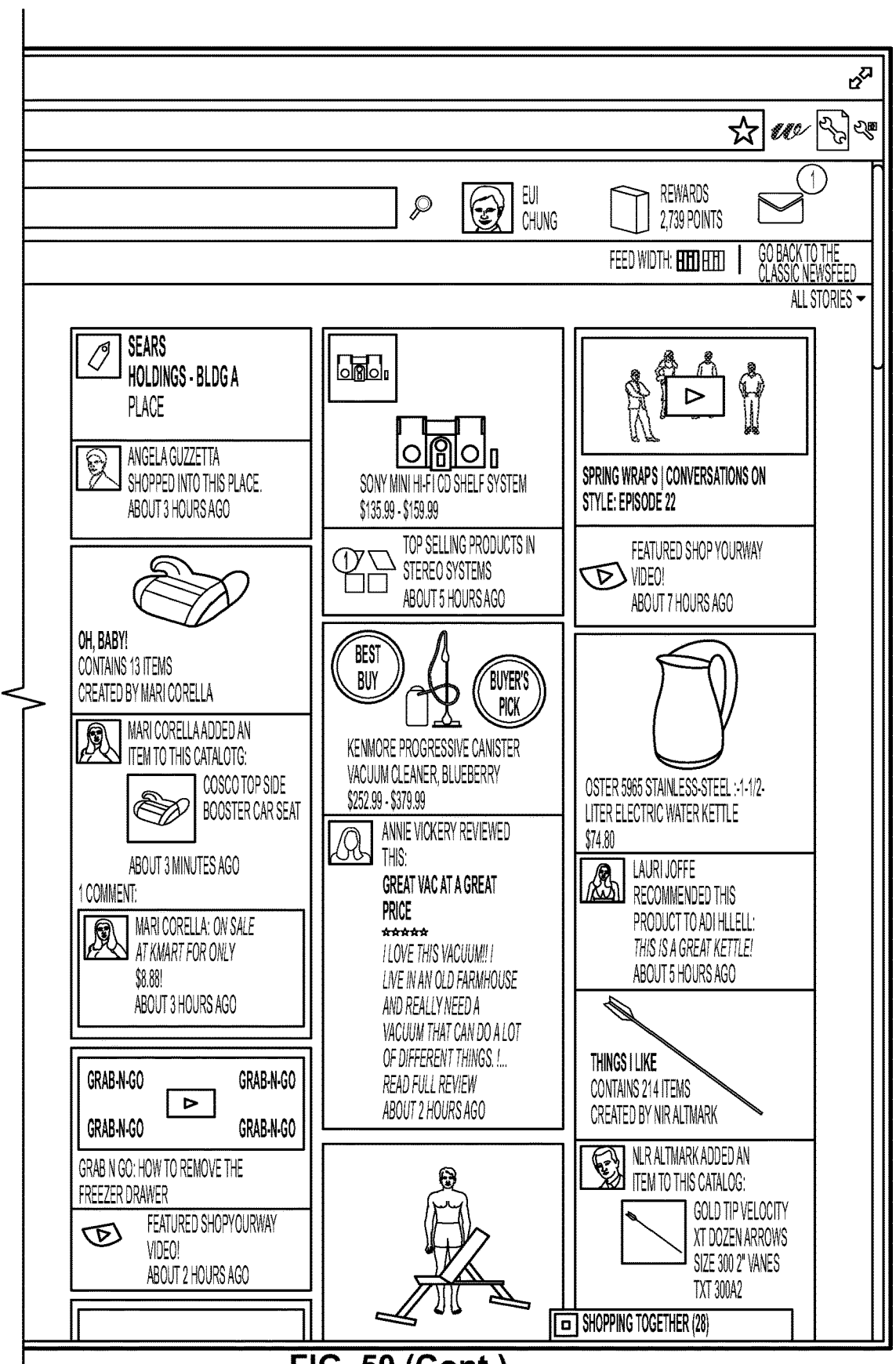
FIG. 50 illustrates one more exemplary grid newsfeed, in accordance with a representative embodiment of the present invention.

FIG. 50 illustrates one more exemplary grid newsfeed, in accordance with a representative embodiment of the present invention. In the illustration of FIG. 50, the user has clicked on/selected the "Departments" tab at the upper left-hand edge of the page, causing display of an extended list showing a number of departments available.

Figure 51:
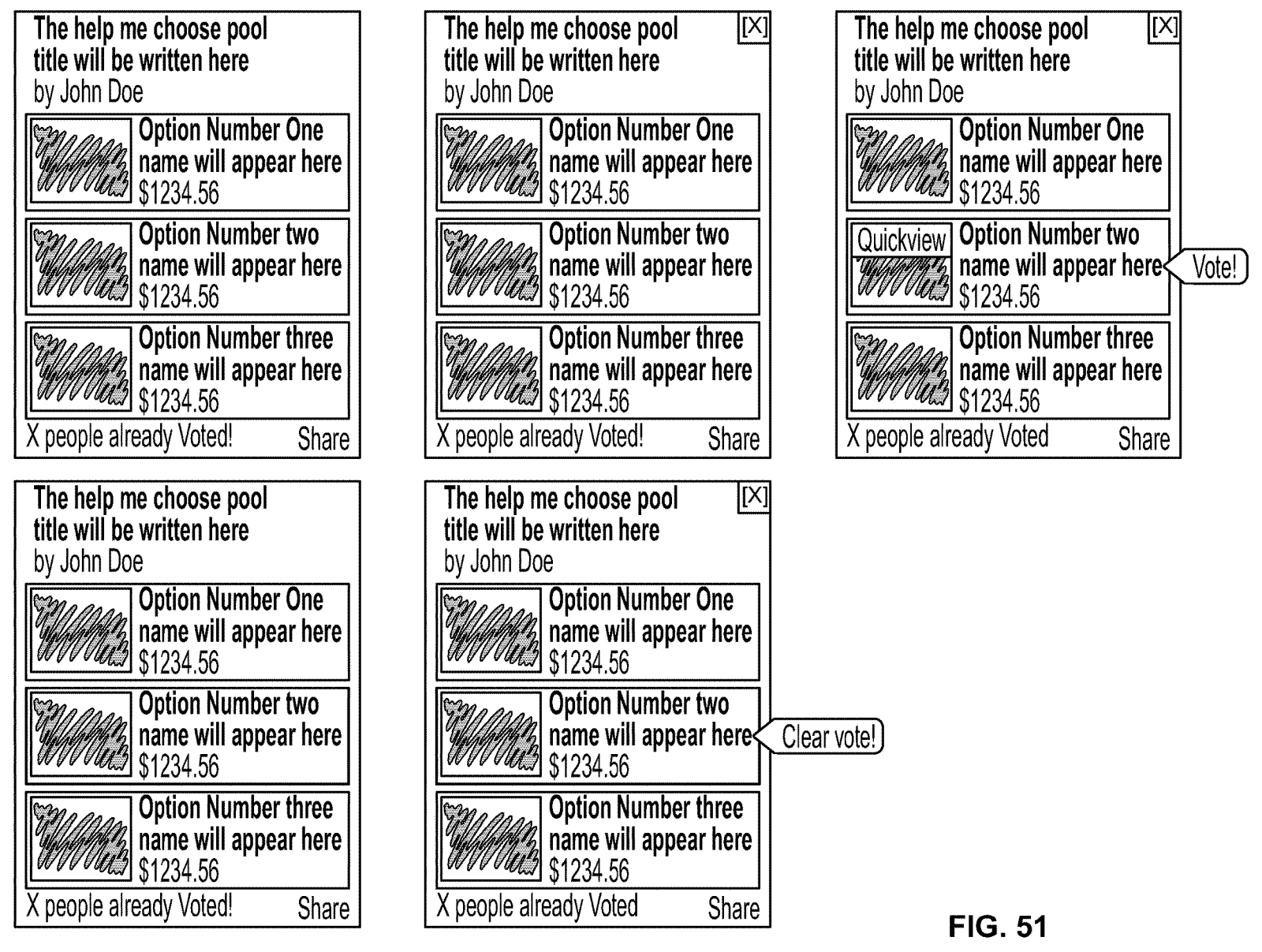

FIG. 51 illustrates another exemplary "Help Me Choose Poll," in accordance with a representative embodiment of the present invention. As shown in FIG. 51, the user may, for example, move the cursor to hover over various portions of an Object, which in the illustration of FIG. 51 is a "Help me choose poll" type Story. Hovering over a certain port ion of the Object cause the "X" to appear in the upper right hand corner of the Object, while hovering over the option from which to choose may cause a pop-up to urge the viewer/user to vote if the user/viewer has not yet voted. The current relative fractions of the total vote cast may be displayed when the cursor is in hovering and voting is in progress, and the user/viewer may be prompted by a pop-up to clear their vote, when hovering after they have already voted.

Figure 52:
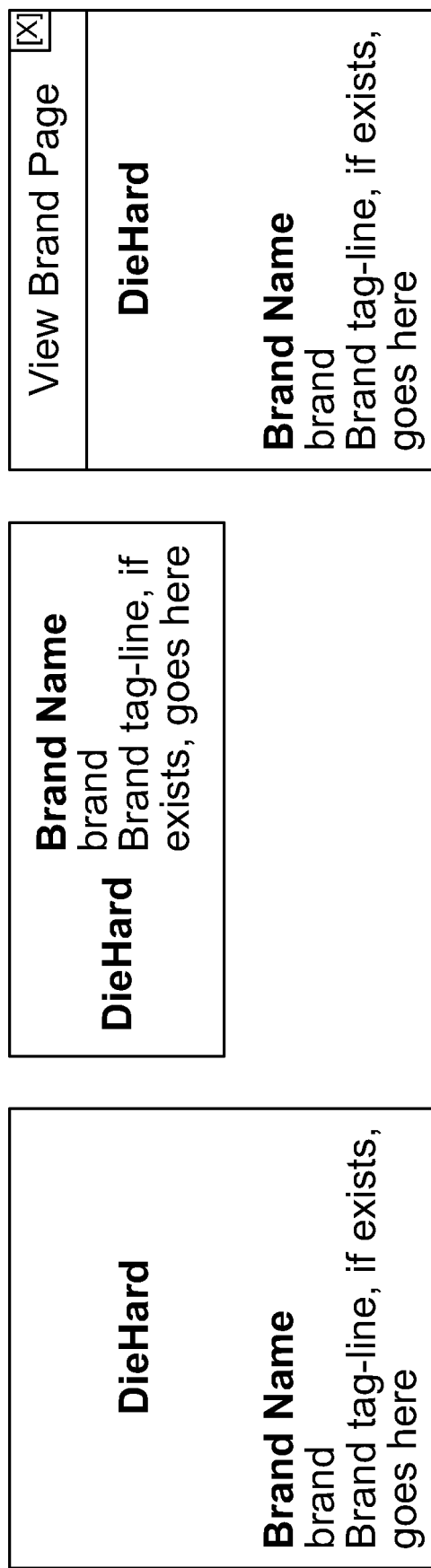
FIG. 52 illustrates exemplary "Brand" Objects, in accordance with a representative embodiment of the present invention.

FIG. 52 illustrates exemplary "Brand" Objects, in accordance with a representative embodiment of the present invention. As shown in example illustration of FIG. 52, a "Brand" type Object may take several forms, and may permit access to the page for the "Brand."

Figure 53:
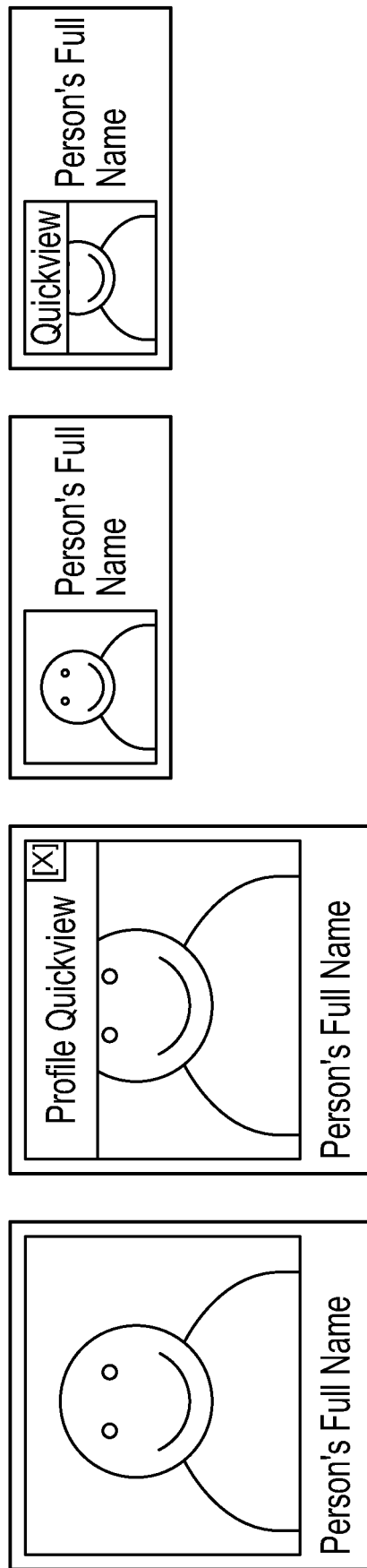
FIG. 53 illustrates exemplary "Person/Profile" Objects, in accordance with a representative embodiment of the present invention.

FIG. 53 illustrates exemplary "Person/Profile" Objects, in accordance with a representative embodiment of the present invention. As shown in the example illustration of FIG. 53, a "Person" type Object may take several forms, and may permit access to a "Quickview" profile that may provide expanded information about the "person" of the "Person" type Object, but less than a full profile page for the "Person."

FIG. 54 illustrates exemplary "AdYourWay," "Featured Video," "Special Deals," "Started Following Tag," and "Featured User" Stories, in accordance with a representative embodiment of the present invention.

FIG. 55 illustrates exemplary "Answer," "Now Trending," "Unlocked Badge," "Recommended by Friend," and "Deal" Stories, in accordance with a representative embodiment of the present invention.

Figure 56:
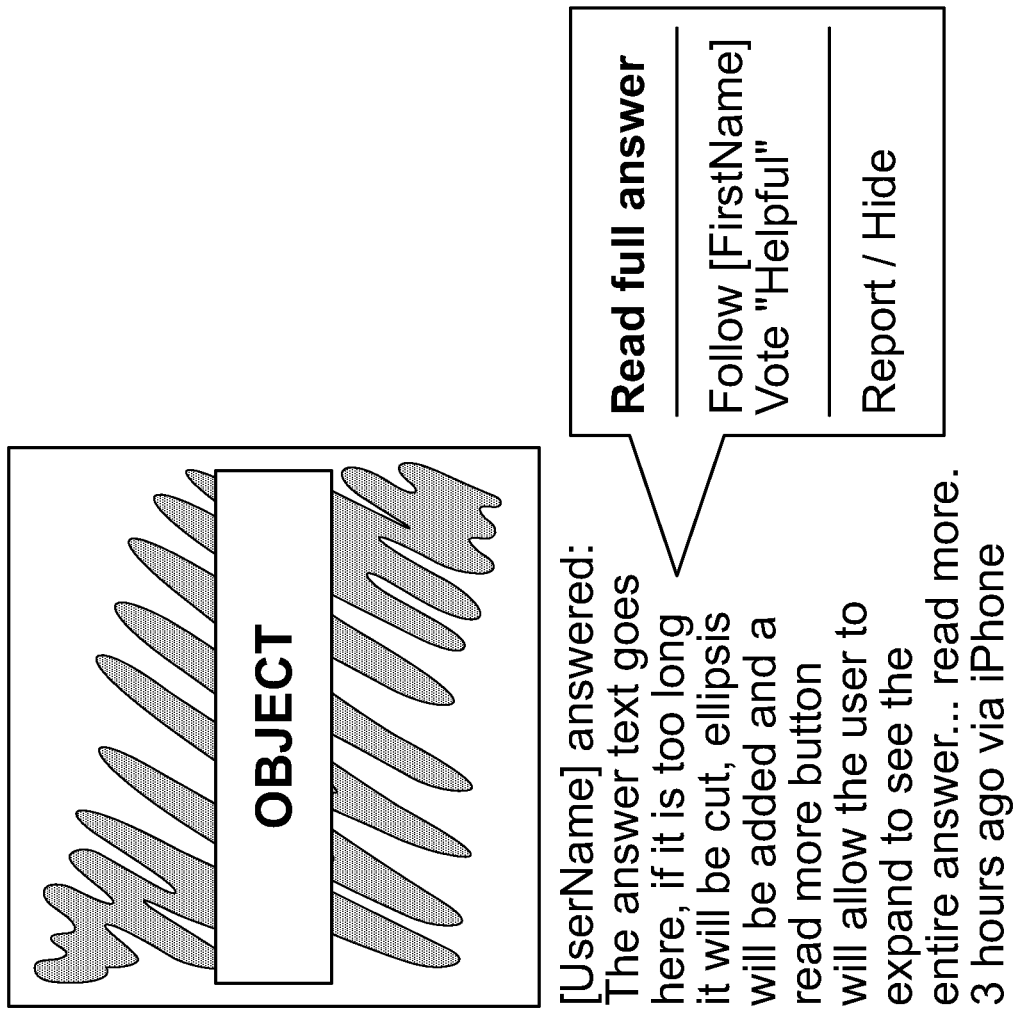
FIG. 56 illustrates an exemplary Story with contextual hover menu, in accordance with a representative embodiment of the present invention.

FIG. 56 illustrates an exemplary Story with contextual hover menu, in accordance with a representative embodiment of the present invention.

Aspects of the present invention may be found in a method for the generation of an object driven newsfeed. Such a method may comprise maintaining a set of personal characteristics for each of a plurality of users of an e-commerce network, and gathering information representing actions of the plurality of users regarding a plurality of objects. The method may also comprise producing, from the gathered information, a filtered information stream for each of the plurality of users of the e-commerce network, using personal characteristics of a respective one of the plurality of users, and transmitting to each of the plurality of users a respective newsfeed comprising the respective filtered information stream.

In a representative embodiment of the present invention, each newsfeed may be formatted for display to the respective user as a plurality of columns. Each column may comprise one or more time ordered newsfeed items, each newsfeed item may represent one or more user actions regarding one of the plurality of objects, and a number of columns of the newsfeed may be configurable by a user. The user action may comprise a purchase transaction, and the purchase transaction may occur over the Internet. The user action may also comprise submitting a comment, submitting a poll to users of the e-commerce network, or expressing interest in an object. The personal characteristics may comprise one or both of a brand preference of the user and an age of user.

Further aspects of the present invention may be found in a system for the generation of an object driven newsfeed, the system comprising a least one processor operable to, at least, perform the actions of the method described above.

Additional aspects of the present invention may be found in a computer-readable medium having a plurality of code sections, each code section comprising a plurality of instructions executable by a processor for causing the processor to perform the actions of a method for the generation of an object driven newsfeed, such as the method described above.

Figure 57:
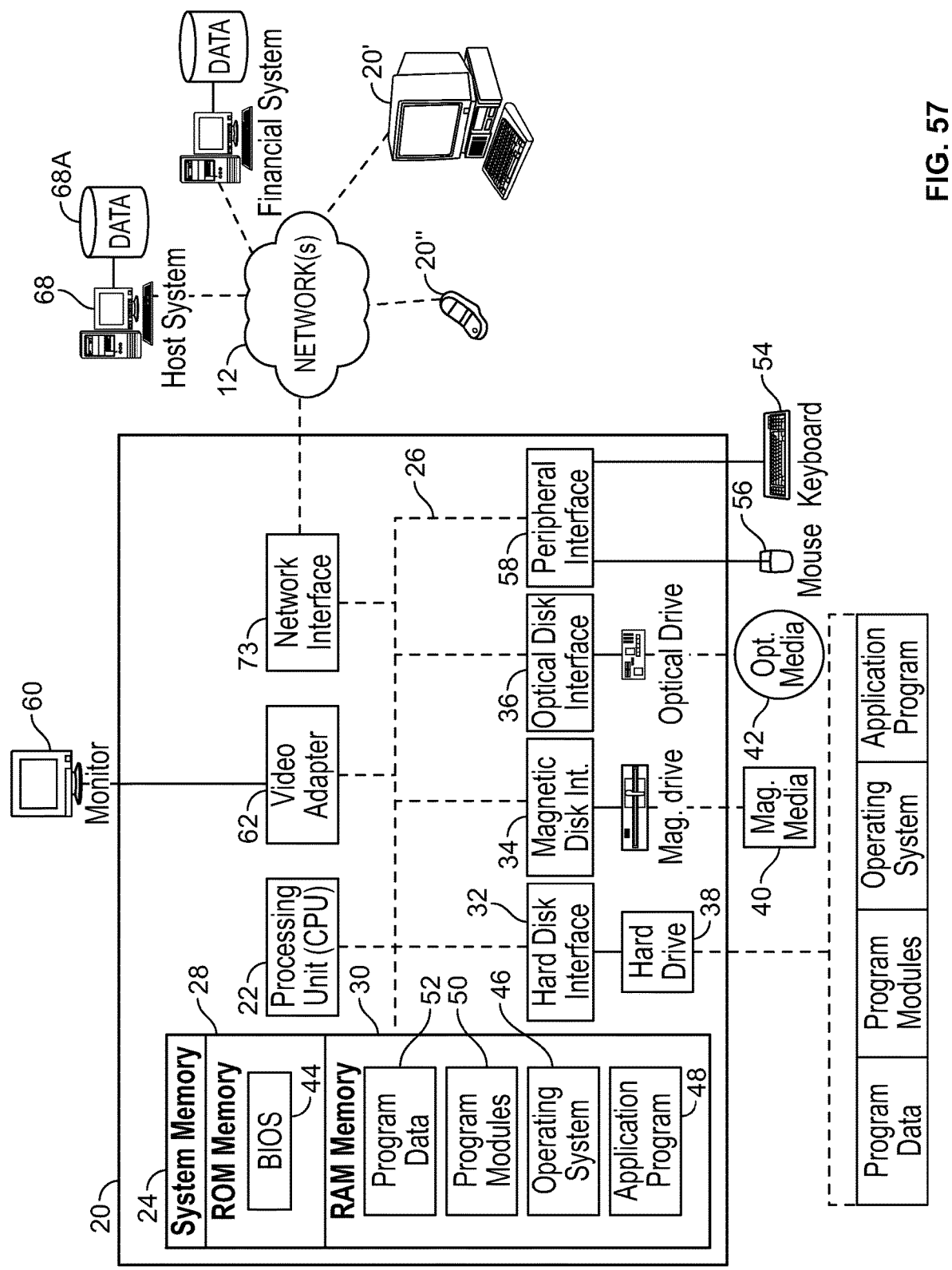
FIG. 57 is a block diagram illustrating an exemplary computer network, in which various embodiments of the present invention may be practiced.

With reference to the figures, and in particular with respect to the exemplary computer network 100 of FIG. 57, the following discloses various example systems and methods that support the generation and delivery of an object driven newsfeed, to various forms of handheld or mobile devices and desktop computers such as those described above. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a user, consumer, etc., or a sales associate, a customer service agent, and/or others to access a host system server 68 and, among other things, be connected to a learning management system, a content management system, an electronic publication system, a hosted social networking site, a user profile, and/or a sales associate. Generally, the computer executable instructions reside in program modules which may include routines, programs, objects, components, data structures, etc., that perform particular tasks or implement particular abstract data types. Accordingly, the processing devices 20, 20', 20" illustrated in FIG. 57 may be embodied in any device having the ability to execute instructions such as, by way of example, a personal computer, mainframe computer, personal-digital assistant ("FDA"), cellular telephone, tablet, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, the host system server 68 may, like processing device 20, be any type of device having processing capabilities. Again, the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system server 68 may include many or all of the elements described above relative to the processing device 20. In addition, the host system server 68 would generally include executable instructions for, among other things, coordinating creation, storage, retrieval, and delivery of documents and media content, social networking, storage of a shopping list, receiving a location of a customer via a mobile device, receiving a request for a service call center connection from either a customer or a sales associate, routing the request via a distributed mobile video call center, providing a service call infrastructure for providing the requestor with a distributed customer service experience.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory memory storage device(s) of the host system server 68.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for the generation of an object driven newsfeed, the method comprising:
   maintaining a set of personal characteristics for each of a plurality of users of an e-commerce network;
   gathering information representing one or more actions of the plurality of users regarding one or more objects;
   producing, from the gathered information, a filtered information stream for each of the plurality of users of the e-commerce network, using personal characteristics of a respective one of the plurality of users; and
   transmitting, to a user device of each of the plurality of users, a respective newsfeed comprising the respective filtered information stream.

2. The method according to claim 1, wherein a newsfeed is formatted for display on a graphical user interface as a plurality of columns, wherein each column comprising one or more time-ordered news items.

3. The method according to claim 2, wherein a number of columns of a newsfeed can be modified via the graphical user interface.

4. The method according to claim 1, wherein the one or more actions comprise one or more purchase transactions.

5. The method according to claim 4, wherein the one or more purchase transactions occur via the e-commerce network.

6. The method according to claim 1, wherein the one or more actions comprise submitting one or more comments.

7. The method according to claim 1, wherein the one or more actions comprise participating in a poll.

8. The method according to claim 1, wherein the one or more actions comprise expressing interest in the one or more objects.

9. The method according to claim 1, wherein the set of personal characteristics comprises one or both of a brand preference and an age.

10. The method according to claim 1, wherein a newsfeed comprises a plurality of object-driven feeds that are displayed in a grid on a graphical user interface.

11. A system for the generation of an object driven newsfeed, the system comprising:
    a graphical user interface for display and control of a newsfeed comprising a filtered information stream, wherein:
    the graphical user is operably displayed on a plurality of devices corresponding to a plurality of users of an e-commerce network,
    the filtered information stream is generated according to one or more personal characteristics of a particular user, and
    a personal characteristic of the one or more personal characteristics of the particular user is an action regarding one or more objects.

12. The system according to claim 11, wherein the newsfeed is formatted for display on the graphical user interface as a plurality of columns, wherein each column comprising one or more time-ordered news items.

13. The system according to claim 12, wherein a number of columns of the newsfeed can be modified via the graphical user interface.

14. The system according to claim 11, wherein the action comprises one or more purchase transactions.

15. The system according to claim 14, wherein the one or more purchase transactions occur via the e-commerce network.

16. The system according to claim 11, wherein the action comprises submitting one or more comments.

17. The system according to claim 11, wherein the action comprises participating in a poll.

18. The system according to claim 11, wherein the action comprises expressing interest in the one or more objects.

19. The system according to claim 11, wherein the one or more personal characteristics comprises one or both of a brand preference and an age.

20. The system according to claim 11, wherein the newsfeed comprises a plurality of object-driven feeds that are displayed in a grid on the graphical user interface.

* * * * *